(12) United States Patent
Yamamoto et al.

(10) Patent No.: US 6,757,839 B2
(45) Date of Patent: *Jun. 29, 2004

(54) STORAGE UNIT SUBSYSTEM

(75) Inventors: Akira Yamamoto, Sagamihara (JP); Hiroyuki Kitajima, Yokohama (JP); Kouji Arai, Yokohama (JP); Yoshihisa Kamo, Musashimurayama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/319,501

(22) Filed: Dec. 16, 2002

(65) Prior Publication Data

US 2004/0078645 A1 Apr. 22, 2004

Related U.S. Application Data

(63) Continuation of application No. 09/956,792, filed on Sep. 21, 2001, which is a continuation of application No. 09/642,815, filed on Aug. 22, 2000, now Pat. No. 6,327,673, which is a continuation of application No. 09/259,408, filed on Feb. 22, 1999, now Pat. No. 6,145,091, which is a continuation of application No. 08/877,627, filed on Jun. 18, 1997, now Pat. No. 5,917,999, which is a continuation of application No. 07/827,982, filed on Jan. 29, 1992, now Pat. No. 5,682,396.

(30) Foreign Application Priority Data

Jan. 31, 1991 (JP) ............................................ 03-010574

(51) Int. Cl.[7] .............................................. G06F 11/00
(52) U.S. Cl. ........................................ 714/5; 711/114
(58) Field of Search .............................. 714/5, 6, 7, 8, 714/13, 25, 42, 44, 47; 711/114, 115, 118, 133, 159

(56) References Cited

U.S. PATENT DOCUMENTS

| | | | |
|---|---|---|---|
| 4,761,785 A | 8/1988 | Clark et al. |
| 4,814,980 A | 3/1989 | Peterson et al. |
| 4,942,579 A | 7/1990 | Goodlander et al. |

(List continued on next page.)

FOREIGN PATENT DOCUMENTS

| | | |
|---|---|---|
| EP | 0369707 | 5/1990 |
| EP | 458554 | 11/1991 |
| EP | 0462917 | 12/1991 |
| JP | 55157053 | 12/1980 |
| JP | 59135563 | 8/1984 |
| JP | 60114947 | 6/1985 |

(List continued on next page.)

OTHER PUBLICATIONS

F.D. Lawlor, "Efficient Mass Storage Parity Recovery Mechanism", IBM Technical Disclosure Bulletin, US, IBM Corp., Jul. 1981, vol. 24, No. 2, pp 986–987.

Patterson, David A. et al, A Case for Redundant Arrays of Inexpensive Disk (RAID), ACM SIGMOD Conference Proceedings, Chicago, Ill. Jun. 1–3, 1988, pp. 109–116.

*Primary Examiner*—Nadeem Iqbal
(74) *Attorney, Agent, or Firm*—Mattingly, Stanger & Malur, P.C.

(57) ABSTRACT

When receiving a write request from a processor, a control unit checks the condition of existence (or the presence/absence) in a cache for information necessary for generation of an updated value of a parity record, receives write data and reports the completion of the write request to the processor. In asynchronism with the write request from the processor, the control unit performs a load process for that information among the information necessary for generation of the updated value of the parity record which may be prepared in asynchronism with the write request from the processor and a write after process for the updated value of the parity record.

7 Claims, 82 Drawing Sheets

U.S. PATENT DOCUMENTS

| | | |
|---|---|---|
| 5,140,592 A | 8/1992 | Idleman et al. |
| 5,208,813 A | 5/1993 | Stallmo |
| 5,235,601 A | 8/1993 | Stallmo et al. |
| 5,239,659 A | 8/1993 | Rudeseal et al. |
| 5,274,799 A | 12/1993 | Brant et al. |
| 5,390,187 A | 2/1995 | Stallmo |
| 5,490,248 A | 2/1996 | Dan et al. |
| 5,497,457 A | 3/1996 | Ford |
| 5,499,337 A | 3/1996 | Gordon |
| 5,515,500 A | 5/1996 | Mizuno et al. |
| 5,526,482 A | 6/1996 | Stallmo et al. |
| 5,596,709 A | 1/1997 | Bond et al. |
| 5,600,816 A | 2/1997 | Oldfield et al. |
| 5,613,059 A | 3/1997 | Stallmo et al. |
| 5,613,088 A * | 3/1997 | Achiwa et al. .............. 711/155 |
| 5,682,396 A * | 10/1997 | Yamamoto et al. ......... 714/805 |
| 5,734,812 A * | 3/1998 | Yamamoto et al. ............. 714/6 |
| 5,787,460 A | 7/1998 | Yashiro et al. |
| 5,826,002 A | 10/1998 | Yamamoto et al. |
| 5,911,779 A | 6/1999 | Stallmo et al. |
| 5,917,999 A | 6/1999 | Yamamoto et al. |
| 5,959,860 A | 9/1999 | Styczinski |
| 5,996,046 A | 11/1999 | Yagisawa et al. |
| 6,032,263 A | 2/2000 | Yamamoto et al. |
| 6,112,255 A | 8/2000 | Dunn et al. |
| 6,151,641 A | 11/2000 | Herbert |
| 6,209,107 B1 * | 3/2001 | Yamamoto et al. ............. 714/6 |
| 6,446,161 B1 * | 9/2002 | Yamamoto et al. ......... 711/114 |
| 6,463,505 B2 * | 10/2002 | Katsuragi et al. ........... 711/114 |
| 6,473,867 B2 * | 10/2002 | Yamamoto et al. ............. 714/6 |
| 6,532,549 B2 * | 3/2003 | Yamamoto et al. ............. 714/6 |

FOREIGN PATENT DOCUMENTS

| | | |
|---|---|---|
| JP | 237418 | 2/1990 |
| JP | 337746 | 2/1991 |
| JP | 4-127224 | 4/1992 |
| JP | 5-509186 | 12/1993 |
| JP | 10-511193 | 10/1998 |
| WO | WO 90/00280 | 1/1990 |

* cited by examiner

FIG.87

| PROBLEM | MECHANISM | EMBODIMENT ||||| 
|---|---|---|---|---|---|---|
| | | 1 | 2 | 3 | 4 | 5 |
| 1<br>DETERMINATION OF INFORMATION FOR ACQUISITION OF UPDATED VALUE OF PARITY RECORD | PARITY GROUP HIT/MISS JUDGE PROCESS (FIG.65) | ○ | ○ | | | ○ |
| | PARITY GROUP HIT/MISS JUDGE PROCESS (FIG.66) | | | ○ | ○ | ○ |
| | PARITY GROUP HIT/MISS JUDGE PROCESS (FIG.67) | | | | | ○ |
| 2<br>ASYNCHRO-NIZATION | ASYNCHRONOUS PROCESS (FIG.68) | ○ | | | | ○ |
| | ASYNCHRONOUS PROCESS (FIG.69) | | ○ | | | ○ |
| | ASYNCHRONOUS PROCESS (FIG.70) | | | | ○ | ○ |
| | ASYNCHRONOUS PROCESS (FIG.71) | | | | ○ | ○ |
| 3<br>TIMING OF GENENRATION OF PARITY | PARITY GENERATION TIMINING (FIG.73) | ○ | ○ | ○ | ○ | ○ |
| | PARITY GENERATION TIMINING (FIG.74) | ○ | ○ | ○ | ○ | ○ |
| | PARITY GENERATION TIMINING (FIG.75) | ○ | ○ | ○ | ○ | ○ |
| | PARITY GENERATION TIMINING (FIG.76) | ○ | ○ | ○ | ○ | ○ |

○ ···RELEVANT

STORAGE UNIT SUBSYSTEM

This is a continuation application of U.S. Ser. No. 09/956,792, filed Sep. 21, 2001, which is a continuation application of U.S. Ser. No. 09/642,815, filed Aug. 22, 2000, now U.S. Pat. No. 6,327,673, which is a continuation application of U.S. Ser. No. 09/259,408, filed Feb. 22, 1999, now U.S. Pat. No. 6,145,091, which is a continuation application of U.S. Ser. No. 08/877,627, filed Jun. 18, 1997, now U.S. Pat. No. 5,917,999, which is a continuation application of U.S. Ser. No. 07/827,982, filed Jan. 29, 1992, now U.S. Pat. No. 5,682,396.

BACKGROUND OF THE INVENTION

The present invention relates to a method for controlling a control unit with cache memory for a disk array and a storage unit subsystem which is composed of an array of disks ad a control unit with cache memory.

The prior art most relevant to the present invention is David A. Patterson et al, "A Case for Redundant Arrays of Inexpensive Disks (RAID)", ACM SIGMOD Conference Proceeding, Chicago, Ill., Jun. 103, 1988, pp. 109–116.

The Patterson et al's article discloses a technique concerning the distribution of data on a disk array.

A disk array is physically composed of a plurality of small scale disk units but it is a disk system which operates as one disk unit for a processor. Namely, the disk array is a mechanism for attaining performance improvement and high reliability.

The Patterson et al's article proposes some data distribution method. According to a typical one of the disclosed data distribution methods, a record as a read/write unit for a processor is distributed on a disk unit as it is. In the invention, the distribution will hereinafter be referred to as data distribution will hereinafter be referred to as data distribution by record. The Patterson et al's article also proposes a data distribution method in which one record is divided into a plurality of data and the individual data are distributed on a plurality of disk units, respectively. This distribution is referred as RAIDS4 or RAID5. A feature of the data distribution by record lies in that a read/write process can be independently performed for each of disk units which constitute the disk array. In the case where one record is divisionally distributed on a plurality of disk units, a read/write process for one record monopolizes the plurality of disk units. Accordingly, in the case of the data distribution by record, the concurrency of read/write processes capable of being performed in the disk array is improved, thereby attaining the improvement in the performance of the whole of the disk array.

On the other hand, the high reliability of the disk array is realized in such a manner that redundant data called parity data are stored in disk units. Hereinafter, a record storing data read/written by a processor will be referred as a data record, and a record storing redundant data will be referred as a parity record. In the data distribution by record, a parity record is generated from a group of data records each of which is stored in each disk unit in a disk array. An assembly of a parity record and data records from which the parity record is generated, is termed a parity group. Usually, records in the same parity group are stored in separate disk units. One parity group may include one or more parity records.

In the case where an error occurs in any one the data records from which a parity record was generated, the content of the faulty data record is recovered from the contents of the parity record and the other data records. Accordingly, even if an error occurs in any disk unit in the assembly of disk units in which a parity group is stored, data can be recovered. Usually, if the number of parity records in one parity group is n, data in the parity group can be recovered even if errors occur in as many as n disk units.

In the case of the data distribution mentioned above, the updating of a parity record becomes necessary each time the content of a data record is changed by a write process. Therefore, the performance of a write process is degraded as compared with the conventional disk device. In addition, the determination of an updated value of the parity record needs a preprocess for obtaining one of the following sets (1) and (2) of values:

(1) old values (hereinafter update before values) of a data record made the object of the write process and the parity record; and (2) the values of other data records in a parity group to which a data record made the object of the write process belongs.

The values mentioned by (1) can be acquired with small overhead. Therefore, in the case where the write process occurs, a method of acquiring the values mentioned by (1) is usually employed. In order to read the values mentioned by (1), disk unit access must be made twice even in the case where only one parity record is included in the parity group. Further, in order to write the updated value of the data record made the object of the write process and the updated value of the parity record, disk unit access must be made twice. Accordingly, the disk access that is required is four times in total. In the case of the conventional disk, on the other hand, it is only required that the updated value of a record made the object of a write process should be written into a disk unit. Namely, the number of disk accesses required for a write request in the disk array using the data distribution by record is four times of that in the conventional disk.

There is not known a technique concerning the speedup of a write process in the disk array which uses the data distribution by record. But, the following techniques are known as techniques for the speedup of a write process in a general disk unit.

JP-A-53-157053 discloses a technique for improving the speed of a write request in a control unit having a disk cache by using a write after process. The control unit completes a write process at a stage of time when write data received from a processor is written into the cache. Thereafter, the data stored in the cache is written into a disk unit through a write after process by the control unit.

JP-A-59-135563 discloses a technique concerning a control unit which makes the speedup of a write process while ensuring high reliability. The control unit has a nonvolatile memory as well as a cache memory so that write data received from a processor is stored in the cache memory and the nonvolatile memory. The write data is written into a disk unit through a write after process by the control unit. Thereby, the high reliability of the write after process is attained.

JP-A-60-114947 discloses a technique concerning a control unit which controls disk units for double-write and has a cache memory or disk cache. When receiving a write request from a processor, the control unit writes write data received from the processor into one disk unit and the cache memory. In asynchronism with a read/write request from the processor, the control unit writes the write data stored in the cache memory into the other disk unit later on.

JP-A-2-37418 discloses a technique for attaining the speedup by applying a disk cash to disk units for double-write. A control unit has a nonvolatile memory as well as a cache memory so that write data received from a processor is stored in the cache memory and the nonvolatile memory. The control unit writes the write data into the two disk units through a write after process.

JP-A-3-37746 discloses a technique concerning a control unit which has a disk cache and performs a write after process, or more particularly, a technique concerning a management data structure of write after data in the disk cache which is intended for efficient execution of the write after process in such a control unit.

Each of the above prior arts disclosing a write after process using a disk cache (hereinafter simply abbreviated to cache) for an usual or conventional disk unit shows a simple technique by which write data received by the cache from a processor is written into the disk unit. However, in the case of a disk array using the data distribution by record, it is necessary to generate the updated value of a parity record. Therefore, the overhead for a write process becomes large as compared with the conventional disk unit. Accordingly, how to generate the updated value of the parity record furnishes a key for the speedup of the write process in the disk array using the data distribution by record. On the contrary, in the conventional disk unit, such consideration is unnecessary since the updated value of a parity record is not required.

SUMMARY OF THE INVENTION

An object of the present invention is to improve the efficiency of generation of an updated value of a parity record, thereby attaining the improvement in performance of a write process for a disk array which uses the data distribution by record. Basically, a control unit of the present invention too performs a write after process using a cache, like the case of a control unit for the conventional disk unit. However, the control unit of the present invention efficiently makes the generation of an updated value of a parity record which is not disclosed by the prior art.

To achieve the above object, a control unit according to an embodiment of the present invention is provided with two kinds of mechanisms by which that information which is necessary for generation of an updated value of a parity record and which does not exist in a disk cache, is loaded into the disk cache.

The first mechanism loads that information which are necessary for generation of the updated value of the parity record and which is to be prepared in synchronism with a write request received from a processor, form a disk unit into the disk cache in synchronism with the write request. The first mechanism makes it possible to reduce or remove a process in which information having already been stored in the disk cache is again loaded into the disk cache from disk units.

The second mechanism loads, that information which is necessary for generation of the updated value of the parity record and which does not need to be prepared in synchronism with the write request received from the processor, from a disk unit into the disk cache in asynchronism with the write request. The second mechanism makes it possible to generate the updated value of the parity record with no intervention of the processor.

Further, the control unit may be provided with a mechanism which asynchronously performs a process for generation of the updated value of the parity record. Thereby, it is possible to perform the process for generation of the updated value of the parity record with no intervention of the processor.

Also, the control unit may be provided with a mechanism which asynchronously performs a process for write of the updated value of the parity record from the disk cache into a disk unit. Thereby, it is possible to perform the process for write of the updated value of the parity record from the disk cache into the disk unit with no intervention of the processor.

As mentioned above, the control unit of the embodiment performs a process for generation of an updated value of a parity record attendant upon a write request from a processor with no intervention of a processor. Therefore, the speed of a write process for a disk array using the data distribution by record can be increased. Also, the control unit of the embodiment loads only information necessary for acquisition of the updated value of the parity record into a disk cache. Therefore, the process for generation of the updated value of the parity record can be performed with high efficiency.

BRIEF DESCRIPTION OF THE DRAWINGS

FIG. 26 shows a flow chart of a process performed by a hit/miss judge part a;

FIG. 28 shows a flow chart of a process performed by a synchronous data load part a;

FIG. 30 shows a flow chart of a process performed by a synchronous data write part a;

FIG. 34 shows a flow chart of a process performed by an asynchronous record load part a;

FIG. 36 shows a flow chart of a process performed by an asynchronous record write part a;

FIG. 65 is a block diagram showing the outline of a parity group hit/miss judge process a;

FIG. 68 is a block diagram showing the outline of an asynchronous process a;

FIG. 72 is a block diagram showing the outline of a parity generation timing a;

FIG. 84 shows a flow chart of a process performed by a parity generation part a;

FIG. 87 is a table showing a relationship between mechanisms which solve problems included in the present invention and the first to fifth embodiments which are of the present invention.

DESCRIPTION OF THE PREFERRED EMBODIMENTS

Embodiments of the present invention will now be explained. In the present invention, a write action using a disk cache is performed for a disk array which uses the data distribution by record. In the following, therefore, explanation will be made of only the write action.

1. COMMON CONTENTS

First of all, explanation will be made of contents which are common to the embodiments.

1) Computer System

Figure 13:
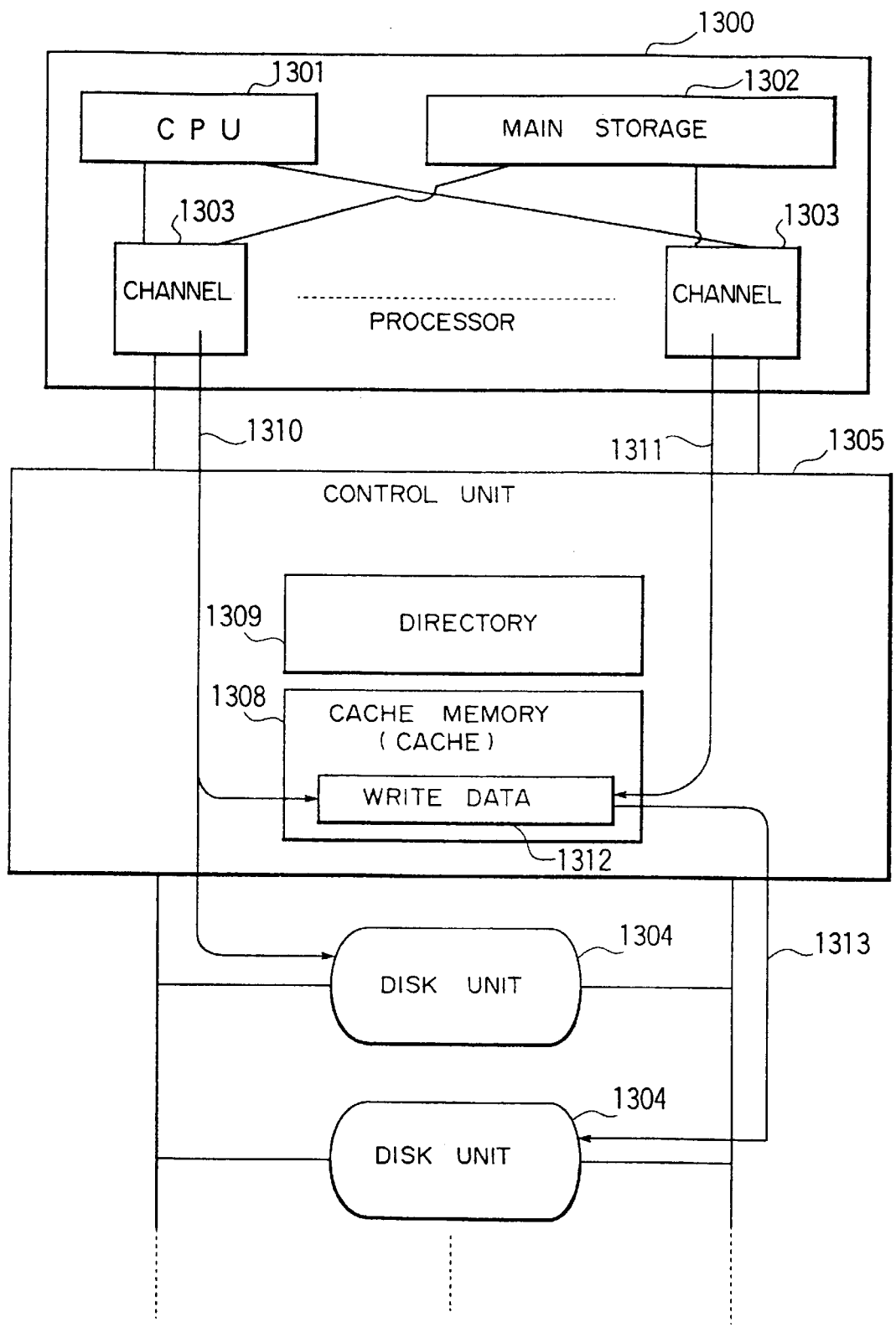
FIG. 13 is a block diagram showing a first example of the construction of a computer system which embodies the present invention.
Figure 17:
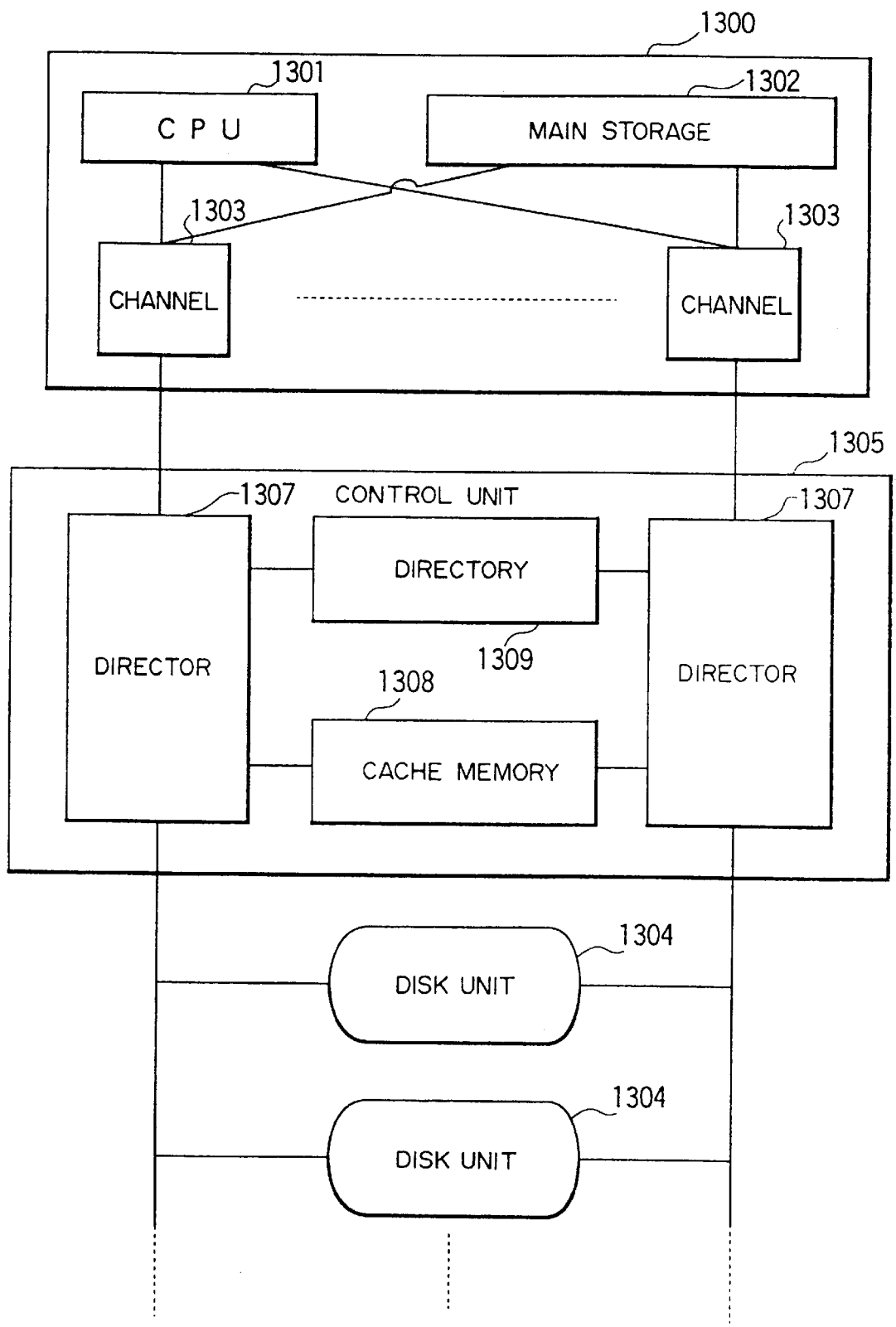
FIG. 17 is a block diagram showing a third example of the construction of a computer system which embodies the present invention.

FIG. 13 shows a first example of the construction of a computer system which embodies the present invention. The computer system is composed of a processor 1300, a control unit 1305 and more than one disk units 1304. The processor 1300 includes a CPU 1301, a main storage 1302 and channels 1303. The control unit 1305 includes a cache memory 1308 and a director 1309. That data among data stored in the disk units 1304 which has a higher access rate, is loaded into the cache memory (hereinafter simply abbreviated to cache) 1308. Management information of the cache 1308 is stored in the directory 1309. The control unit 1305 makes the transfer of data between the processor 1300 and the disk units 1304 or between the cache 1308 and the disk units 1304 in accordance with a read/write request from the processor 1300. The control unit further performs a read/write action between the disk units 1304 and the cache 1308 in asynchronism with the read/write request from the processor 1300. However, it should be noted that the present invention can be applied to a construction, as shown in FIG. 17, in which a control unit 1305 includes two or more directors 1307 and each director 1307 accepts a read/write request from a processor 1300 to perform a read/write action.

Figure 14:
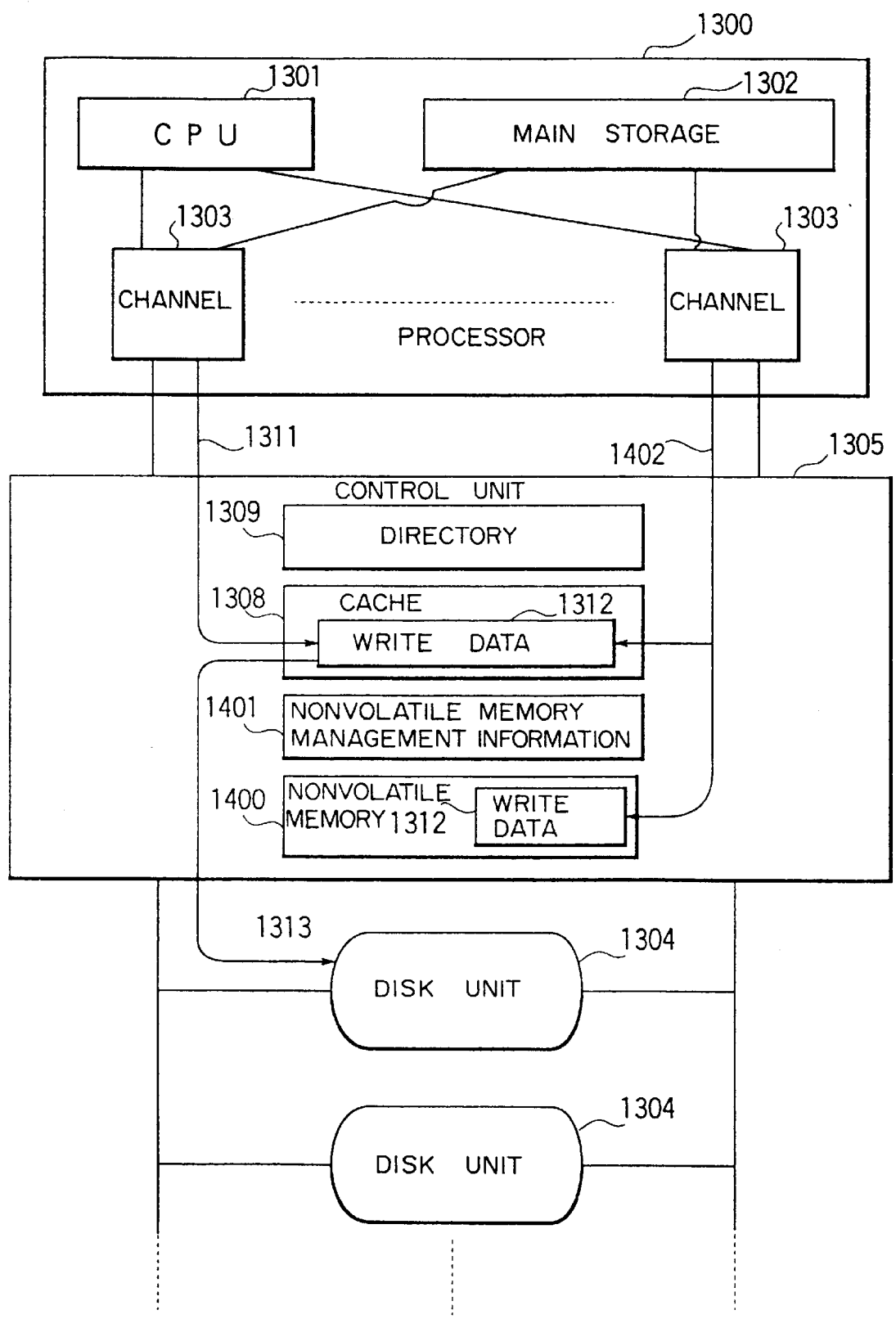
FIG. 14 is a block diagram showing a second example of the construction of a computer system which embodies the present invention.

FIG. 14 shows a second example of the construction of a computer system which embodies the present invention. The construction of FIG. 14 is different from the construction of FIG. 13 in that a control unit 1305 further includes a nonvolatile memory 1400 and nonvolatile memory management information 1401. The nonvolatile memory 1400 is constructed with a nonvolatile medium. Like a cache 1308, the nonvolatile memory 1400 is loaded with that data among data stored in disk units 1304 which has a higher access rate. The nonvolatile memory management information 1401 too is constructed with a nonvolatile medium and management information of the nonvolatile memory 1400 is stored into the nonvolatile memory management information 1401.

In the computer systems shown in FIGS. 13 and 14, the control unit 1305 can select either one of two actions based on first and second methods, which will be mentioned hereinbelow, as an action for a write request accepted from the processor 1300.

The first method is a write through action or process 1301 shown in FIG. 13. In the write through action 1310, the control unit 1305 writes, write data 1312 received from the processor 1300, directly into a disk unit 1304 and further writes the same write data 1312 into the cache 1308. The write through action 1310 is not shown in FIG. 14. However, in the construction shown in FIG. 14 too, the control unit 1305 can perform the write through action 1310.

The second method is a fast write action or process 1311 shown in FIGS. 13 and 14. In the fast write action 1311, the control unit 1305 completes a write process at a state of time when write data 1312 received from the processor 1300 is written into the cache 1308. In this case, it is possible to complete the write request without making access to a disk unit 1304. Therefore, a high-speed process can be realized. The write data 1312 written in the cache 1308 is written into a disk unit 1304 in asynchronism with the write request from the processor 1300 during a time when the control unit 1305 is idle. Such a write process is termed a write after process 1313.

In the computer system shown in FIG. 14, the control unit 1305 can further perform a reliable fast write action or process 1402. The reliable fast write action 1402 is different from the fast write action 1311 in that the write data 1312 is also written into the nonvolatile memory 1400. Thereby, the write data 1312 is ensured even if the cache 1308 breaks down before the control unit 1305 performs the write after process 1313.

2) Store Format of Data

Next, the store format of data in a disk array using the data distribution by record, to which the present invention is directed, will be explained by use of FIGS. 15 and 16.

Figure 15:
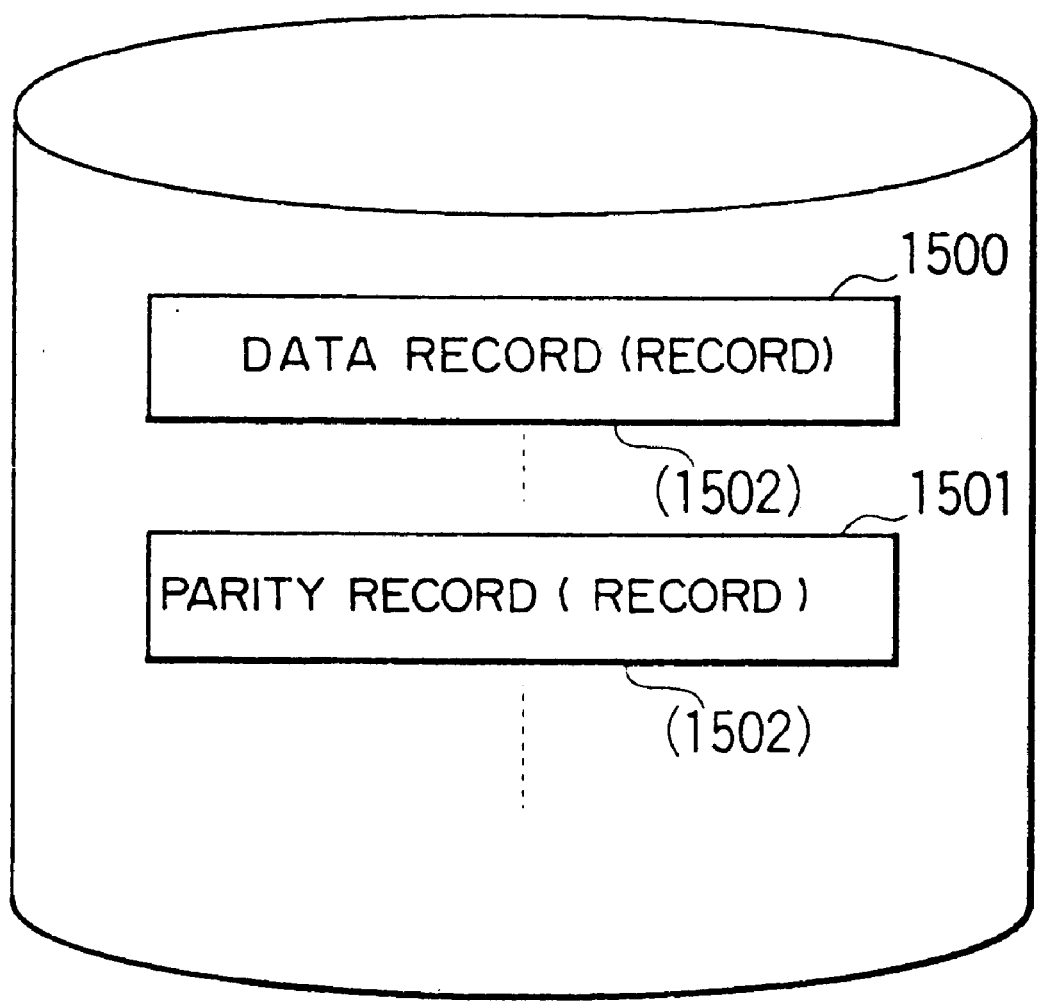
FIG. 15 is a diagram for explaining the kinds of records which can be stored in a disk unit.

As shown in FIG. 15, the unit of data read from or written in a disk unit 1304 is called a record 1502. Two kinds of records 1502, that is, a data record 1500 and a parity record 1501 can be stored in disk units 1304 of the present invention. The data record 1500 is a record in which data read or written by the processor 1300 is stored. On the other hand, the parity record 1501 is a record 1502 which is used for a process for recovery from an error which may occur in any disk unit 1304.

Figure 16:
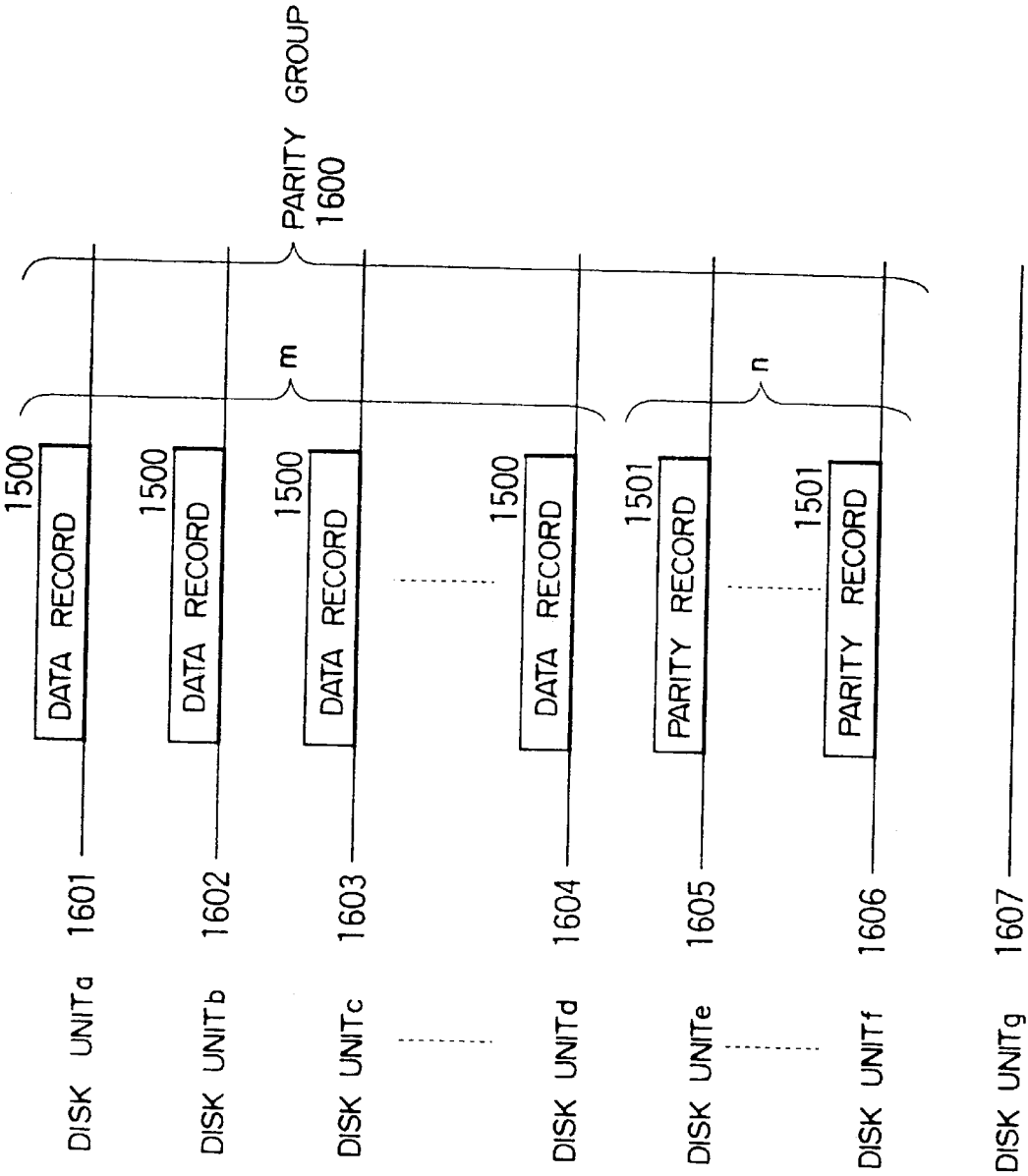
FIG. 16 is a diagram for explaining records which constitute a parity group.

FIG. 16 shows the construction of a parity group 1600 in the disk array using the data distribution by record. Data records 1500 are stored in m corresponding disk units 1304 inclusive of disk units a 1601 to d 1604, respectively. From the m data records 1500 are generated n parity records 1501 which are in turn stored into n corresponding disk units e 1605 to f 1606, respectively. In FIG. 16, the parity group 1600 is constructed by the m data records 1500 and the n parity records 1501. Generally, as for a parity group 1600 including n parity records 1501, the contents of all records 1502 in the parity group 1600 can be recovered even if n disk units 1304 among (m+n) disk units having the records in the parity group 1600 stored therein break down. The present invention is also applicable to the case where the assembly of disk units 1304 stored records forming a parity group 1600 or the number (m+n) of records 1502 forming a parity group 1600 as shown in FIG. 16 is different in each parity group 1600.

Embodiments as mentioned later on will be explained by virtue of the parity group 1600 shown in FIG. 16.

Figure 18:
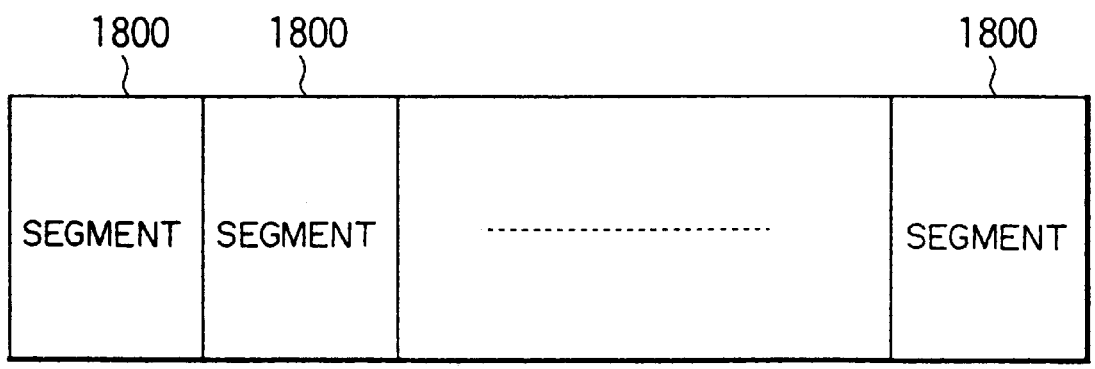
FIG. 18 is a diagram for explaining the construction of a cache.

FIG. 18 shows the construction of the cache 1308. The cache 1308 includes a plurality of segments 1800. One record 1502 on a disk unit 1304 is stored in each segment 1800.

Figure 19:
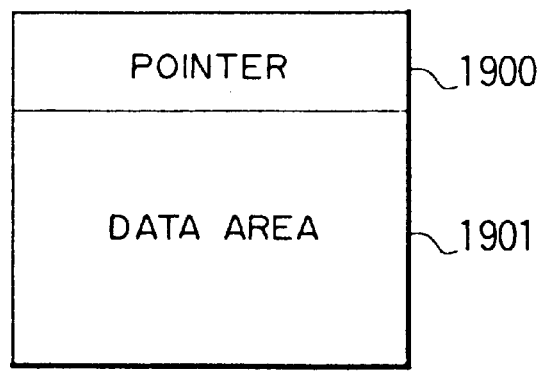
FIG. 19 is a diagram for explaining the construction of a segment.

FIG. 19 shows the construction of each segment 1800. The segment 1800 is composed of a pointer 1900 and a data area 1901. The pointer is used when empty segments 1800 are to be linked with each other. The data or parity record 1502 is stored in the data area 1901.

Figure 20:
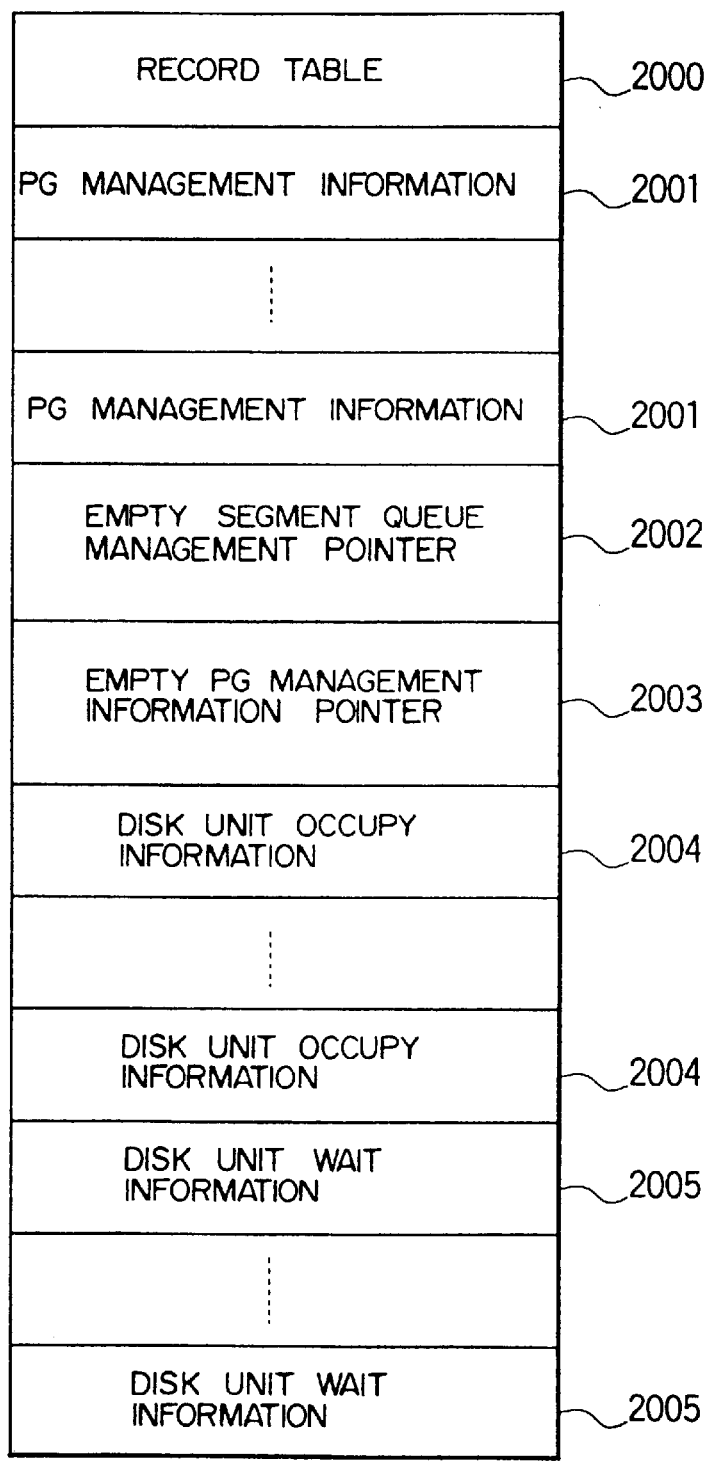
FIG. 20 is a diagram for explaining the construction of a directory.

FIG. 20 shows the construction of the directory 1309. A record table 2000 is information indicative of whether or not records 1502 are stored in the cache 1308. P (parity group) management information 2001 is information for managing records 1502 in a parity group 1600 stored in the cache 1308. An empty segment queue management pointer 2002 and an empty PG management information pointer 2003 are pointers for managing segments 1800 and PG management information 2001 which are in empty conditions, respectively. As disk unit occupy information 2004 is stored, for each disk unit 1304, information indicating that each disk unit 1304 is operating. As disk unit wait information 2005 is stored, for each disk unit 1304, information indicating that a read/write request from the processor 1300 is in a wait condition.

Figure 21:
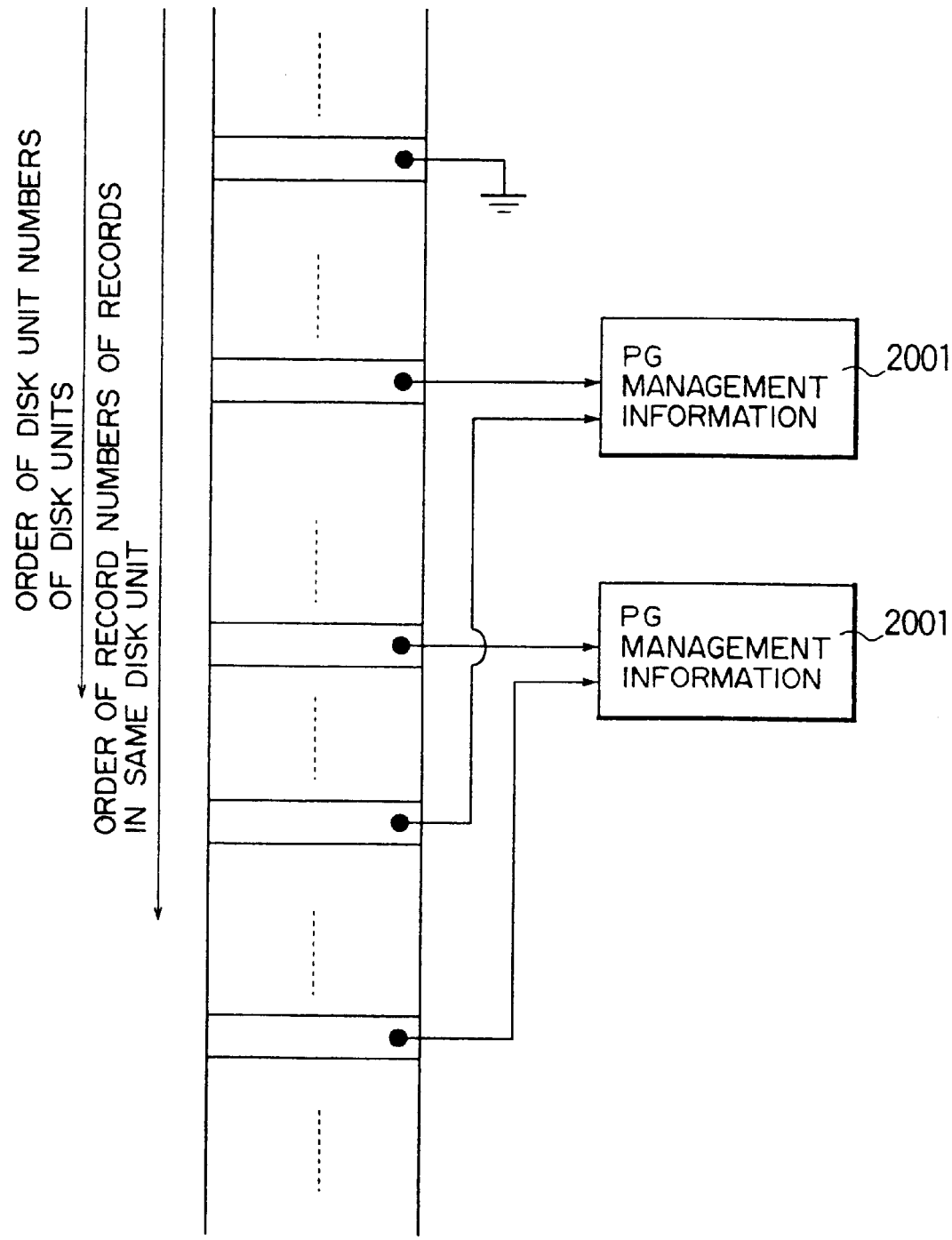
FIG. 21 is a diagram for explaining the construction of a track table.

FIG. 21 shows the construction of the record table 200. The record table 200 has entries which correspond to records 1502 included in the disk units 1304, respectively. The entries are arranged in the order of the disk unit numbers of the disk units 1304 and in the order of the record numbers of records 1502 in the same disk unit 1304. In the case where none of records 1502 in the parity groups 1600 which the record 1502 belongs to are stored in the cache 1308, the content of the entry of the record 1502 takes a null value. On the other hand, in the case where any one of the records 1502 in the parity groups 1600 which the record 1502 belongs to is stored in the cache 1308, the entry of the record 1502 indicates the PG management information 2001.

Figure 22:
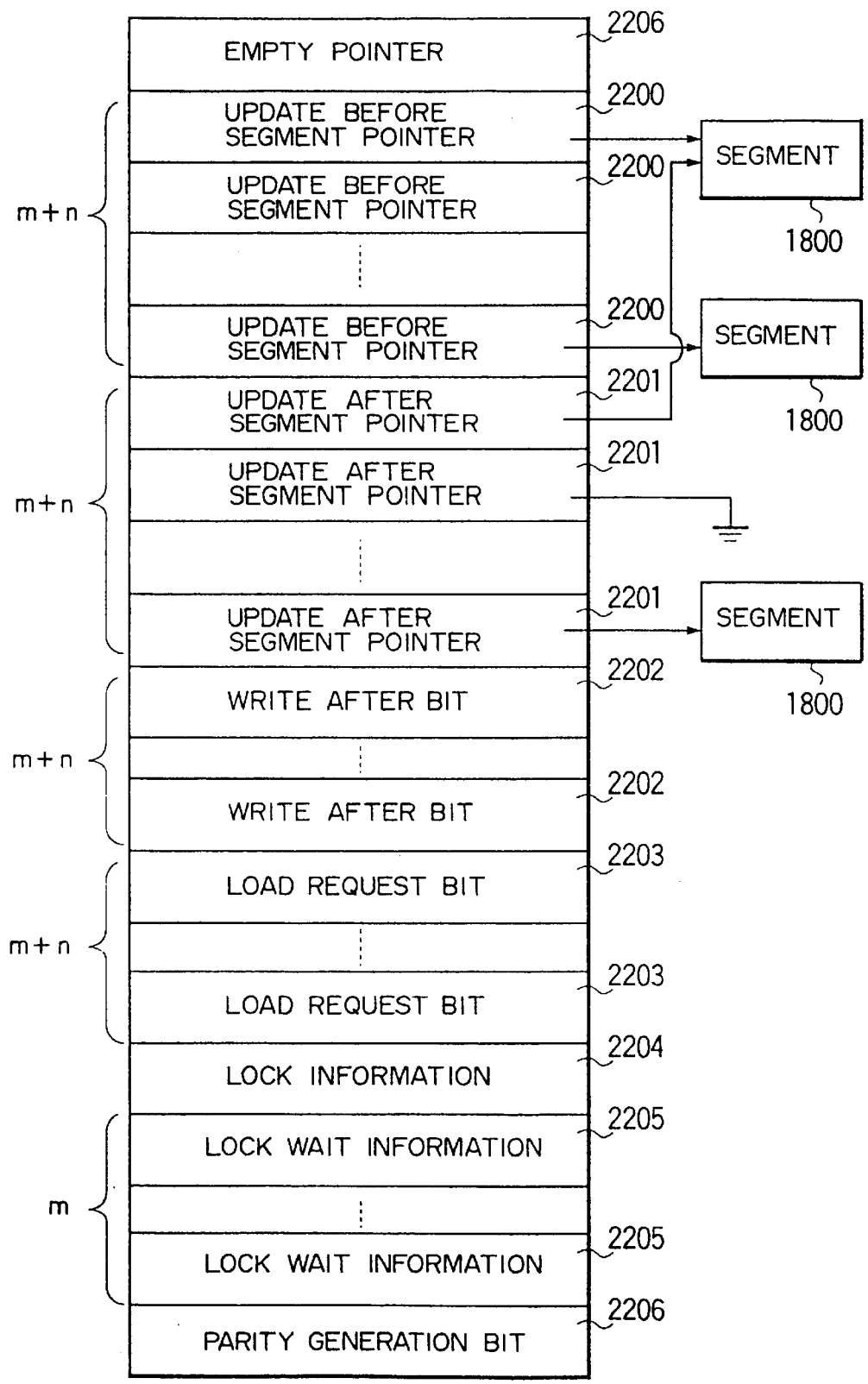
FIG. 22 is a diagram for explaining the construction of parity group (PG) management information.

FIG. 22 shows the construction of the PG management information 2001. An empty pointer 2206 is used for linking empty management information 2202 with each other. An update before segment pointer 2200 indicates a segment 1800 in which the update before content of a record 1502 corresponding to the entry is stored. An update after segment pointer 2201 indicates a segment in which the update after value of a record 1502 corresponding to the entry is stored. In the case where both the update before segment pointer 2200 and the update after segment pointer 2201 take null values, it is meant that the corresponding record 1502 is not stored in the cache 1308. A write after bit 2202 is information indicating that a write after process 1313 for a record 1502 corresponding to the entry should be performed. A load request bit 2203 is information indicating that a record 1502 corresponding to the entry should be loaded into the cache 1308. Since the update before segment pointer 2200, the update after segment pointer 2201, the write after bit 2202 and the load request bit 2203 are provided corresponding to each record 1502, the PG management information 2001 includes each of those data which is (m+n) in number equal to the number of records 1502 included in the corresponding parity group 1600. Lock information 2204 indicates that the records 1502 in the parity group 1600 corresponding to the PG management information 2001 under consideration are being operated. In a write action for the disk array using the data distribution by record, not only a data record 1501 but also all parity records 1501 are updated. Therefore, it is required that a write action for the same parity group 1600 is sequentially performed (or serialized) in accordance with the lock information 2204. Lock wait information 2205 is information indicating that a read/write request from the processor 1300 is in a wait condition. The lock wait information 2205 is provided for ensuring that the write action will be performed sequentially. A parity generation bit 2206 is information indicating that records 1502 necessary for generation of updated values of parity records 1501 belonging to the parity group 1600 corresponding to the PG management information 2001 under consideration are stored in the cache 1308.

Figure 23:
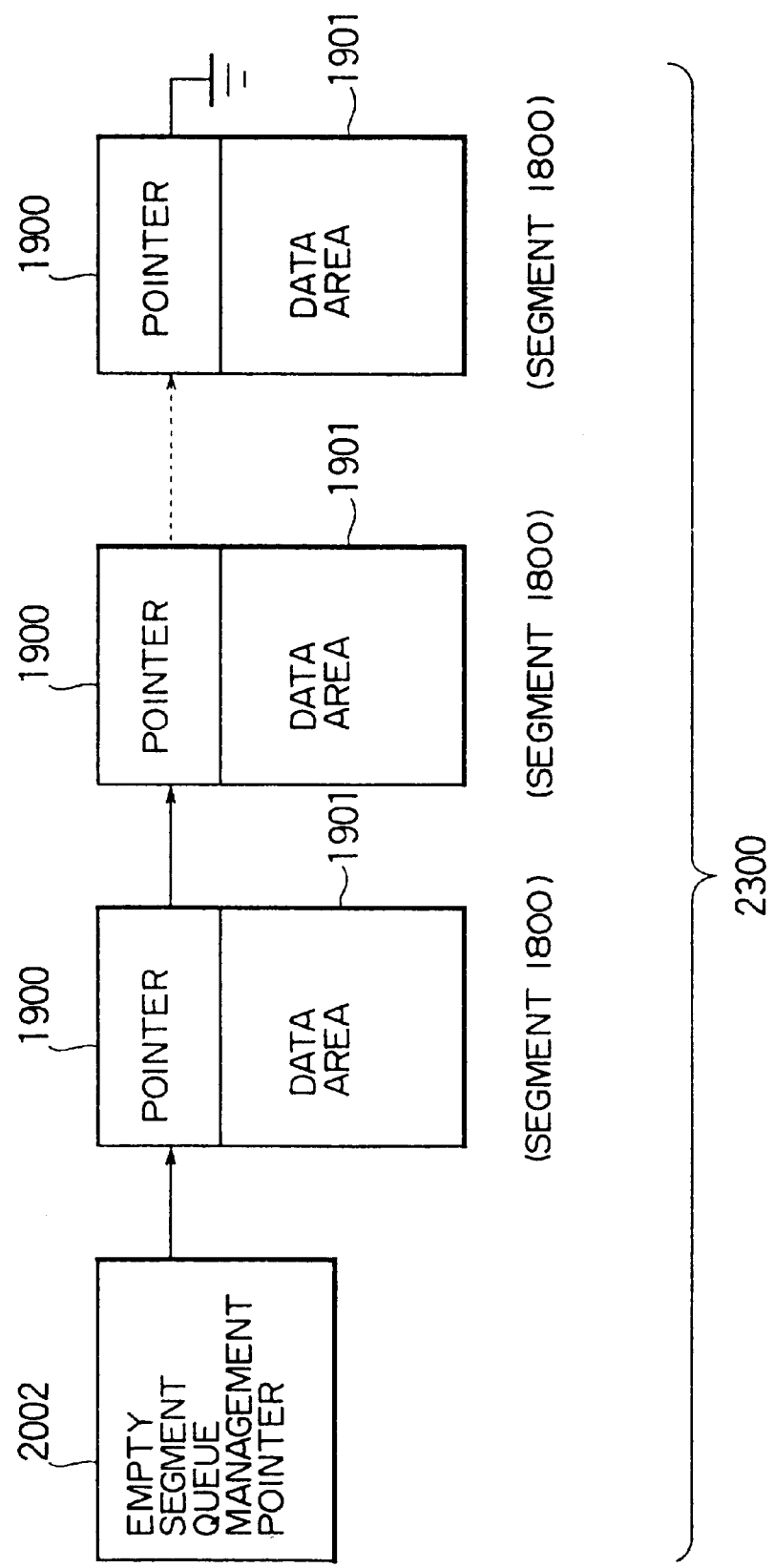
FIG. 23 is a diagram for explaining the structure of an empty segment queue.

FIG. 23 shows the construction of an empty segment queue 2300. A leading one 1800 of segments 1800 the data areas 1901 of which are in empty conditions, is pointed by the empty segment queue management pointer 2002. A subsequent segment 1800 is pointed by a pointer 1900 included in the preceding segment 1800.

Figure 24:
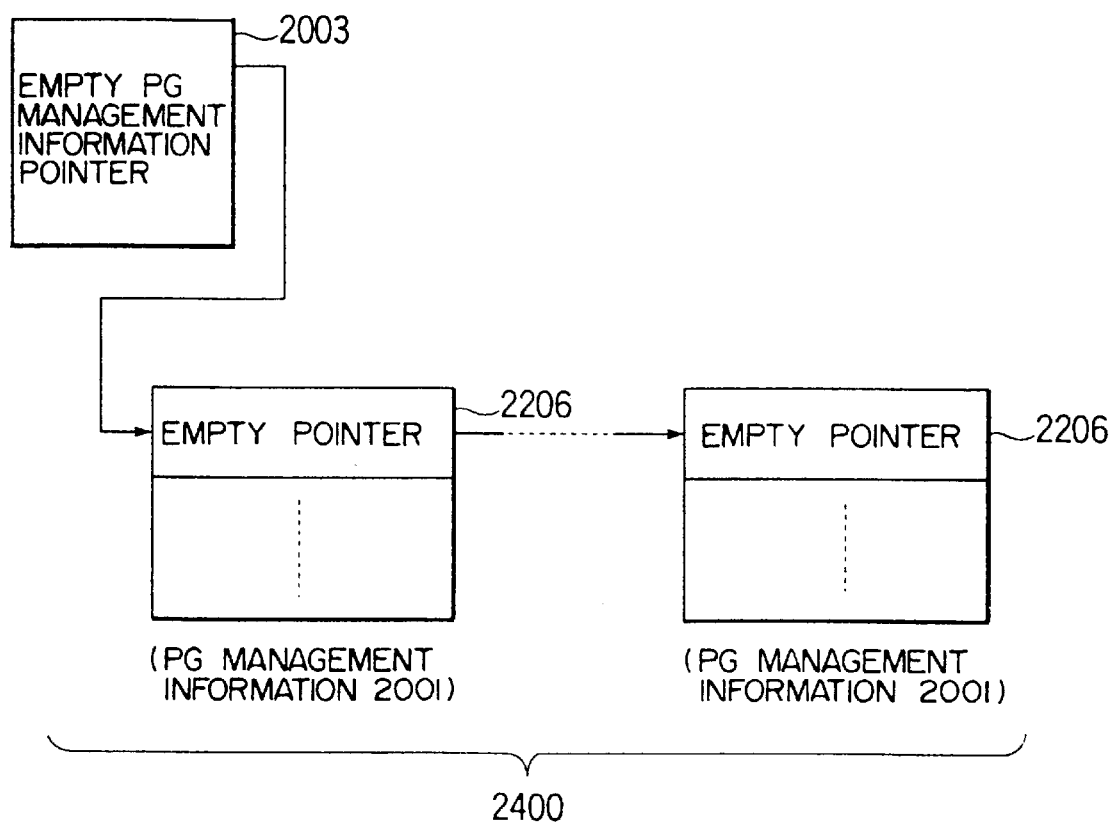
FIG. 24 is a diagram for explaining the construction of an empty PG management information queue.

FIG. 24 shows the construction of an empty PG management information queue 2400. Leading one 2001 of PG management information 2001 which are in empty conditions, is pointed by the empty PG management information pointer 2003. Subsequent PG management information 2001 is pointed by an empty pointer 2206 included in the preceding PG management information 2001.

Figure 25:
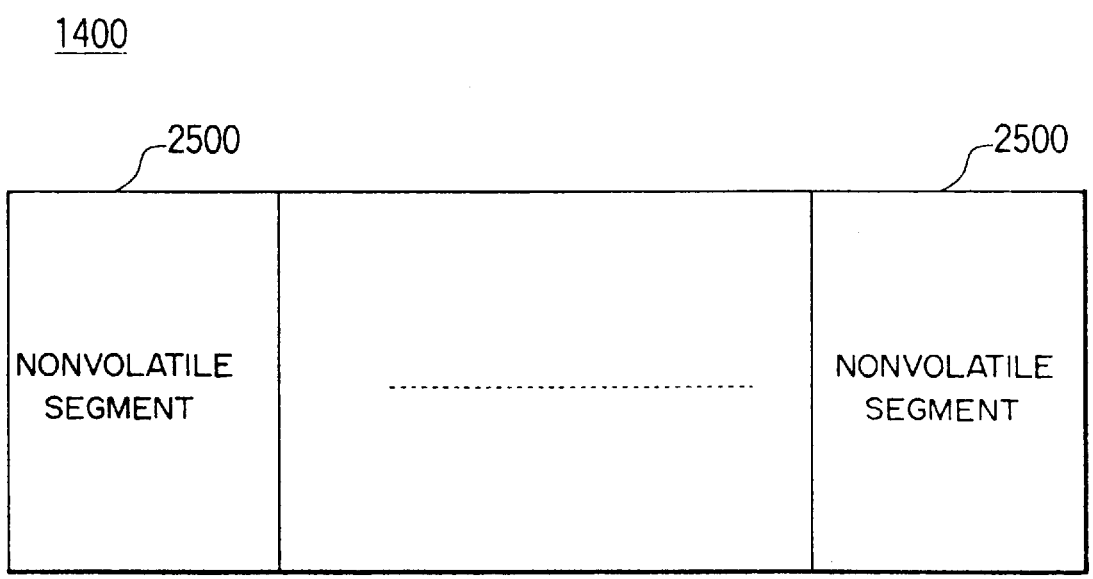
FIG. 25 is a diagram for explaining the construction of a nonvolatile memory.

FIG. 25 shows the construction of the nonvolatile memory 1400. The nonvolatile memory 1400 includes a plurality of nonvolatile segments 2500. The construction of each nonvolatile segment 2500 is similar to that of the segment 1800 shown in FIG. 19. Also, the construction of the nonvolatile memory management information 1401 is similar to that of the directory 1309 shown in FIG. 20.

3) Outline and Problems

Figure 1:
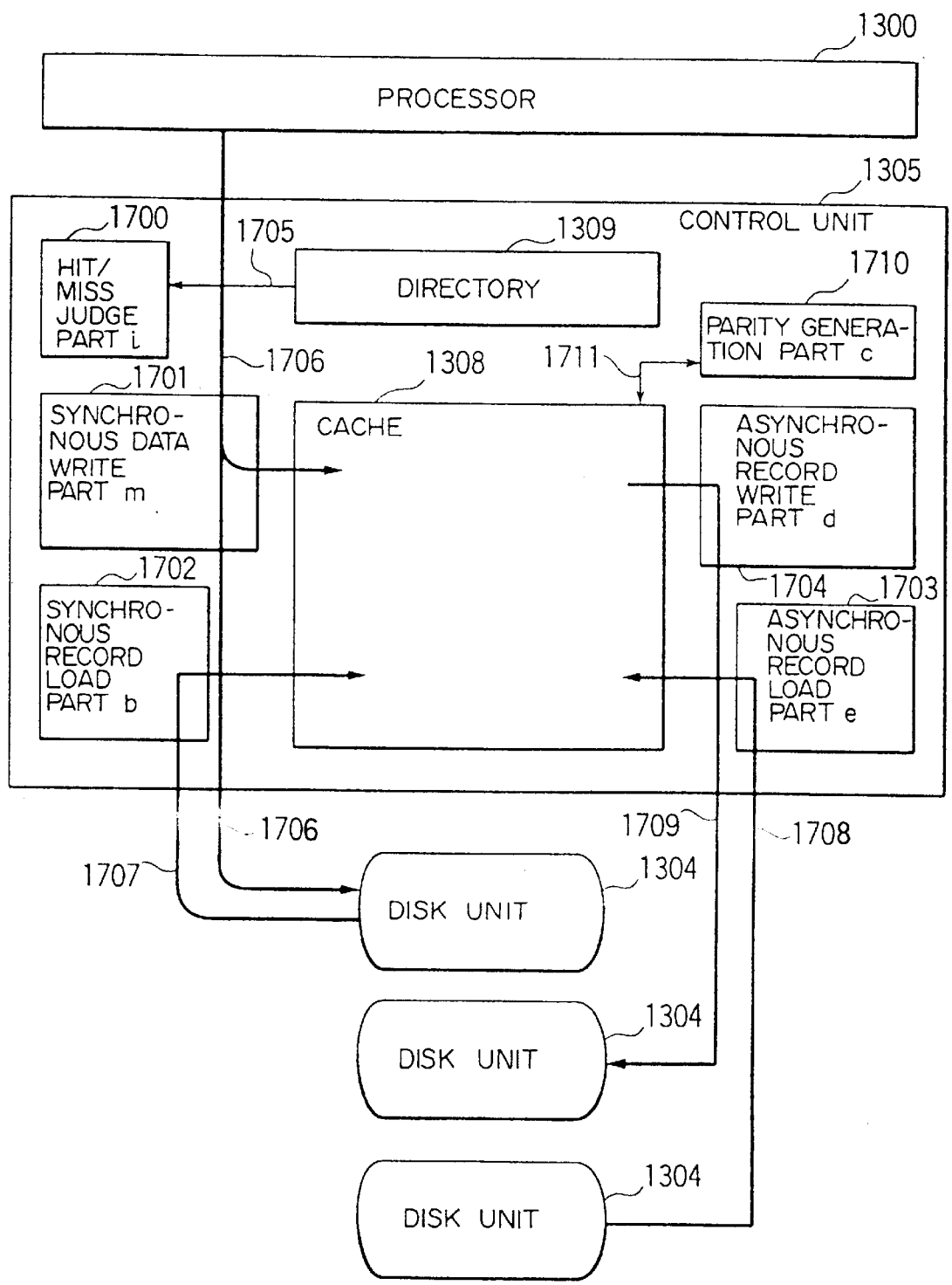
FIG. 1 is a block diagram showing the outline of the present invention.

The outline of the present invention will be explained by use of FIG. 1.

When a control unit 1305 receives a write request from a processor 1300, a hit/miss judge part i 1700 refers to a directory 1309 (in conjunction with a data line 1705) to check whether or not information necessary for generation of an updated value of a parity record 1501 (see FIG. 15) exists in a cache 1308.

At this time, in the case where the information necessary for generation of the updated value of the parity record 1501 is to be prepared in synchronism with the write request, the control unit 1305 first loads the necessary information into the cache 1308 by use of a synchronous record load part b 1702 (in conjunction with a data line 1707).

Next, the control unit 1305 receives write data 1312 for a data record 1500 from the processor 1300 by use of a synchronous data write part m 1701. At this time, either a write through process 1310 (FIG. 13), a fast write process 1311 (FIG. 13 or 14) or a reliable fast write process 1402 (FIG. 14) can be applied for the write request. If the information necessary for generation of the updated value of the parity record 1501 (FIG. 15) is complete in the cache 1308, it is possible to generate the updated value of the parity record 1501 (in conjunction with a data line 1706).

The updated value of the parity record 1501 may also be generated using a parity generation part c 1710 (in conjunction with a data line 1711) after the write request from the processor 1300 has been completed.

In the case where the information necessary for generation of the updated value of the parity record 1501 may be prepared in asynchronism with the write request from the processor 1300, the control unit 1305 loads the necessary information into the cache 1308 by use of an asynchronous record load part e 1703. With this load process, the parity record 1501 can be generated (in conjunction with a data line 1708) at a stage of time when the information necessary for generation of the parity record 1501 becomes complete in the cache 1308. In this case too, the updated value of the parity record 1501 may be generated using the parity generation part c 1710 (in conjunction with the data line 1711) after a process for loading the information necessary for generation of the updated value of the parity record 1501 has been completed.

Using an asynchronous record write part d 1704, the control unit 1305 performs a write after process 1313 (FIG. 13 or 14) for the updated value of the parity record 1501 or the data record 1500 written in the cache 1308 through the fast write process 1311 (FIG. 13 or 14) or the reliable fast write process 1402 (FIG. 14). In this case too, in parallel with generation of the updated value of the parity record 1501 from the information necessary for generation of the updated value of the parity record 1501, the control unit 1305 can write the updated value into a disk unit 1304 (in conjunction with a data line 1709).

Though the above is the outline of the present invention, the detailed operation of the control unit 1305 differs depending on specific strategies for the following problems.

Problem 1 - - - This concerns a method of selecting information necessary for generation of an updated value of a parity record 1501 (FIG. 15), that is, which information should be used to generate the updated value of the parity record.

Problem 2 - - - This concerns the asynchronization of a process associated with the generation of the updated value of the parity record 1501. By performing the process associated with the generation of the updated value fop the parity record 1501 in asynchronism with the processor, the process associated with the generation of the updated value of the parity record is caused not to be included in a response time seen from the processor.

Problem 3 - - - This concerns the timing of generation of the updated value of the parity record 1501, that is, which timing the updated value of the parity record 1501 should be generated at.

4) Parity Group Hit/Miss Judge Process

First, in the present invention, three methods as mentioned hereinbelow by (a) to (c) are provided as means for solution of the problem 1, that is, the method of selection of the information necessary for generation of the updated value of the parity record 1501.

(a) In a parity group hit/miss judge process a 6500, to generate an updated value of a parity record 1501 is acquired from an update before value of a data record 1500 designated as the object of write and an update before value of the parity record 1501 are necessary. For that purpose, the hit/miss condition 6502 (or the presence/absence in a cache 1308) of the data record 1500 (1502) designated as the object of write from the processor 1300 and the hit/miss condition 6501 of the parity record 1501 (1502) are judged while referring to a directory 1309 (in conjunction with a data line 6503). As a result, a record 1502 among those records 1502 which is missing, is loaded into the cache 1308 (in conjunction with a data line 6504).

Figure 66:
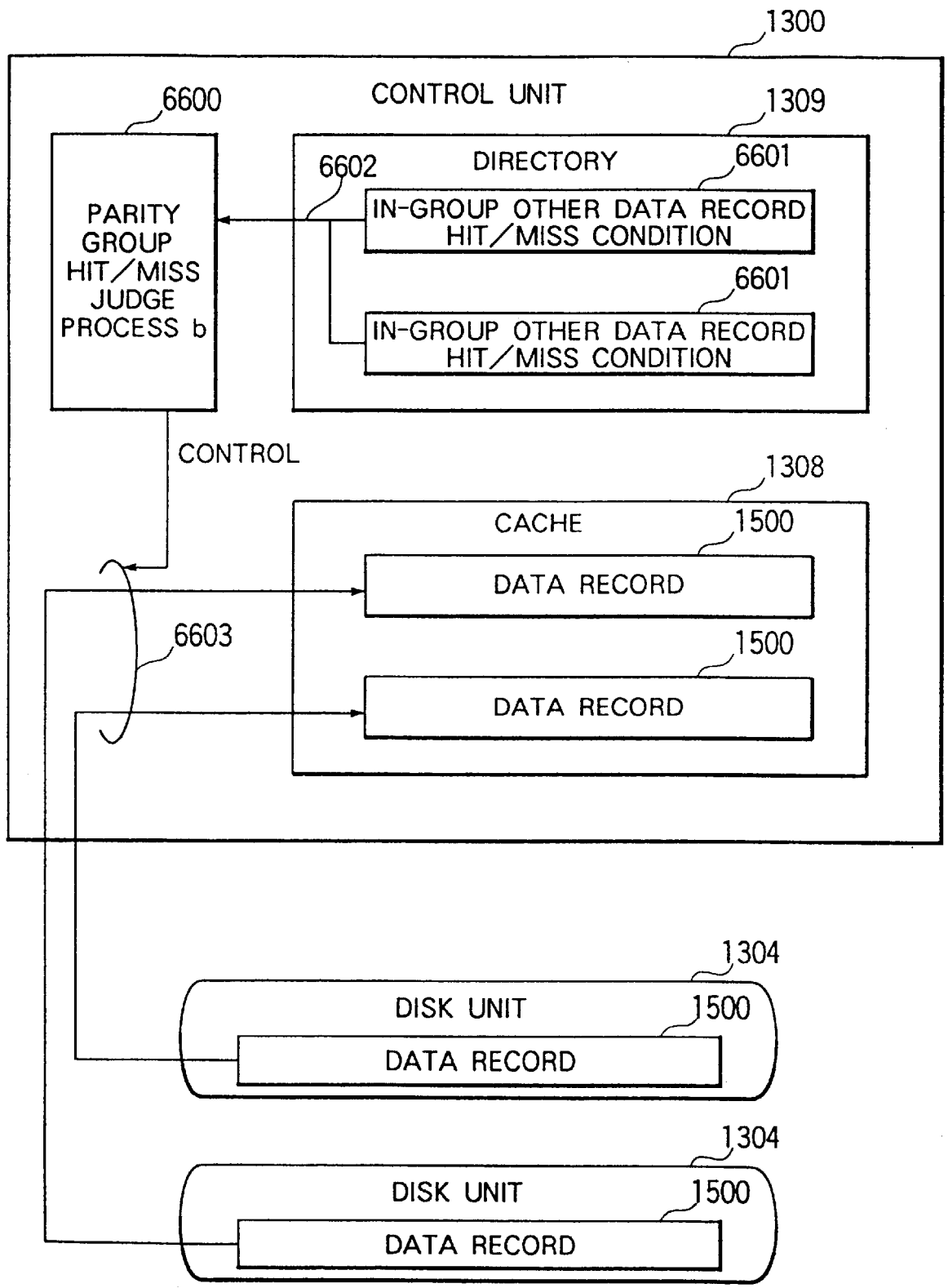
FIG. 66 is a block diagram showing the outline of a parity group hit/miss judge process b.

(b) In a parity group hit/miss judge process b 6600 shown in FIG. 66, to generate an updated value of a parity record 1501, other data records 1500 included in a parity group 1600 (FIG. 16) to which a data record 1500 designated as the object of write belongs are necessary. For that purpose, the hit/miss conditions 6601 of the other data records 1500 (1502) included in the parity group 1600 to which the data record 1500 designated as the write object from the processor 1300 belongs, are judged while referring to a directory 1309 (in conjunction with a data line 6602). As a result, a record 1502 among those records 1502 which is missing, is loaded into a cache 1308 (in conjunction with a data line 6603).

Figure 65:
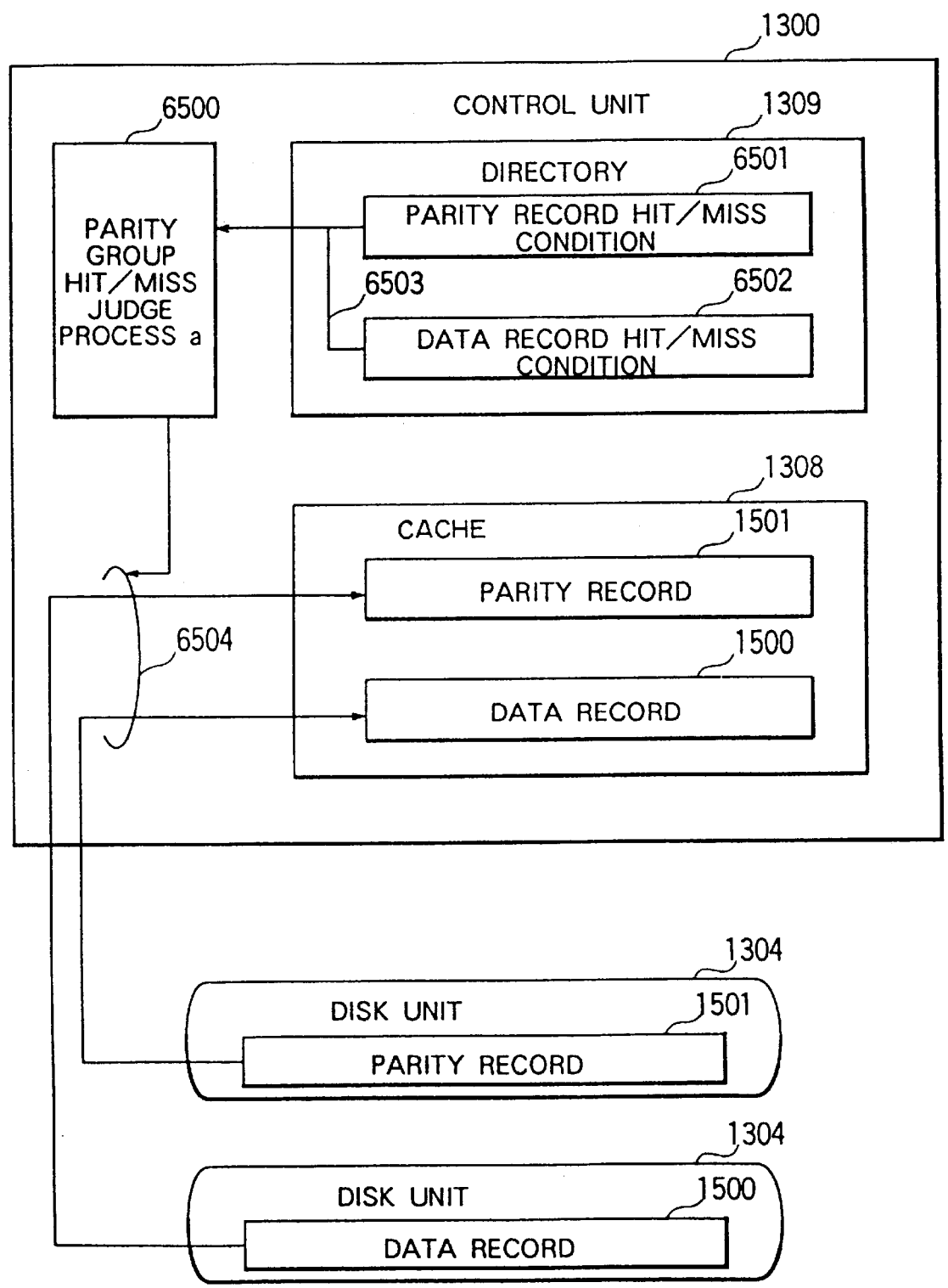
Figure 67:
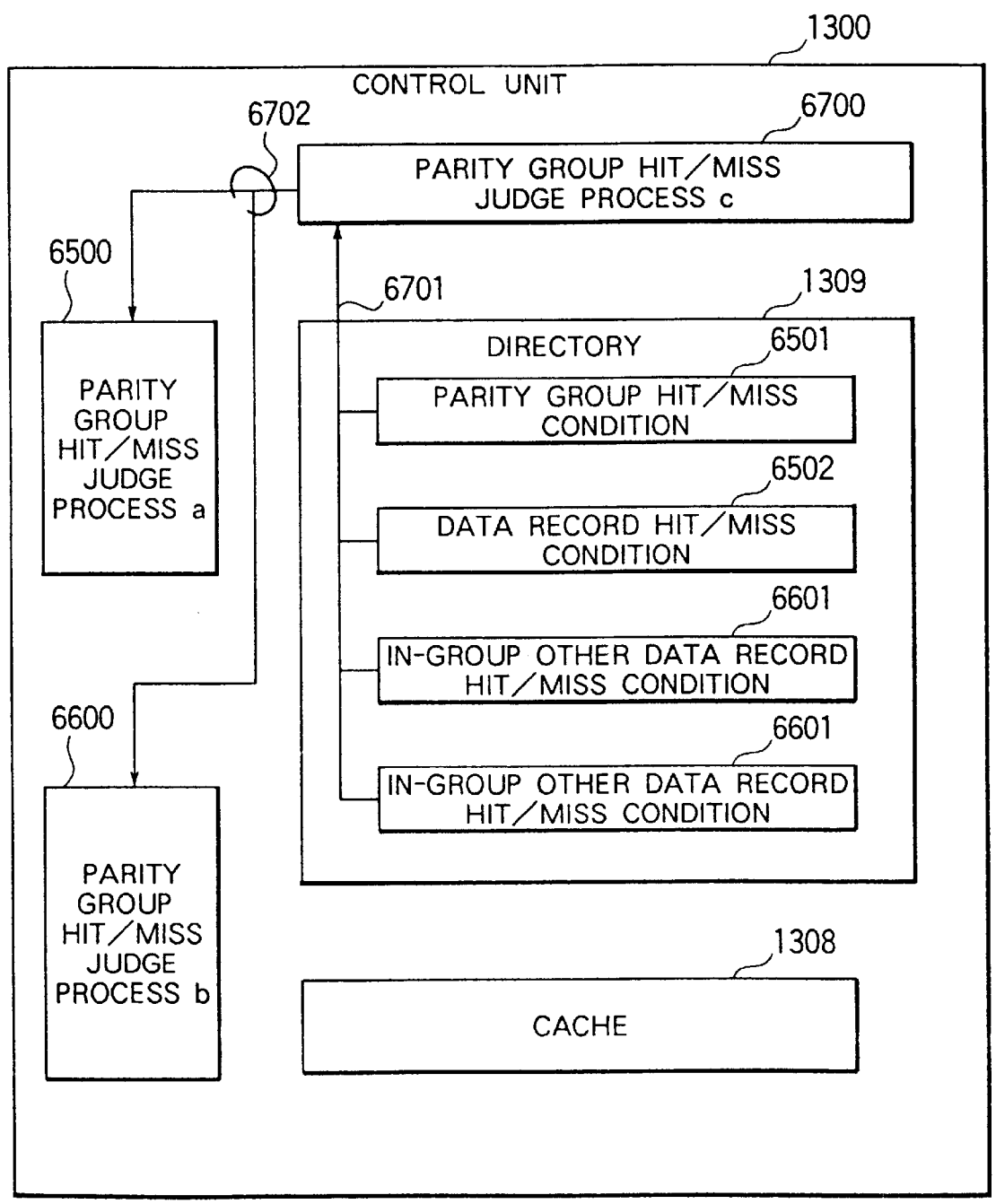
FIG. 67 is a block diagram showing the outline of a parity group hit/miss judge process c.

(c) In a parity group hit/miss judge process c 6700 shown in FIG. 67, the hit/miss condition 6502 of an update before value of a data record 1500 designated as the object of write, the hit/miss condition of an updated before value of a parity record 1501 and the hit/miss conditions 6601 of other data records 1500 included in a parity group 1600 to which the data record 1500 designated as the object of write from the processor 1300 belongs, are judged (in conjunction with a data line 6701). As a result, one of the parity group hit/miss judge process a 6500 and the parity group hit/miss judge process b 6600 shown in FIGS. 65 and 66 which is advantageous from an aspect of performance, is selected and performed. For example, in the case where all other data records 1500 included in the parity group 1600 to which the data record 1500 designated as the object of write belongs exist in a cache 1308 and the parity record 1501 does not exist in the cache 1308, the selection of the parity group hit/miss judge process b 6600 rather than the parity group hit/miss judge process a 6500 is advantageous in an aspect of efficiency.

5) Asynchronous Process

Nest, in the present invention, four kinds of asynchronous processes as mentioned hereinbelow by (a) to (d) are provided as means for solution of the problem 2, that is, means for asynchronization.

Figure 68:
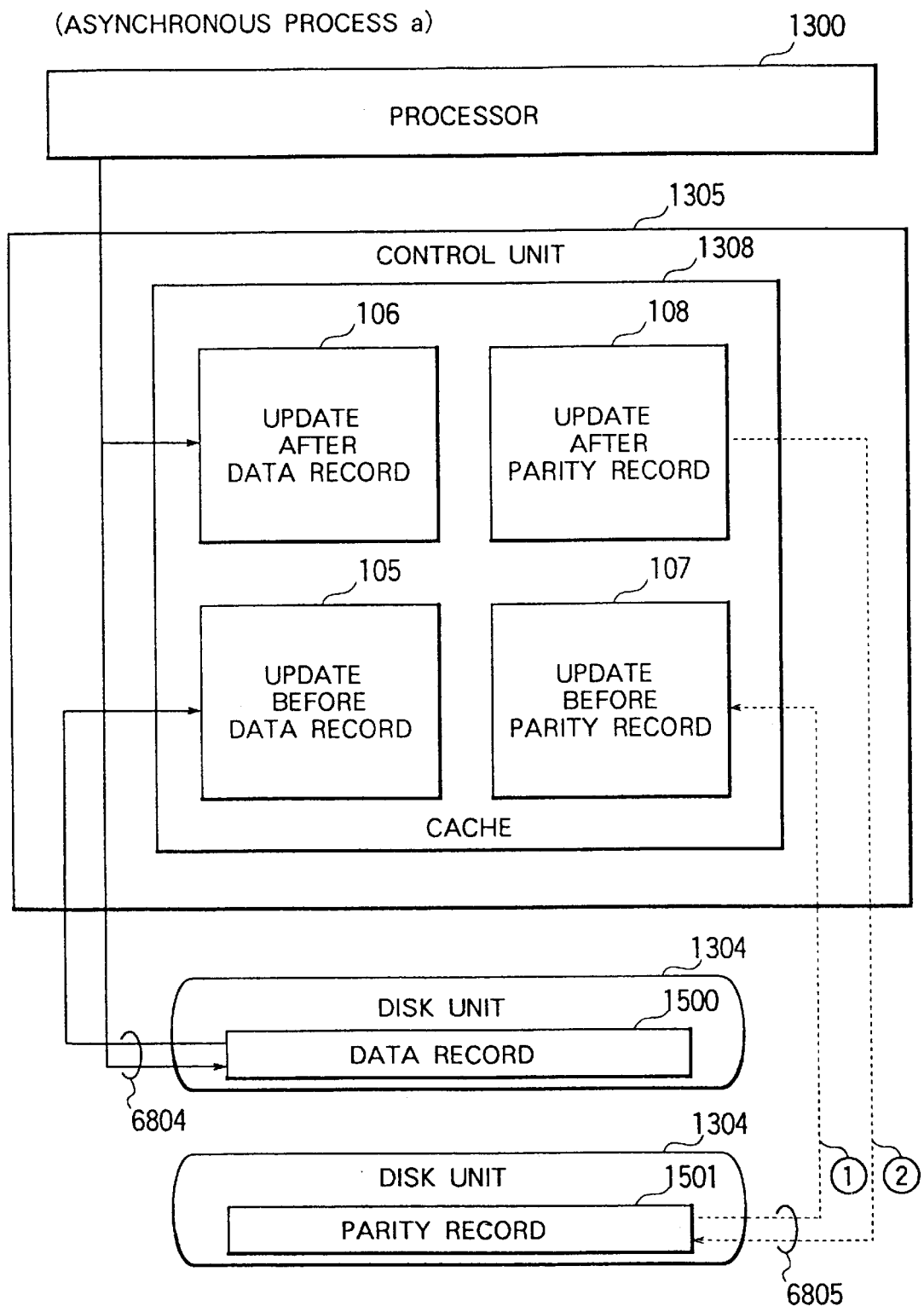

(a) In an asynchronous process a 6800 shown in FIG. 68, an update after parity record 108 (or an update after value of a parity record) is generated by use of an update before data record 105 (or an update before value of a data record) and an update before parity record 107 (or an update before value 6803 of the parity record). Accordingly, this process is used in combination with the parity group hit/miss judge process a 6500. Further, the asynchronous process a 6800 is used (in conjunction with a data line 6804) in the case where a process for updating an update after data record 106 (or an updated value of a data record 1500 designated as the object of write) on a disk unit 1304 is to be performed in synchronism with a write request from a processor 1300. If the update before data record 105 does not exist in a cache 1308, a process for loading the update before data record 105 into the cache 1308 must be performed (in conjunction with a data line 6804) in synchronism with the write request from the processor 1300. Therefore, two processes as mentioned hereinbelow are asynchronously performed (in conjunction with a data lines 6805):

1 a load process in the case where the update before parity record 107 does not exist in the cache 1308; and 2 a process for write of the update after parity record 108 into a disk unit 1304.

Figure 69:
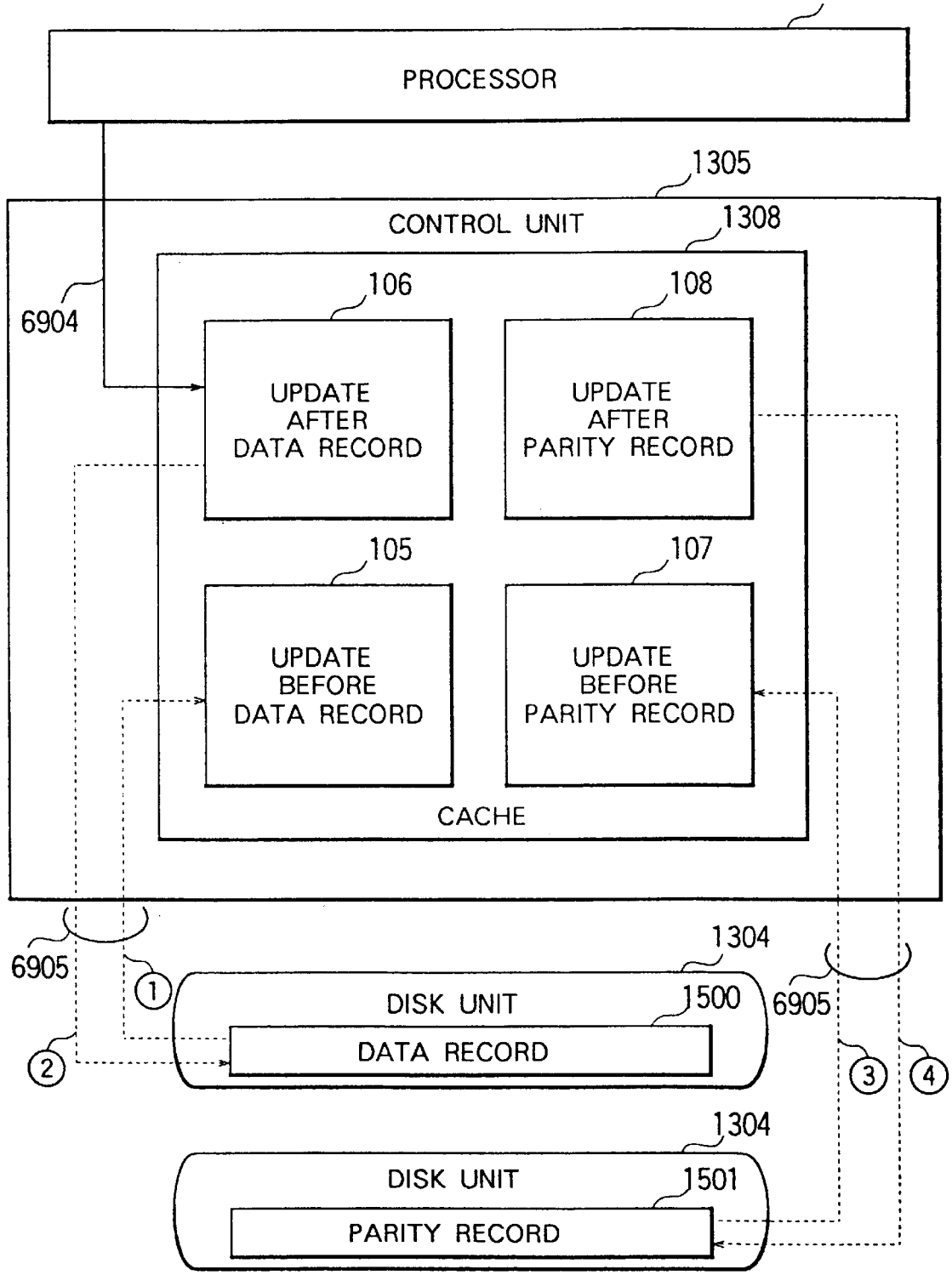
FIG. 69 is a block diagram showing the outline of an asynchronous process b.

(b) In an asynchronous process b 6900 shown in FIG. 69, an update after parity record 108 is generated by use of an update before data record 105 and an update before parity record 107. Accordingly, this process too is used in combination with the parity group hit/miss judge process a 6500. Further, the asynchronous process b 6900 too is used (in conjunction with a data line 6904) in the case where a process for updating an update after data record 106 on a disk unit 1304 is to be performed in synchronism with a write request 6904 from a processor 1300. Therefore, four processes as mentioned hereinbelow are asynchronously performed (in conjunction with a data lines 6905):

1 a load process in the case where the update before data record 105 does not exist in a cache 1308;

2 a process for write of the update after data record 106 into a disk unit 1304;

3 a load process in the case where the update before parity record 107 does not exist in the cache 1308; and 4 a process for write of the update after parity record 108 into a disk unit 1304.

Figure 70:
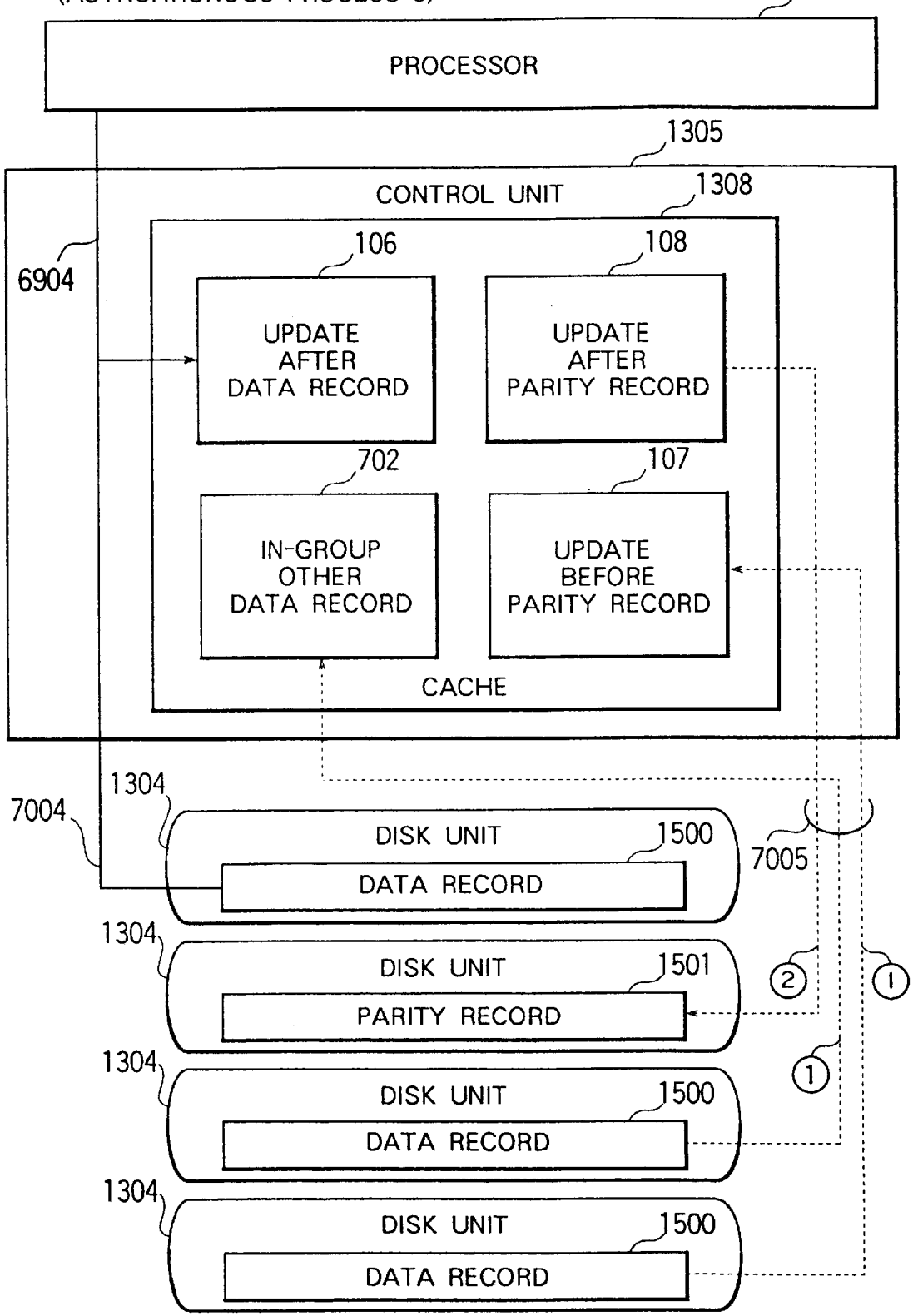
FIG. 70 is a block diagram showing the outline of an asynchronous process c.

(c) In an asynchronous process c 7000 shown in FIG. 70, an update after parity record 108 is generated by use of in-group other data records 702 (other data records 1500 included in a parity group 1600 to which a data record 1500 designated as the object of write belongs). Accordingly, this process is used in combination with the parity group hit/miss judge process b 6600. Further, the asynchronous process c 7000 is used (in conjunction with a data line 7004) in the case where a process for updating an update after data record 106 on a disk unit 1304 is to be performed in synchronism with a write request from a processor 1300. The in-group other data records 702 may be acquired even after the update after data record 106 has been written into the disk unit 1304. Therefore, two processes as mentioned hereinbelow are asynchronously performed (in conjunction with data lines 7005):

1 a load process in the case where the in-group other data record 702 which does not exist in a cache 1308; and 2 a process for write of the update after parity record 108 into a disk unit 1304.

Figure 71:
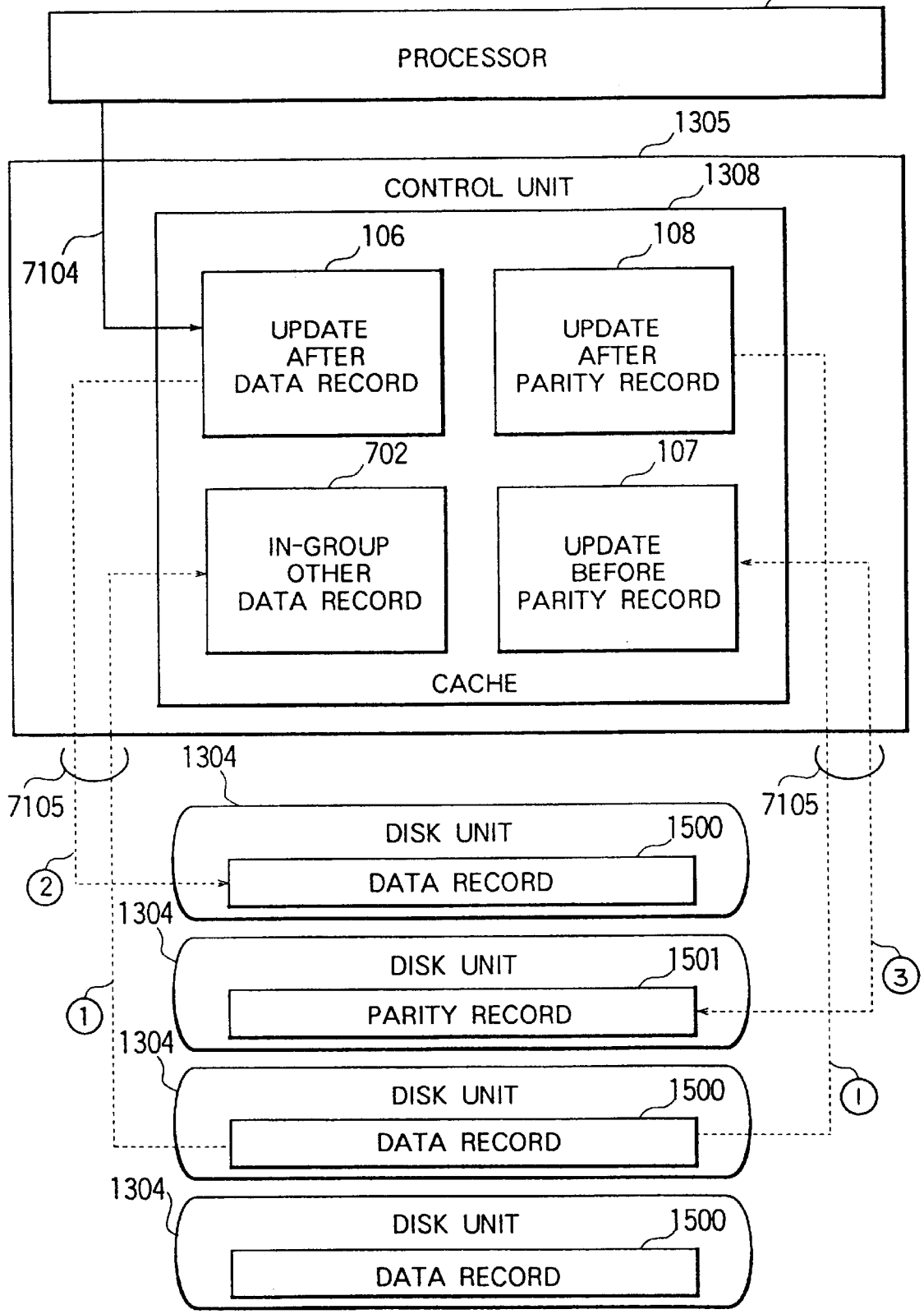
FIG. 71 is a block diagram showing the outline of an asynchronous process d.

(d) An asynchronous process d 7100 shown in FIG. 71 is used in the case where an update after parity record 108 is generated by use of in-group other data records 702. Accordingly, this process is used in combination with the parity group hit/miss judge process b 6600. Further, the asynchronous process d 7100 is used (in conjunction with a data line 7104) in the case where a process for updating an update after data record 106 on a disk unit 1304 is to be performed in synchronism with a write request from a processor 1300. Therefore, three processes as mentioned hereinbelow are asynchronously performed (in conjunction with data lines 7105);

1 a load process in the case where the in-group other data record 702 which does not exist in the cache 1308;

2 a process for write of the update after data record 106 into the disk unit 1304; and 3 a process for write of the update after parity record 108 into a disk unit 1304.

6) Timing Of Generation Of Update After Parity Record 108

Next, as means for solution of the problem 3 in the present invention, that is, the timing of generation of the update after parity record 108, explanation will be made of four kinds of timings a to d as mentioned hereinbelow.

Figure 72:
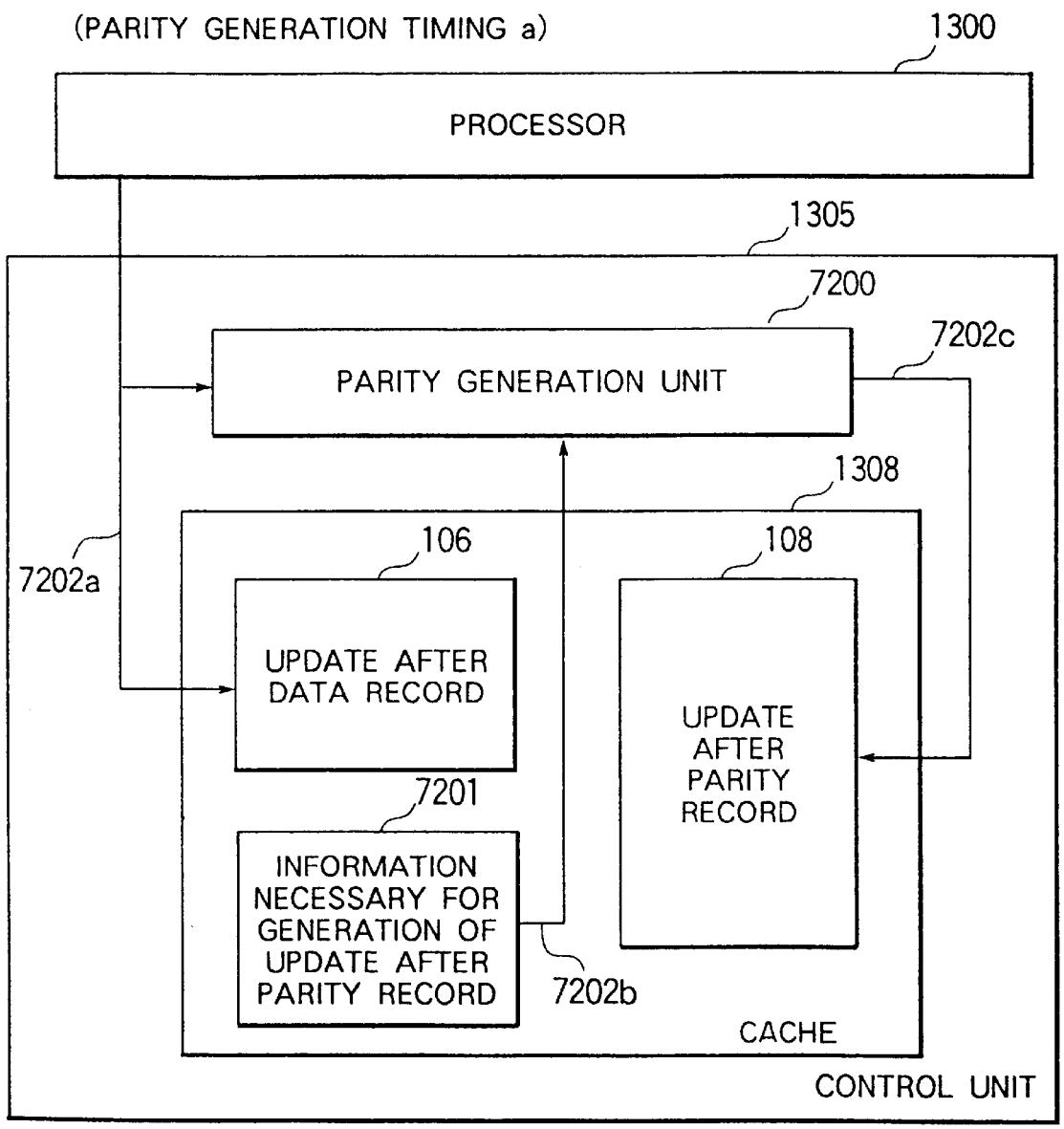

(a) A parity generation timing a shown in FIG. 72 is a timing when an update after data record 106 designated from a processor 1300 is transferred from the processor 1300 to a control unit 1305 (in conjunction with a data line 7202*a*). In this case, it is required that information 7201 necessary for generation of an update after parity record 108 is completely stored in a cache 1308. A parity generation unit 7200 generates the update after parity record 108 (in conjunction with data lines 7202*b* and 7202*c*), as shown in FIG. 72.

Figure 73:
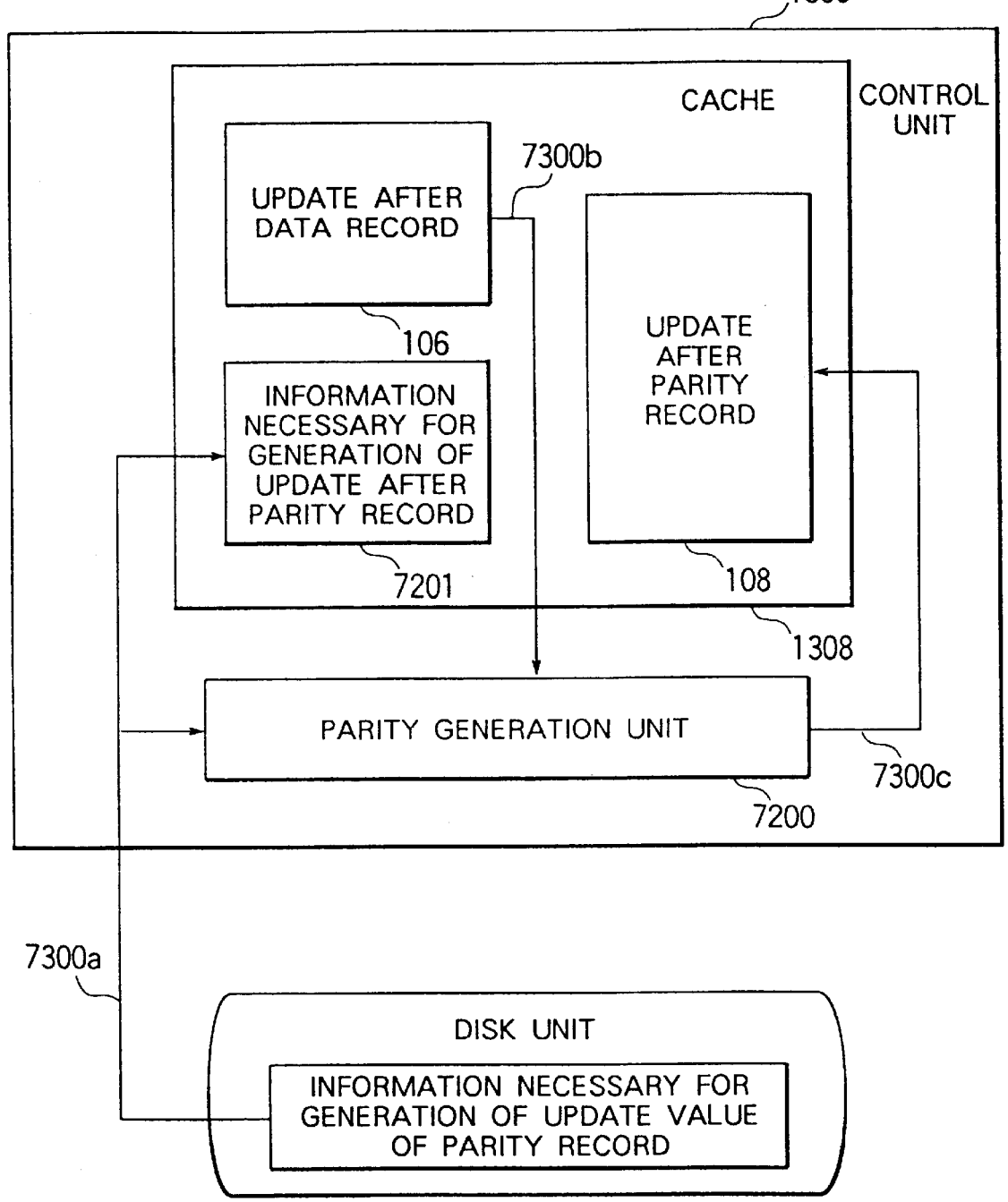
FIG. 73 is a block diagram showing the outline of a parity generation timing b.

(b) A parity generation timing b shown in FIG. 73 is a timing when the last information among information 7201 necessary for generation of an update after parity record 108 is loaded into a cache 1308 (in conjunction with a data line 7300*a*). In this case, it is required that an update after data record 106 designated from the processor 1300 has already been stored in the cache 1308 (in conjunction with a data line 7300*b*).

Figure 74:
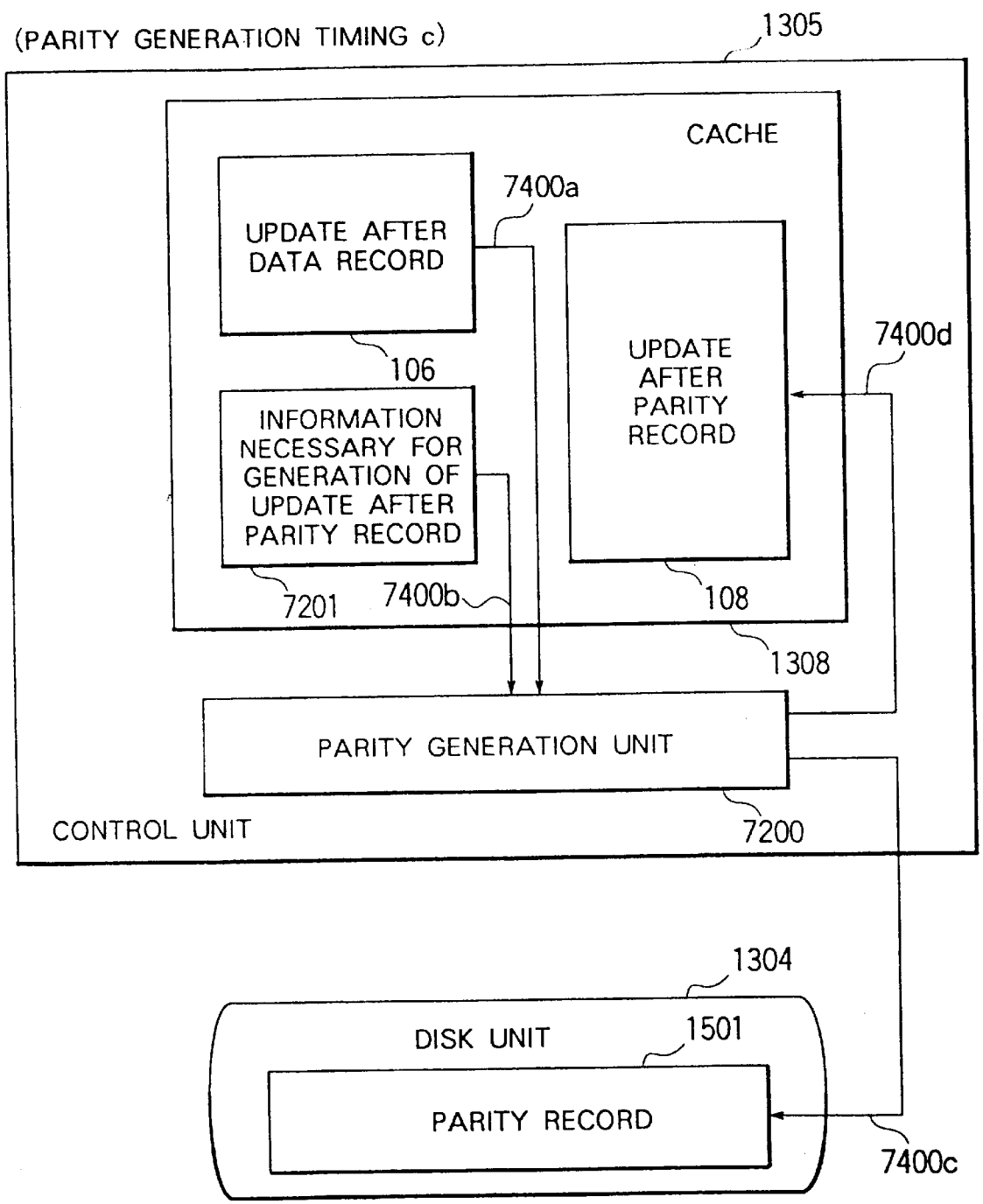
FIG. 74 is a block diagram showing the outline of a parity generation timing c.

(c) A parity generation timing c shown in FIG. 74 is a timing when in parallel with the generation of an updated value of a parity record by a parity generation unit 7200 on the basis of an update after data record 106 and information 7201 necessary for generation of an update after parity record 108 (in conjunction with date lines 7400*a* and 7400*b*), the generated updated value is written into a disk unit 1304 and a cache 1308 (in conjunction with data lines 7400*c* and 7400*d*).

Figure 86:
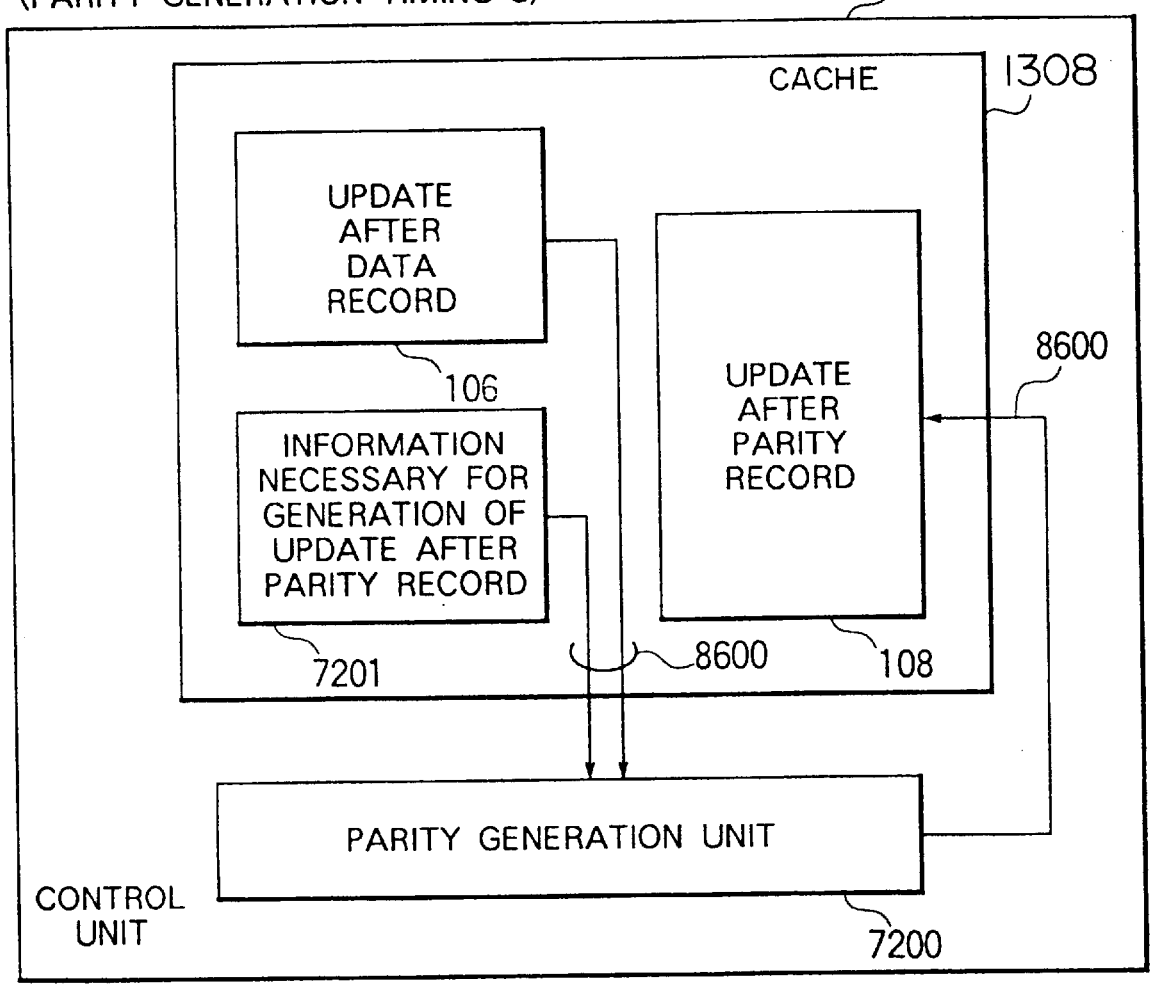
FIG. 86 is a block diagram showing the outline of a parity generation timing d.

(d) A parity generation timing d shown in FIG. 86 is a timing when the parity generation is made by a parity generation unit 7200 (in conjunction with data lines 8600) in asynchronism with a process for data transfer executed by a control unit 1305.

7) Relationship Between Embodiments

Five embodiments will be explained in connection with the present invention. Though the control unit 1305 used in the following explanation and shown in FIGS. 13, 14 and 17 is not shown expressly to include a unit for generating a parity record 1501, it is assumed that the control unit 1305 includes the unit for generating an updated value of the parity record 1501. FIG. 87 shows a relationship between the embodiments of the present invention and the mechanisms or means for solution of the problems in the present invention which are mentioned in conjunction with from FIG. 65 to FIG. 74.

2. First Embodiment

1) Outline

As shown in FIG. 87, a first embodiment is an embodiment in which the parity group hit/miss judge process a 6500 and the asynchronous process a 6800 are combined. All of the parity generation timings a to d are relevant to the first embodiment.

The outline of the first embodiment will now be explained by use of FIGS. 62 and 2.

Figure 62:
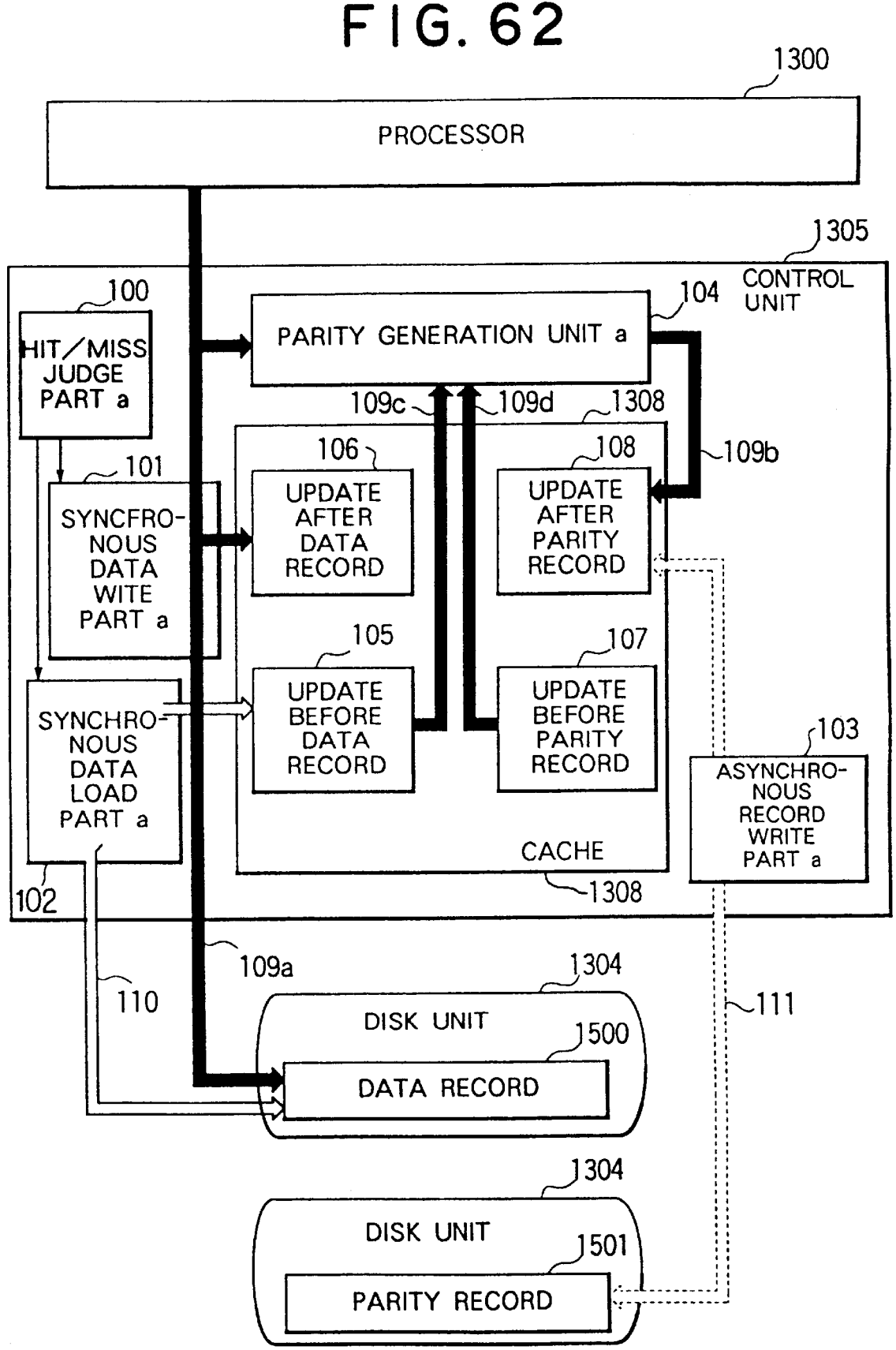
FIG. 62 is a block diagram showing the outline of the operation of the control unit in the first embodiment of the present invention in the case where when the control unit receives the write request from the processor, the data necessary for generation of the updated value of the parity record is stored in the cache.

FIG. 62 shows the operation of a control unit 1305 in the first embodiment in the case where all update before parity records 107 in a parity group 1600 to which a data record 1500 made the object of write belongs exist in a cache 1308. Namely, FIG. 62 shows the operation of the control unit 1305 in the first embodiment in the case where the parity generation timing a shown in FIG. 72 is used.

In this case, the timing of generation of an update after parity record 108 is the timing of write of an update after data record 106 into a disk unit 1304, that is, the parity generation timing a. Concretely, the control unit 1305 controls the above timing by use of a synchronous data write part a 101 (in conjunction with a data line 109*a*). The update after parity record 108 itself is generated by a parity generation unit a 104 (in conjunction with a data line 109*b*). For the generation of the update after parity record 108, an update before data record 105 is needed (in conjunction with a data line 109*c*). Therefore, in the case where this record 105 is not stored in the cache 1308, the control unit 1305 loads the record 105 into the cache 1308 by use of a synchronous data load part a 102 (in conjunction with a data line 110) before the update after data record 106 is written into a disk unit 1304.

The update after parity record 108 is written into a disk unit 1304 by use of an asynchronous record write part a 103 (in conjunction with a data line 111) in asynchronism with a read/write request from a processor 1300. In the present embodiment, the asynchronous record write part a 103 writes a parity record 1501 into the disk unit 1304. In the other embodiments, however, there may be the case where the asynchronous record write part writes a data record.

Figure 2:
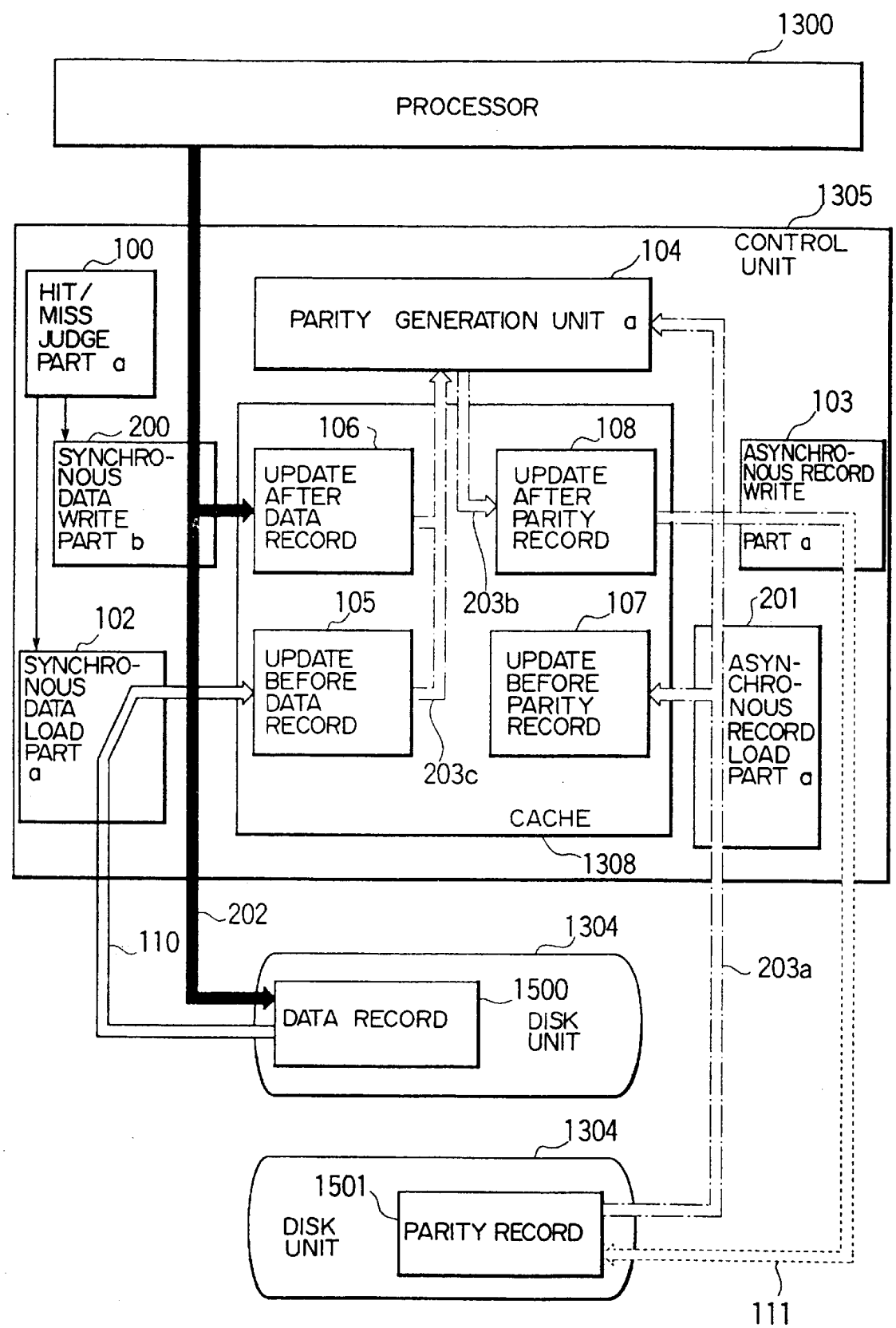
FIG. 2 is a block diagram showing the outline of the operation of a control unit in a first embodiment of the present invention in the case where when the control unit receives a write request from a processor, data necessary for generation of an updated value of a parity record is not stored in a cache.

FIG. 2 shows the operation of the control unit 1305 in the first embodiment in the case where at least one of the update before parity records 107 in a parity group 1600 to which a data record 1500 made the object of write belongs does not exist in a cache 1308. Namely, FIG. 2 shows the operation of the control unit 1305 in the first embodiment in the case where the parity generation timing b shown in FIG. 73 is used.

The control unit 1305 loads the update before parity record 107 which does not exist in the cache 1308, into the cache 1308 (in conjunction with a data line 203*a*) by use of an asynchronous record load part a 201 in asynchronism with a read/write request from a processor 1300. In this case, the timing of generation of an update after parity record 108 is a timing when the last information in the update before parity record 107 which does not exist in the cache 1308 is loaded into the cache 1308 (in conjunction with the data line 203*a*), that is, the parity generating timing b.

In the present embodiment, the asynchronous record load part a 201 loads a parity record 1501 into the cache 1308. In the other embodiments, however, there may be the case where the asynchronous record load part loads a data record 1500.

As shown in FIG. 2, an update after data record 106 is written into a disk unit 1304 by a synchronous data write part b 200 of the control unit 1305 (in conjunction with a data line 202). At this timing, however, the update after parity record 108 is not generated.

Since the operations of a synchronous data load part a 102 and an asynchronous record write part a 103 are similar to those in FIG. 62, explanation thereof will be omitted.

2) Details Of Processes

Next, explanation will be made of the details of the individual process parts shown in FIGS. 62 and 2.

a) Hit/Miss Judge Part a 100

Figure 26:
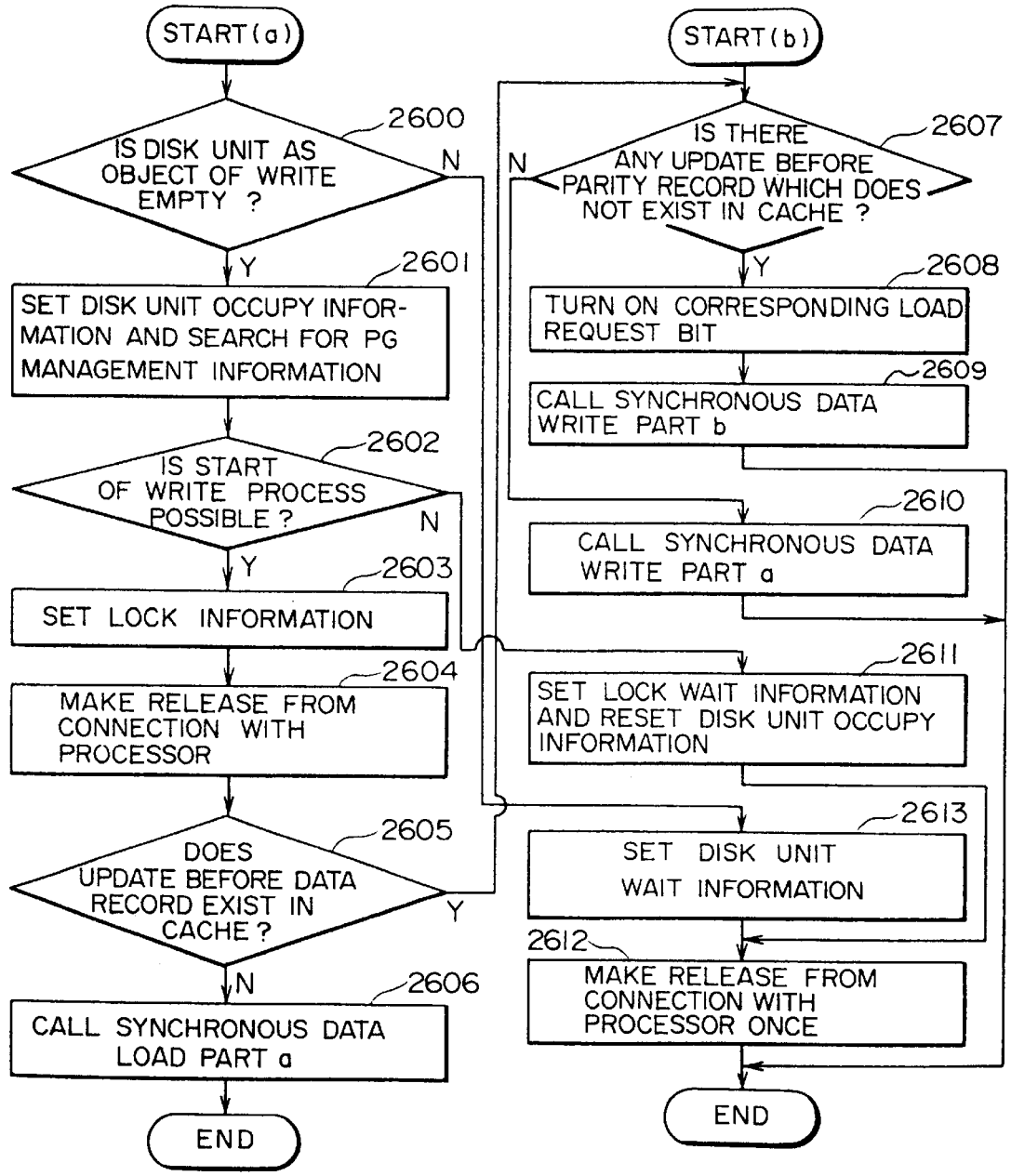
Figure 27:
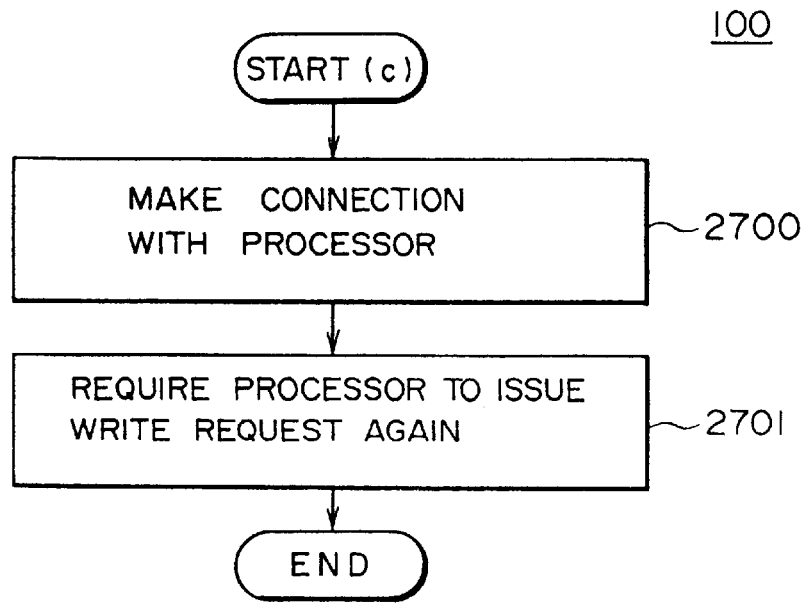
FIG. 27 shows a flow chart of a process performed by the hit/miss judge part a when the release from a wait condition is made.

FIGS. 26 and 27 show the flow charts of processes performed by the hit/miss judge part a 100. The hit/miss judge part a 100 has three execution start points. A first start point is a start point (a) shown in FIG. 26 or a start point at which the execution is started when a write request from the processor 1300 is received. A second start point is a start point (b) shown in FIG. 26 or a start point at which the execution is started when a process by the synchronous data load part a 102 is completed. A third start point is a start point (c) shown in FIG. 27 or a start point at which the execution is started when the release from a wait condition is made.

The process flow shown in FIG. 26 will now be explained.

Referring to disk unit occupy information 2004, the control unit 1305 judges whether or not a disk unit 1304 which becomes the object of write is empty (step 2600). If the disk unit is not empty, the flow jumps to step 2613.

If the disk unit is empty, the control unit 1305 sets the corresponding disk unit occupy information 2004 and searches for PG management information 2001 of an update before data record 105 made the object of write (step 2601). In the case where there is no corresponding PG management information 2001, an empty PG management information queue 2400 is searched to allocate new PG management information 2001.

In step 2602, reference to lock information 2204 is made to check whether or not the start of a write process is possible. If the start is possible, the lock information is set in step 2603. If the start is not possible, the flow jumps to step 2611. In step 2604, the control unit 1305 is disconnected from the processor 1300 once.

In step 2605, the control unit 1305 checks whether or not an update before data record 105 exists in the cache. In the case where the record 105 does not exist, the synchronous data load part a 102 is called in step 2606, thereby completing the process once. In the case where the record 105 exists, the check is made as to whether or not there is any one among update before parity records 107 in a parity group 1600 which does not exist in the cache 1308 (step 2607). If all the update before parity records 107 exist in the cache, the flow jumps to step 2610. If there is any update before parity record 107 which does not exist in the cache, a load request bit 2203 corresponding to that record 107 is turned on (step 2608). Next, in step 2609, the control unit 1305 activates the synchronous data write part b 200, thereby completing the process.

In step 2610, the control unit 1305 activates the synchronous data write part a 101, thereby completing the process.

In step 2611, the control unit 1305 sets the corresponding lock wait information 2205 and resets the corresponding disk unit occupy information 2004. Next, in step 2612, the control unit 1305 is released from the state of connection with the processor 1300 once, thereby bringing the accepted write request into a wait condition.

In step 2613, the control unit 1305 sets the corresponding disk unit wait information 2005. And, the flow goes to step 2612.

If the report of completion is received from the synchronous data load part a 102, the process is executed from the start point (b) shown in FIG. 26. Since the processings in and after step 2607 have already been described, explanation thereof will be omitted.

The flow chart shown in FIG. 27 illustrates the flow of a process performed when the control unit 1305 is released from a wait condition. In step 2700, the control unit 1305 makes connection with the processor 1300. In step 2701, the control unit 1305 requires the processor 1300 to issue the write request again.

b) Synchronous Data Load Part a 102

Figure 28:
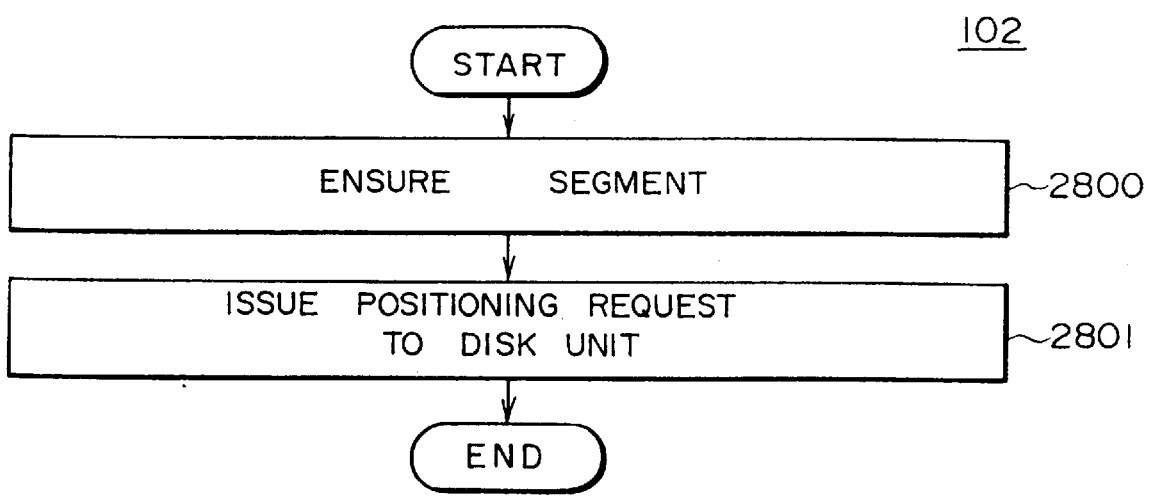
Figure 29:
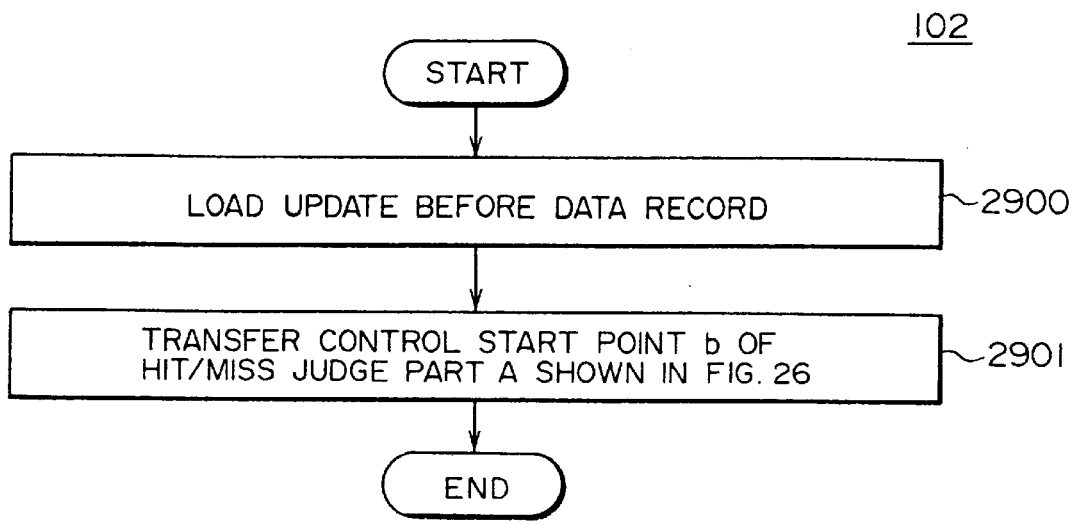
FIG. 29 shows a flow chart of a process performed by the synchronous data load part a when a disk unit positioning process is completed.

FIGS. 28 and 29 show the flow charts of processes performed by the synchronous data load part a 102.

The flow chart shown in FIG. 28 illustrates the flow of a process performed by the synchronous data load part a 102 when it is called by the hit/miss judge part a 100. In step 2800, the control unit 1305 searches an empty segment queue 2300 and so on to ensure an empty segment 1800 and sets a value indicative of the segment 1800 into an update before segment pointer 2200. In step 2801, the control unit 1305 issues a positioning request to disk units 1304, thereby completing the process.

The flow chart shown in FIG. 29 illustrates the flow of a process performed when a positioning process for disk units 1304 is completed. In step 2900, a data record 1500 on the disk unit 1304 is loaded as an update before data record 105 into the segment 1800 indicated by the update before segment pointer 2200. In step 2901, the control unit 1305 turns the control to the start point b for the hit/miss judge part a 100 shown in FIG. 26.

c) Synchronous Data Write Part a 101

Figure 30:
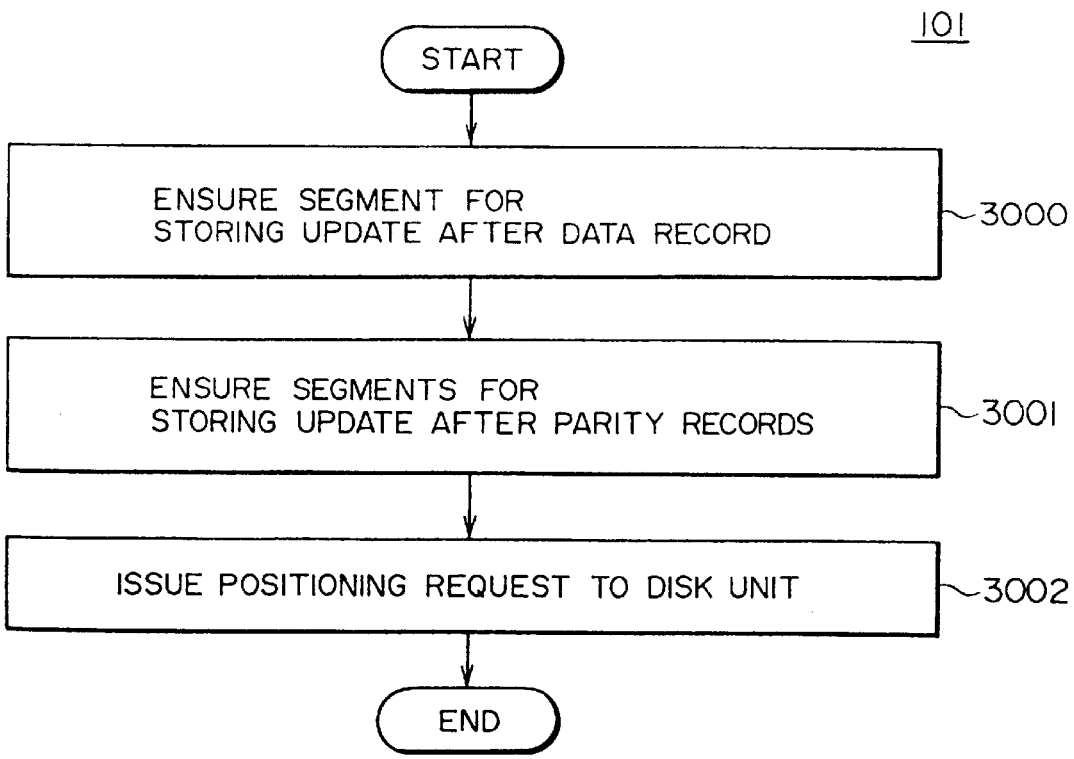
Figure 31:
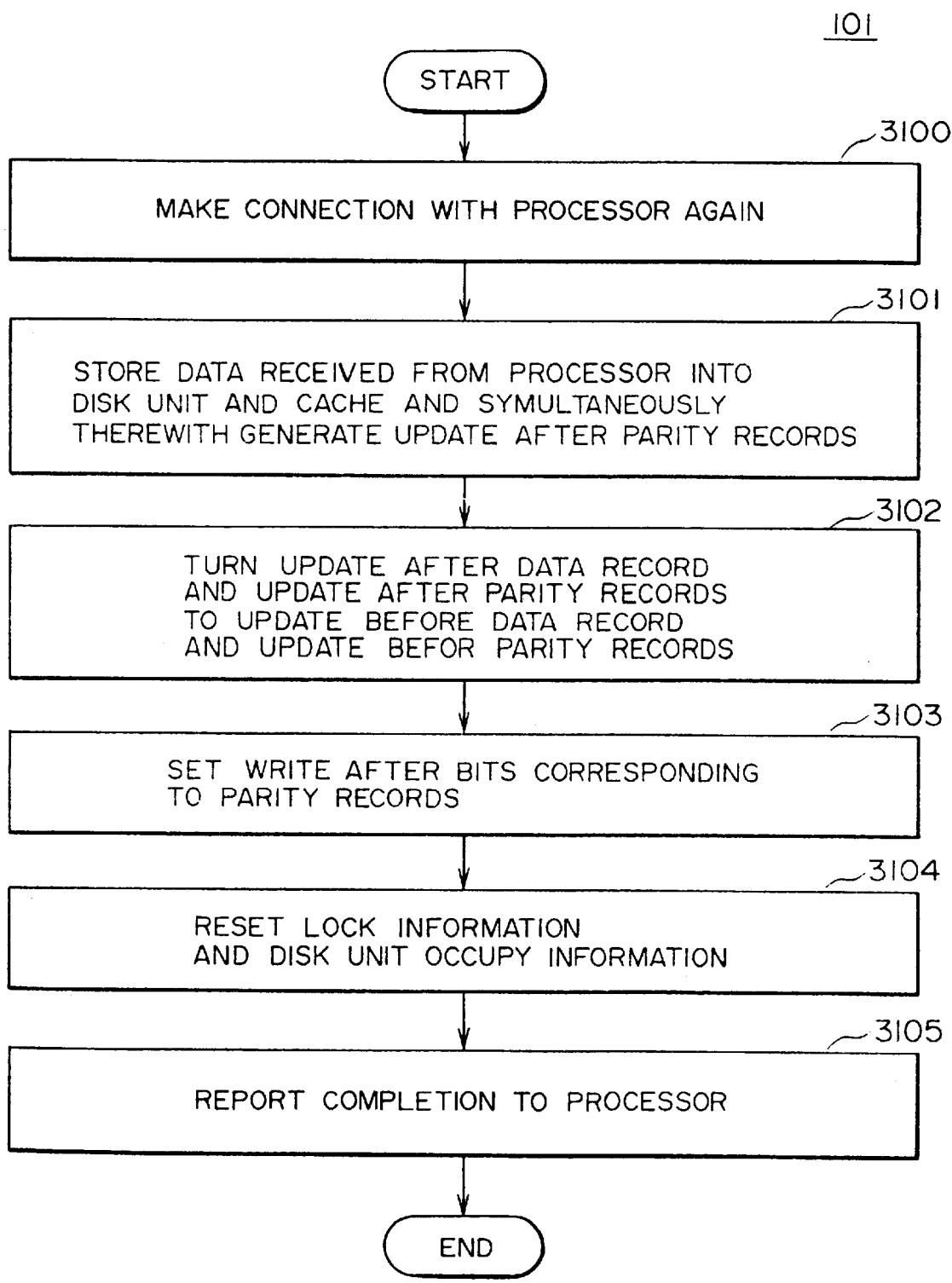
FIG. 31 shows a flow chart of a process performed by the synchronous data write part a when a disk unit positioning process is completed.

FIGS. 30 and 31 show the flow charts of processes performed by the synchronous data write part a 101.

The flow chart shown in FIG. 30 illustrates the flow of a process performed when the synchronous data write part a 101 is called by the hit/miss judge part a 100. In step 3000, in the case where a segment 1800 for storing an update after data record 106 is not ensured, the control unit 1305 searches an empty segment queue 2300 and so on to ensure the segment 1800 and sets a corresponding value into an update after segment pointer 2201. In step 3001, in the case where segments 1800 for storing all update after parity records 108 are not ensured, the control unit 1305 searches the empty segment queue 2300 and so on to ensure the segments 1800 and set corresponding values into update after segment pointers 2201 for parity records 1501. In step 3002, the control unit 1305 issues a positioning request to disk units 1304, thereby completing the process.

The flow chart shown in FIG. 31 illustrates the flow of a process performed when a positioning process for disk units 1304 is completed. In step 3100, the control unit 1305 makes connection with the processor 1300 again. In step 3101, the control unit 1305 writes data received from the processor 1300 into a disk unit 1304 and simultaneously therewith performs the following actions:

1 storing data received from the processor 1300 as an update after data record 106 into the segment 1800 indicated by the corresponding update after segment pointer 2201; and 2 generating all update after parity records 108 from an update before data record 105, the data received from the processor 1300 and all update before parity records 107 and storing the generated records into the segments 1800 indicated by the corresponding update after segment pointers 2201.

In step 3102, the control unit 1305 turns the update after data record 106 corresponding to a data record 1501 made the object of write and all the update after parity records 108 to an update before data record 105 and update before parity records 107, respectively. Concretely, the segments 1800 having been indicated by the corresponding update before segment pointers 2200 are released and the segments 1800 having been indicated by the corresponding update after segment pointers 2201 are turned to ones indicated by the update before segment pointers 2200. And, null values are set into the corresponding update after segment pointers 2201.

In step 3103, the control unit 1305 sets values into write after bits 2202 corresponding to all parity records 1501.

Thereafter, in step 3104, lock information 2204 and disk unit occupy information 2004 are reset. In step 1305, the control unit 305 reports the completion to the processor 1300.

d) Synchronous Data Write Part b 200

Figure 32:
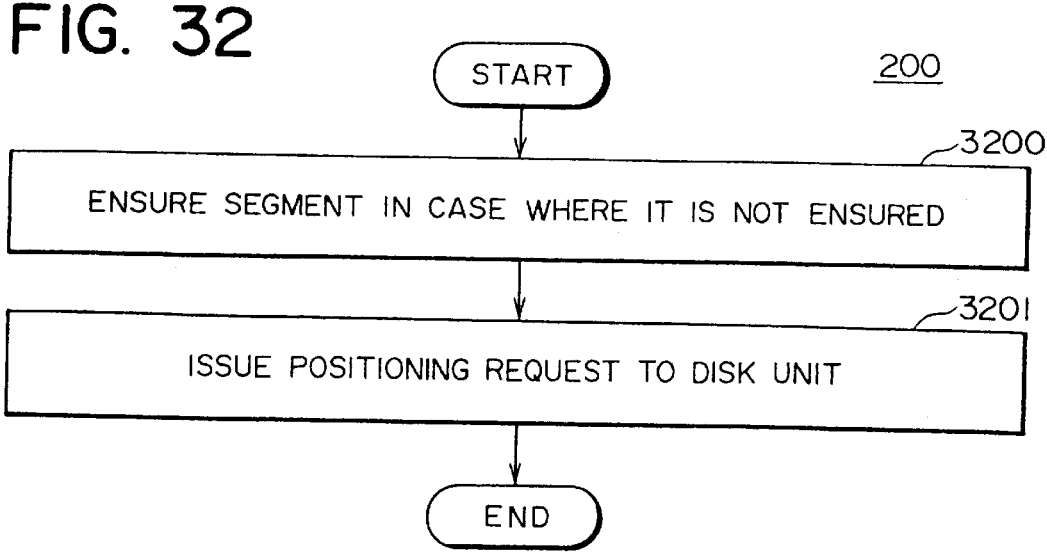
FIG. 32 shows a flow chart of a process performed by a synchronous data write part b.
Figure 33:
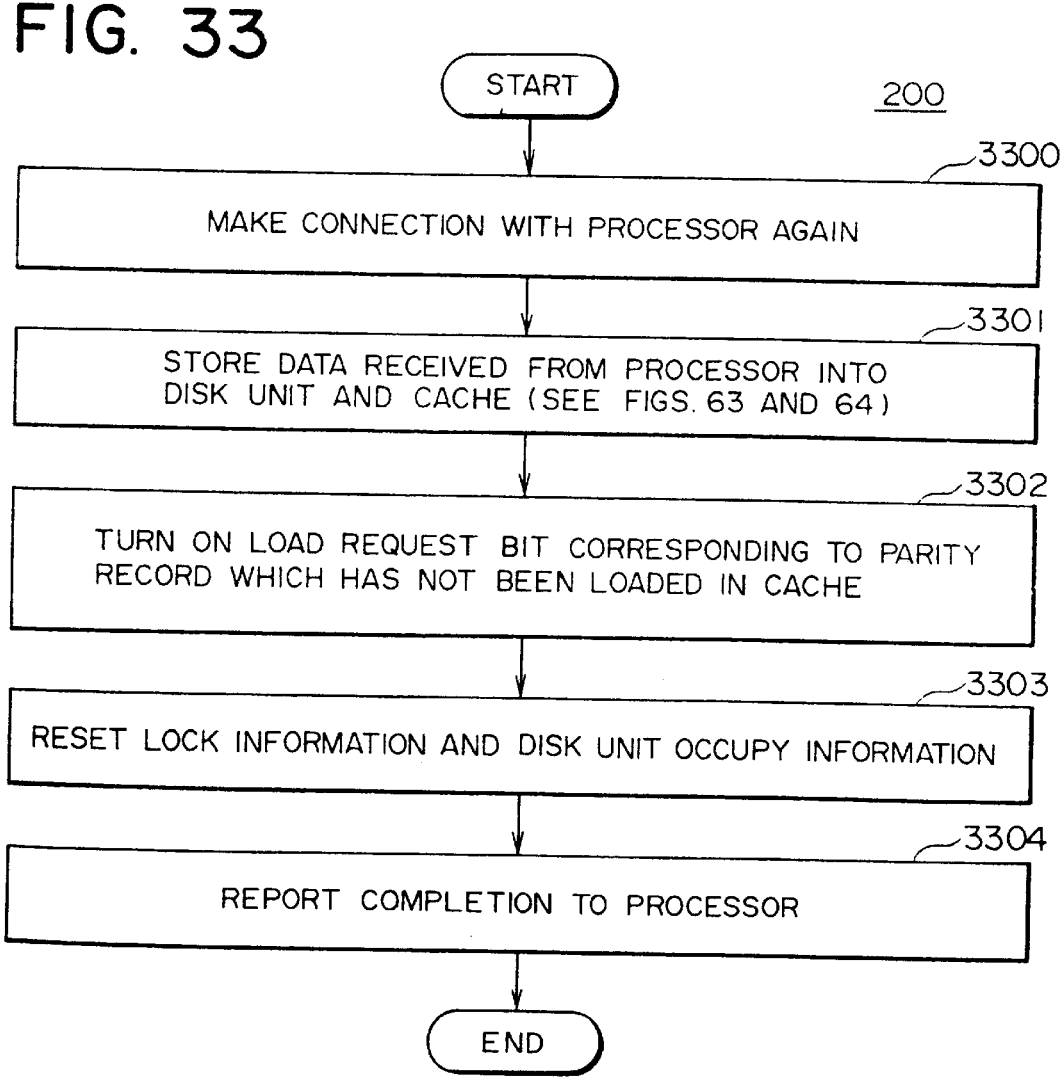
FIG. 33 shows a flow chart of a process performed by the synchronous data write part b when a disk unit positioning process is completed.

FIGS. 32 and 33 show the flow charts of processes performed by the synchronous data write part b 200.

The flow chart shown in FIG. 32 illustrates the flow of a process performed by the synchronous data write part b 200 when it is called by the hit/miss judge part a 100. In step 3200, in the case where a segment 1800 for storing an update after data record 106 is not ensured, the control unit 1305 searches an empty segment queue 2300 and so on to ensure the segment 1800 and sets a corresponding value into an update after segment pointer 2201. In step 3201, the control unit 1305 issues a positioning request to a disk unit 1304, thereby completing the process.

The flow chart shown in FIG. 33 illustrates the flow of a process performed when a positioning process for the disk unit 1304 is completed. In step 3300, the control unit 1305 makes connection with the processor 1300 again. In step 3301, the control unit 1305 writes data received from the processor 1300 into the disk unit 1304 and simultaneously therewith stores the data received from the processor 1300 into the segment 1800 as the update after data record 106.

When a write request for a certain data record 1500 from the processor 1300 is accepted, there may be the case where an update after data record 106 and an update before data record 105 are both stored in the cache 1308.

Figure 63:
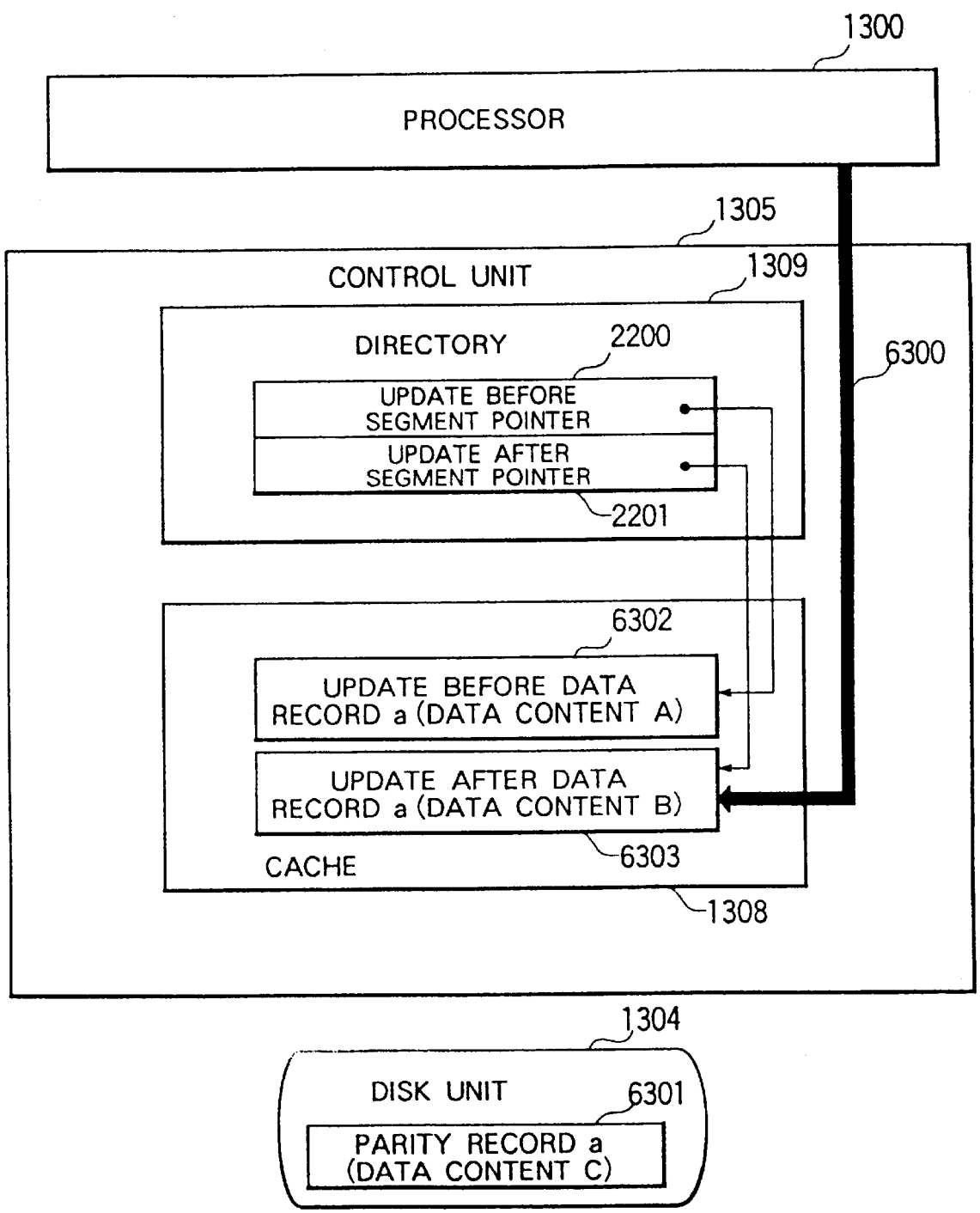
FIG. 63 is a block diagram showing the state of a cache when a write request for a data record is accepted before a load process needed in connection with the preceding write request is completed for a parity record in a parity group to which that data record belongs.

FIG. 63 shows the case where when the preceding write request 6300 was accepted, there is a parity record a 6301 (having the data content C) among update before parity records 107 which has not been loaded in the cache 1308. In this case, write data accepted upon the preceding write request 6300 is stored as an update after data record a 6302 in the cache 1308. An update before data record a 6302 corresponds to write data accepted upon the further preceding write request. In this case, since an updated value of a parity record 1501 reflecting the update after data record a 6303 (having the data content B) has not been generated, it is apparent that the data content C of the parity record a 6301 on a disk unit 1304 is generated from the data content A of the update before data record a 6302.

Figure 64:
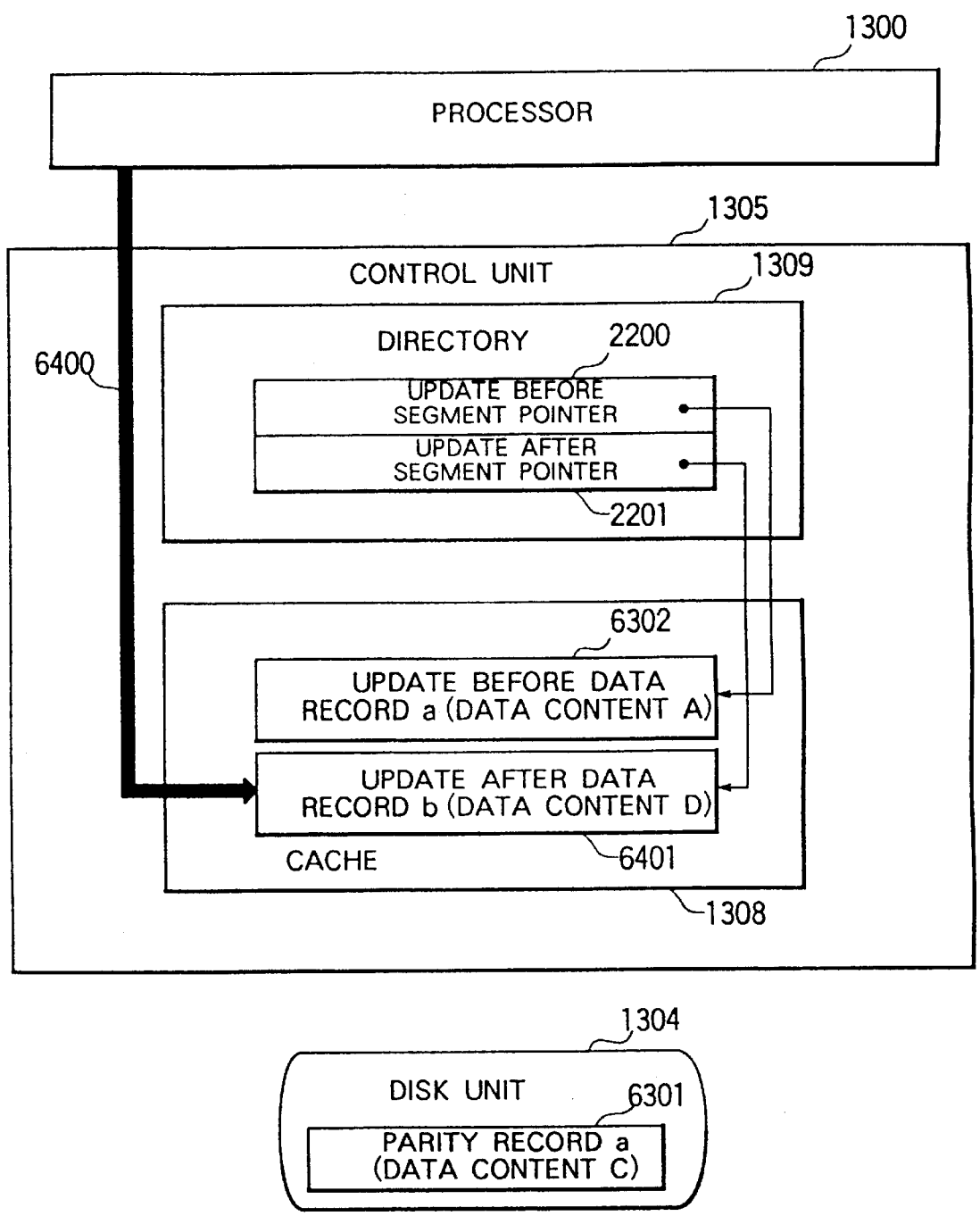
FIG. 64 shows a block diagram showing the state of a cache after a write request for a data record has been accepted before a loads process needed in connection with the preceding write request is completed for a parity record in a parity group to which that data record belongs.

FIG. 64 shows the case where when a load process for the update before parity record 107 is intended under the above circumstance, a write request for the same data record 1500, that is, the present write request 6400 is accepted before the load process is started. In this case, in order to generate an updated value of a parity record 1501 reflecting data accepted through the present write request 6400, there is needed the value of the update before data record a 6302 (having the data content A) which is used when the value of the parity record a 6301 (having the data content C) was generated. Accordingly, as shown in FIG. 64, the update before data record a 6302 is held in the cache 1308 as it is and the write data accepted through the present write request 6400 is stored as an update after data record b 6401 (having the data content D) into the cache 1308.

From the foregoing, in step 3301 shown in FIG. 33, the update before data record 105 is held in the cache 1308 as it is and the write data (corresponding to the update after data record b 6401) accepted in the segment 1800 indicated by the update after segment pointer 2201 is stored into the segment 1800 (corresponding to the update before data record a 6302) in which the update after data record 106 has been stored. In step 3302, a load request bit 2203 corresponding to the update before parity record 107 which has not been loaded in the cache 1308, is turned on. In step 3303, lock information 2204 and disk unit occupy information 2004 are reset. Thereafter, in step 3304, the control unit 1305 reports the completion of the process to the processor 1300.

e) Asynchronous Record Load Part a 201

Figure 34:
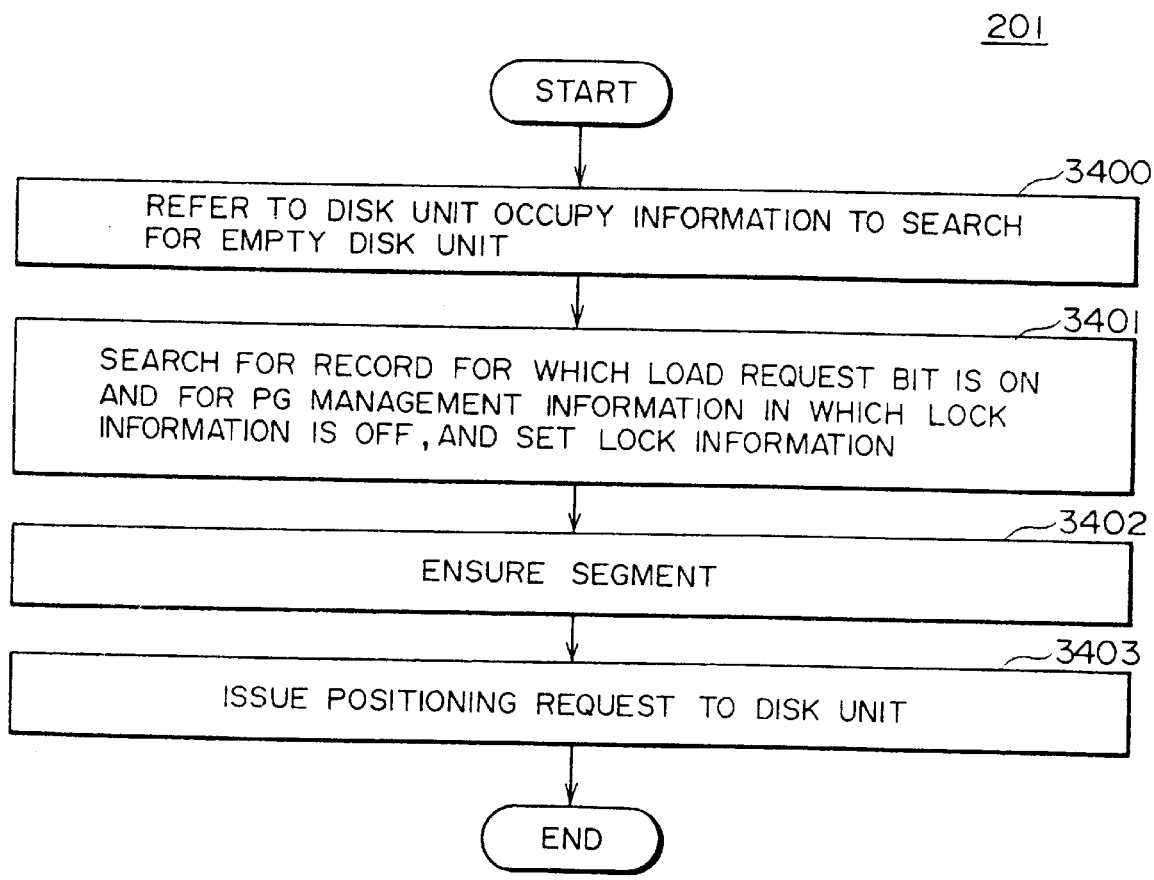
Figure 35:
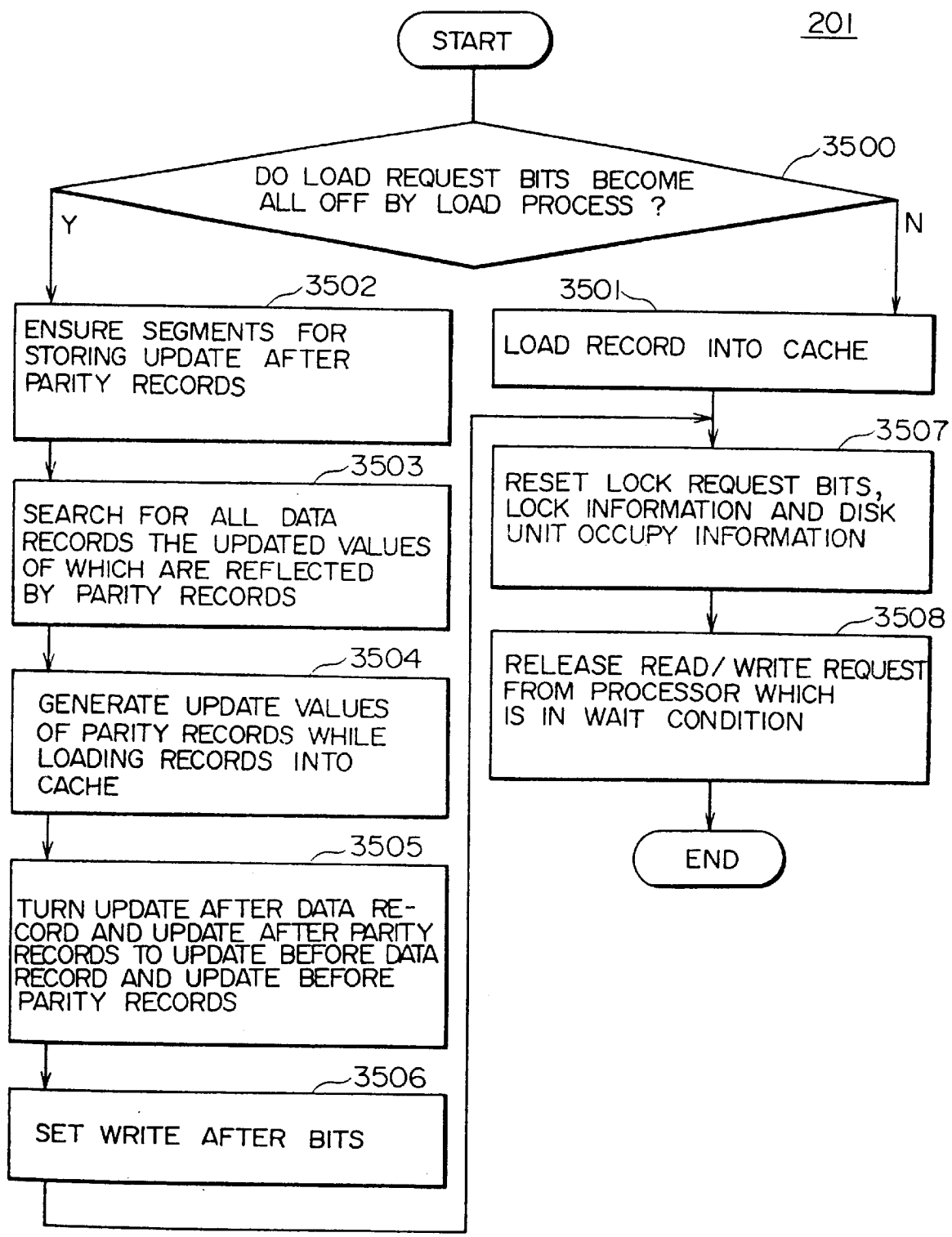
FIG. 35 shows a flow chart of a process performed by the asynchronous record load part a when a disk unit positioning process is completed.

FIGS. 34 and 35 show the flow charts of processes performed by the asynchronous record load part a 201.

The flow chart shown in FIG. 34 illustrates the flow of a process performed using a time when the control unit 1305 is idle. In step 3400, the control unit 1305 refers to disk unit occupy information 2004 to search for disk units 1304 which are empty. In step 1301, the control unit 1305 searches the searched-out empty disk units 1304 for a record 1502 for which a load request bit 2203 is ON, searches for PG management information 2001 in which lock information 2204 is OFF, and turns on the lock information 2204.

Next, in step 3402, the control unit 1305 performs a load process for the searched-out record 1502. Namely, the control unit 1305 ensures a segment 1800 and sets a value into an update before segment pointer 2200 corresponding to a parity record 1501 to be loaded. In step 3403, the control unit 1305 issues a positioning request to the disk unit 1304.

The flow chart shown in FIG. 35 illustrates performed when a positioning process for a disk unit 1304 is completed. In step 3500, the control unit 1305 checks whether or not load request bits 2203 in the PG management information 2001 become all OFF by the load process for the record 1502. If the bits 2203 are all OFF, the flow goes to step 3500. On the other hand, if any one of the bits 2203 is ON, the control unit 1305 loads the record 1502 as an update before parity record 107 into a segment 1800 indicated by the corresponding update before segment pointer 2200 (step 3501) and the flow thereafter goes to step 3507. In the case where the load request bits 2203 in the PG management information 2001 becomes all OFF by this load process, update after parity records 108 for all parity records 1501 are generated at this timing. In step 3502, the control unit 1305 ensures segments 1800 for storing the update after parity records 108 and sets pointers into respective update after segment pointers 2201 corresponding to the parity records 1501.

In step 3503, the control unit 1305 searches data records 1500 in a parity group 1600 under consideration for all data records 1500 the updated values of which are not reflected to the parity records 1501. Concretely, the search is made for a data record for which the contents of an update before data record 105 and an update after data record 106 are held in pair in the cache, that is, neither of an update before segment pointer 2200 and an update after segment pointer 2201 do not take both null values, and the search is further made for all update before parity records 107. Accordingly, whether the load process is a load process for data records 1500 or a load process for parity records 1501, records 1502 loaded by the load process are used to generate parity records 1501.

In step 3504, the control 3505 performs the following operation while loading the records 1501 into segments 1800 indicated by the corresponding update before segment pointers 2200. Namely, by use of the parity generation unit a 104, update after parity records 108 for all parity records 1501 are generated from the update before data records 105, update after data records 106 and all update before parity records 107 which are searched out in step 3503. The generated update after parity records 108 are stored into segments 1800 indicated by the corresponding update after segment pointers 2201.

In step 3505, the control unit 1305 turns the update after data record 106 corresponding to a data record 1501 made the object of write and all the update after parity records 108 to an update before data record 105 and update before parity records 107, respectively. A concrete processing is similar to that in step 3102 mentioned above.

In step 3506, the control unit 1305 sets values into write after bits 2202 corresponding to all the parity records 1501.

In step 3507, load request bits 2203 corresponding to the parity records 1501, lock information 2204 and disk unit occupy information 2004 are reset.

Finally, in step 3508, the control unit 1305 resets disk unit wait information 2005 and lock wait information 2204 to release a read/write request from the processor which is in a wait condition, thereby completing the process.

f) Asynchronous Record Write Part a 103

Figure 36:
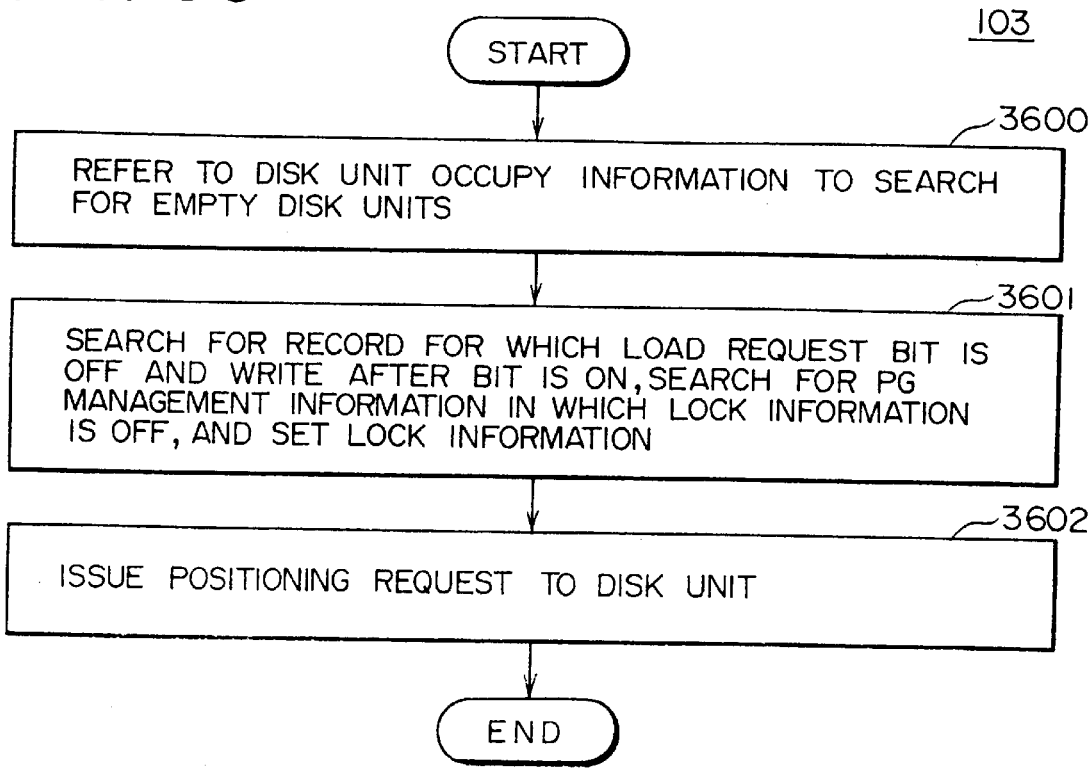
Figure 37:
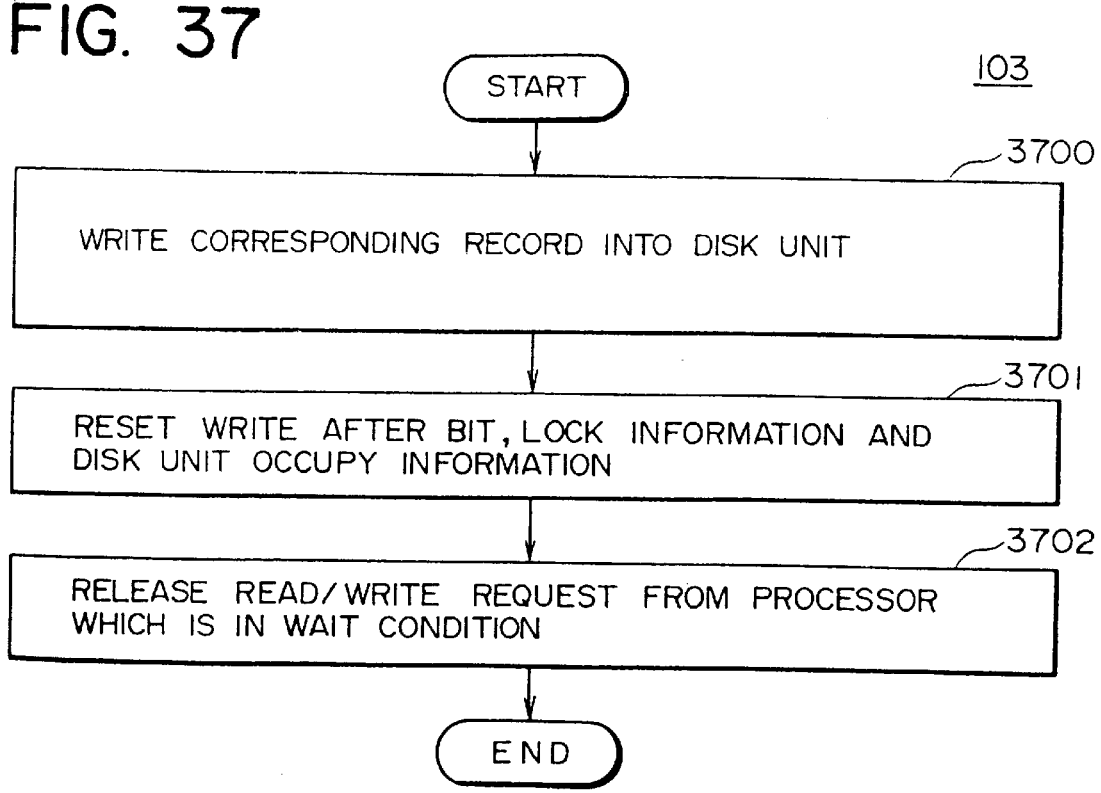
FIG. 37 shows a flow chart of a process performed by the asynchronous record write part a when a disk unit positioning process is completed.

FIGS. 36 and 37 show the flow charts of processes performed by the asynchronous record write part a 103.

The flow chart shown in FIG. 36 illustrates the flow of a process performed using a time when the control unit 1305 is idle. In step 3600, the control unit 1305 refers to disk unit occupy information 2004 to search for disk units 1304 which are empty.

In step 3601, the control unit 1305 searches the searched-out empty disk unit 1304 for a record 1502 for which a write after bit 2202 is ON and a load request bit 2202 is OFF, searches for PG management information 2001 in which lock information 2204 is OFF, and turns on the lock information 2204.

In step 3602, the control unit 1305 starts a write after process for the searched-out record 1502 and issues a positioning request to a disk unit 1304.

The flow chart shown in FIG. 37 illustrates the flow of a process performed when a positioning process for a disk unit 1304 is completed. In step 3700, the control unit 1305 refers to an update before segment pointer 2200 and an update after segment pointer 2201 which corresponds to the record 1502. In the case where the update after segment pointer 2201 takes a null value, data in a segment 1800 indicated by the update before segment pointer 2200 is written into the disk unit 1304. In the case where, neither of the update before segment pointer 2200 and the update after segment pointer 2201 take null values, the recently accepted data in a segment 1800 indicated by the update after segment pointer 2201 is written into the disk unit 1304.

In step 3701, the control unit 1305 resets the corresponding write after bit 2202, lock information 2204 and disk unit occupy information 2004.

Finally, in step 3702, the control unit 1305 resets disk wait information 2005 and lock wait information 2205 to release a read/write request from the processor which is in a wait condition, thereby completing the process.

3) Other Method 1 For Realization Of First Embodiment 1

Figure 3:
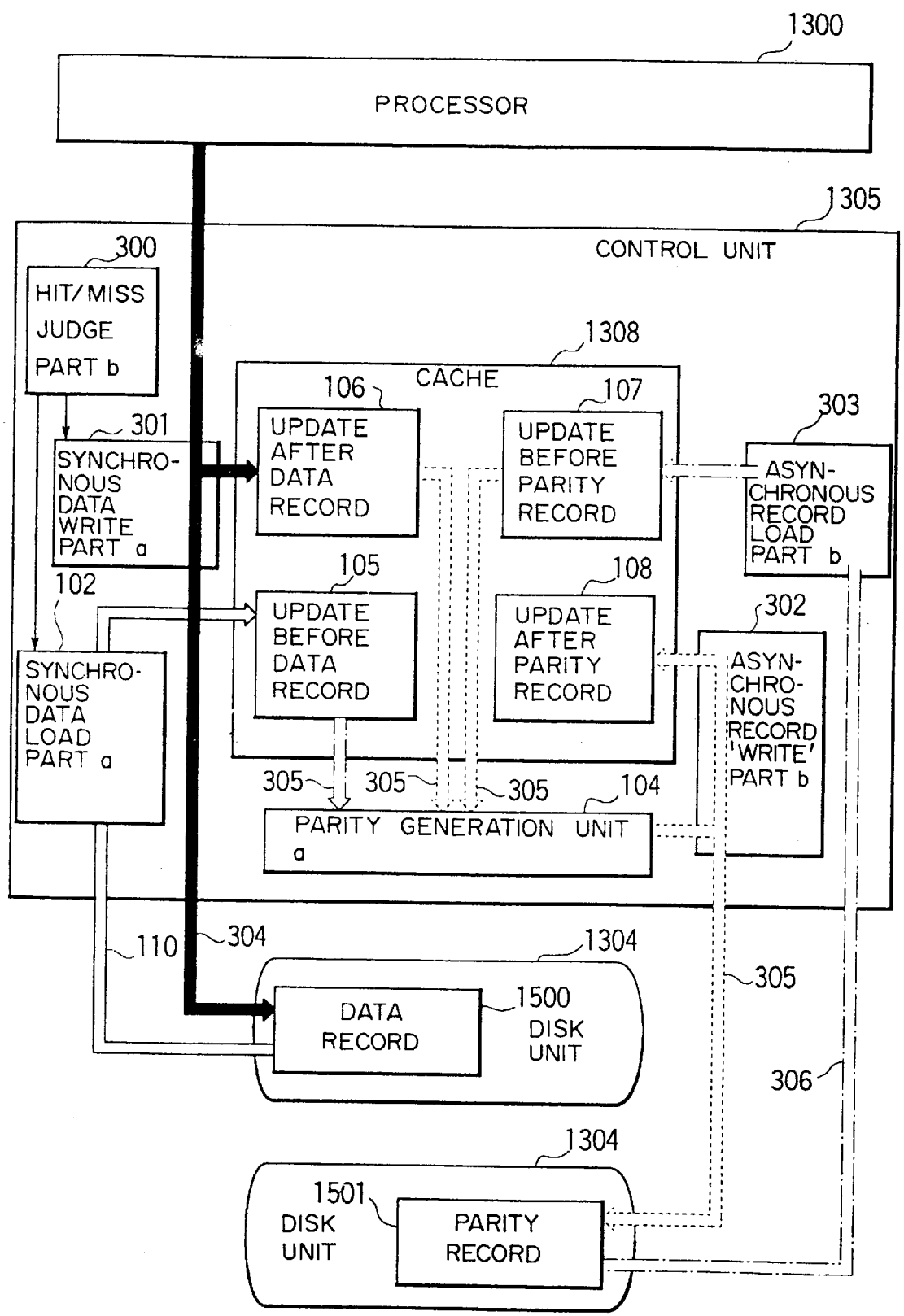
FIG. 3 is a block diagram showing the outline of the operation of the control unit in the first embodiment of the present invention in the case where while generating the updated value of the parity record, the control unit writes the updated value into a disk unit.

FIG. 3 is a block diagram for explaining another method 1 which realizes the first embodiment. This method is different from the method shown in FIG. 1 or 2 in that the timing of generation of an update after parity record 108 is a timing when the update after parity record 108 itself is written into a disk unit 1304. Namely, FIG. 3 shows the operation of the control unit 1305 in the first embodiment in the case where the parity generation timing c shown in FIG. 74 is used as a parity generation timing.

An asynchronous record write part b 302 shown in FIG. 3 generates an update after parity record 108 from an update before data record 105, an update after data record 106 and an update before parity record 107 by use of a parity generation unit a 104 and in parallel therewith writes the generated update after parity record 108 into a disk unit 1304. Accordingly, a synchronous data write part c 301 and an asynchronous record load part b 303 have net a function of generating the update after parity record 108.

The detailed operation will be explained in the following.

a) Hit/Miss Judge Part b 300

Figure 38:
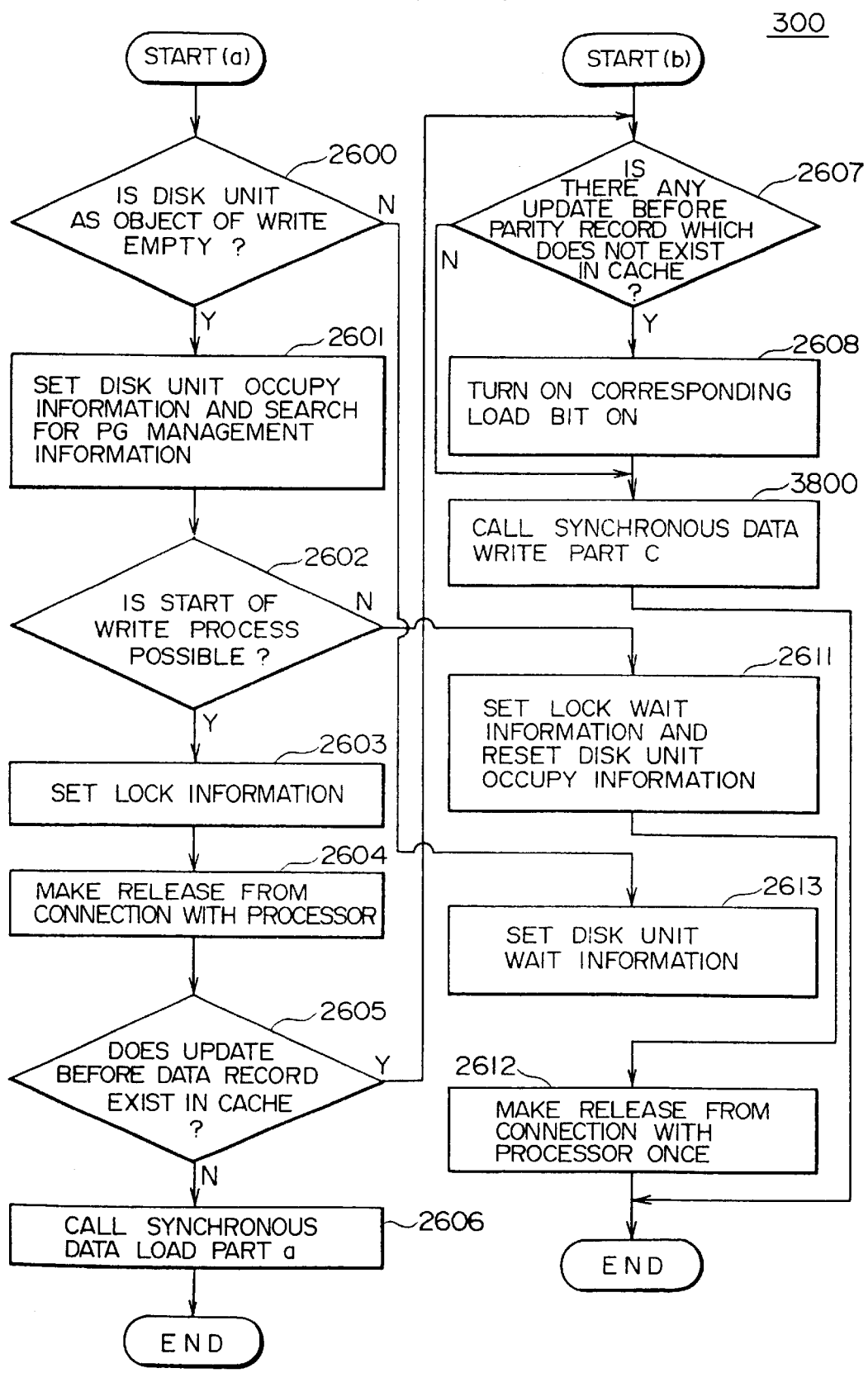
FIG. 38 shows a flow chart of a process performed by a hit/miss judge part b.

FIG. 38 shows the flow chart of a process performed by a hit/miss judge part b 300 shown in FIG. 3. The hit/miss judge part b 300 has three execution start points.

A first point is a start point a shown in FIG. 38 or a start point at which the execution is started when a write request from a processor 1300 is received. A second start point is a start point b shown in FIG. 38 or a start point at which the execution is started when a process by a synchronous data load part a 102 is completed. A third start point is a start point when the release from a wait condition is made. Since the flow of a process performed in conjunction with the third start point is similar to that shown in FIG. 27 performed by the hit/miss judge part a 100, explanation thereof will be omitted. The process flow of the hit/miss judge part b 300 shown in FIG. 38 is approximately the same as that of the hit/miss judge part a 100 shown in FIG. 26. Therefore, processings in FIG. 38 corresponding to those shown in FIG. 26 are designated by the same step numbers used in FIG. 26 and only the difference from FIG. 26 will be explained there. Namely, the hit/miss judge part b 300 activates or calls the synchronous data write part c 301 in step 3800 after an update before data record 105 has been stored into a cache 1308.

b) Synchronous Data Write Part c 301

Figure 39:
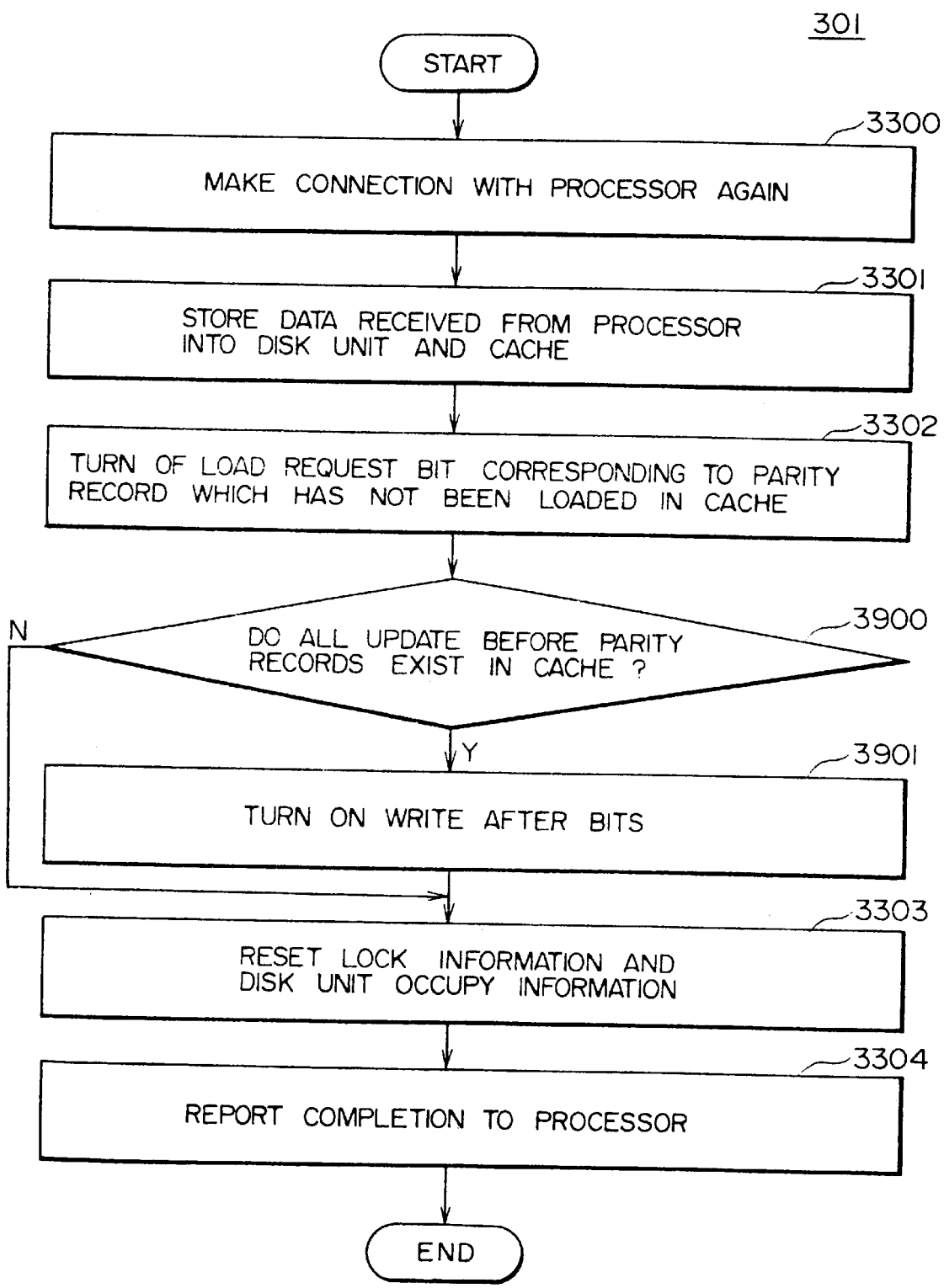
FIG. 39 shows a flow chart of a process performed by a synchronous data write part c.

FIG. 39 shows the flow chart of a process performed by the synchronous data write part c 301 when a positioning process for a disk unit 1304 is completed. Since the flow of a processing performed by the synchronous data write part c 301 when it is called by the hit/miss judge part b 300 is the same as that shown in FIG. 32, explanation thereof will be omitted. The process flow of the synchronous data write part c 301 shown in FIG. 39 is approximately the same as that of the synchronous data write part c shown in FIG. 33. Therefore, processings in FIG. 39 corresponding to those shown in FIG. 33 are designated by the same step numbers used in FIG. 33 and the difference from FIG. 33 will be explained here. Namely, in step 3900, the control unit 1305 checks whether or not all update before parity records 107 are stored in the cache 1308. If there is any record 107 which is not stored, the flow jumps to step 3303. If all the update before parity records 107 are stored, the control unit 1305 turns on write after bits corresponding to those records 107.

c) Asynchronous Record Load Part b 303

Figure 40:
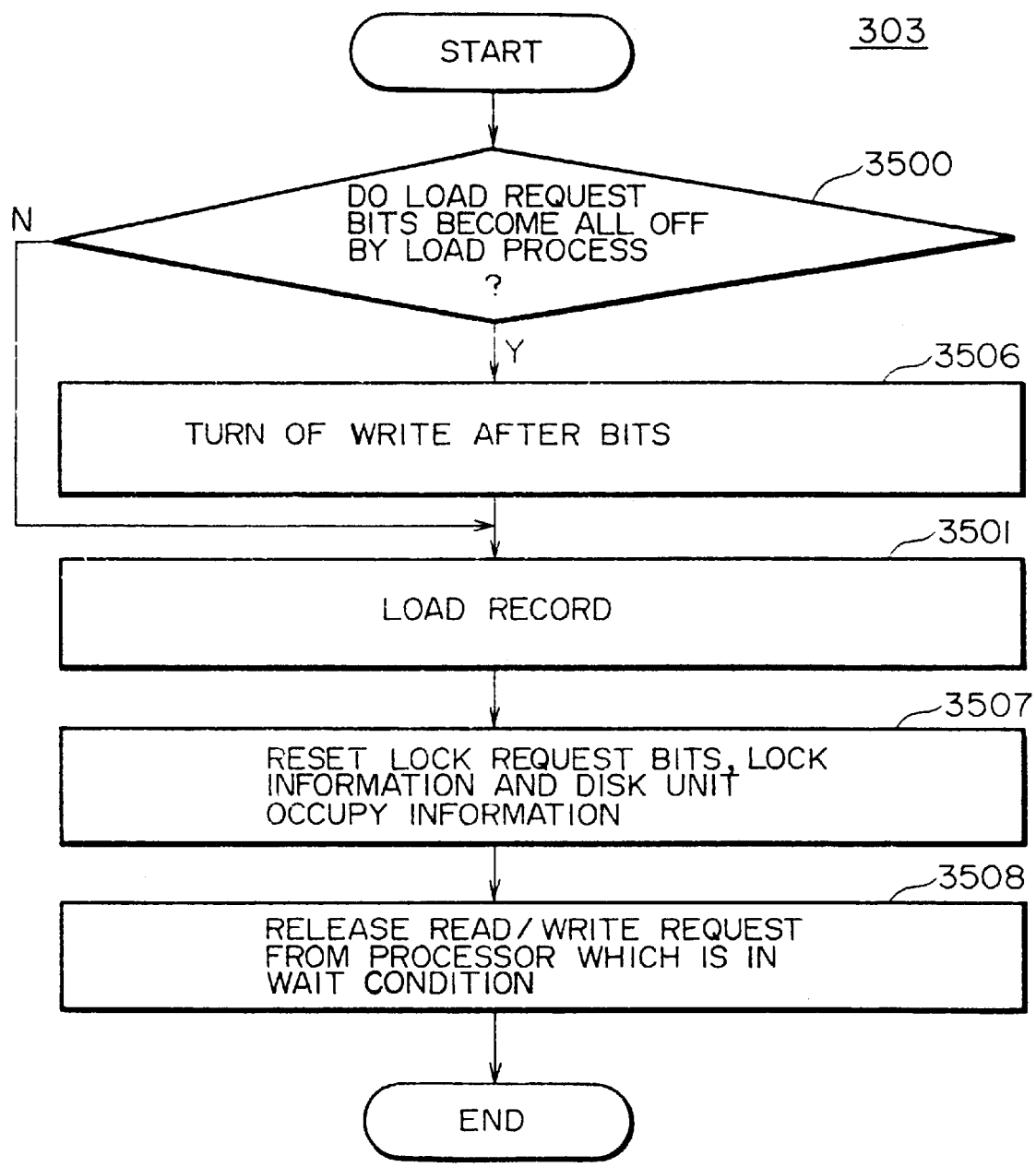
FIG. 40 shows a flow chart of a process performed by an asynchronous record load part b.

FIG. 40 shows the flow chart of a process performed by the asynchronous record load part b 303 when a positioning process for a disk unit 1304 is completed. Since the flow of a process performed using a time when the control unit 1305 is idle is the same as that shown in FIG. 34, explanation thereof will be omitted. The process flow of the asynchronous record load part b 303 shown in FIG. 40 corresponds to one in which the processing for generating the update after parity records 108 is removed from the process flow of the asynchronous record load part a 201 shown in FIG. 35. Therefore, explanation is omitted here, in FIG. 40, processings corresponding to those shown in FIG. 35 are designated by the same step numbers as those used in FIG. 35.

d) Asynchronous Record Write Part b 302

Figure 41:
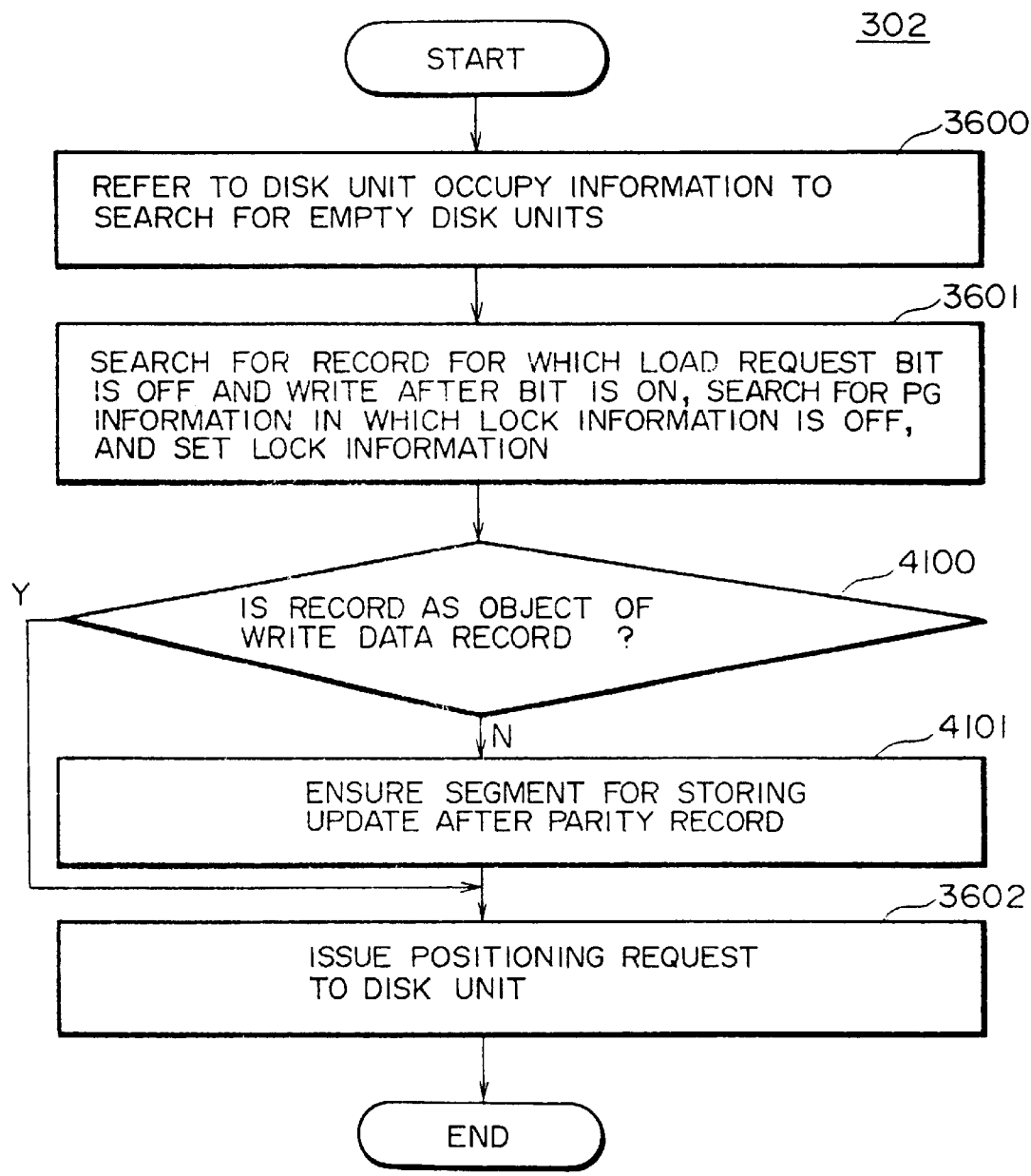
FIG. 41 shows a flow chart of a process performed by an asynchronous record write part b.
Figure 42:
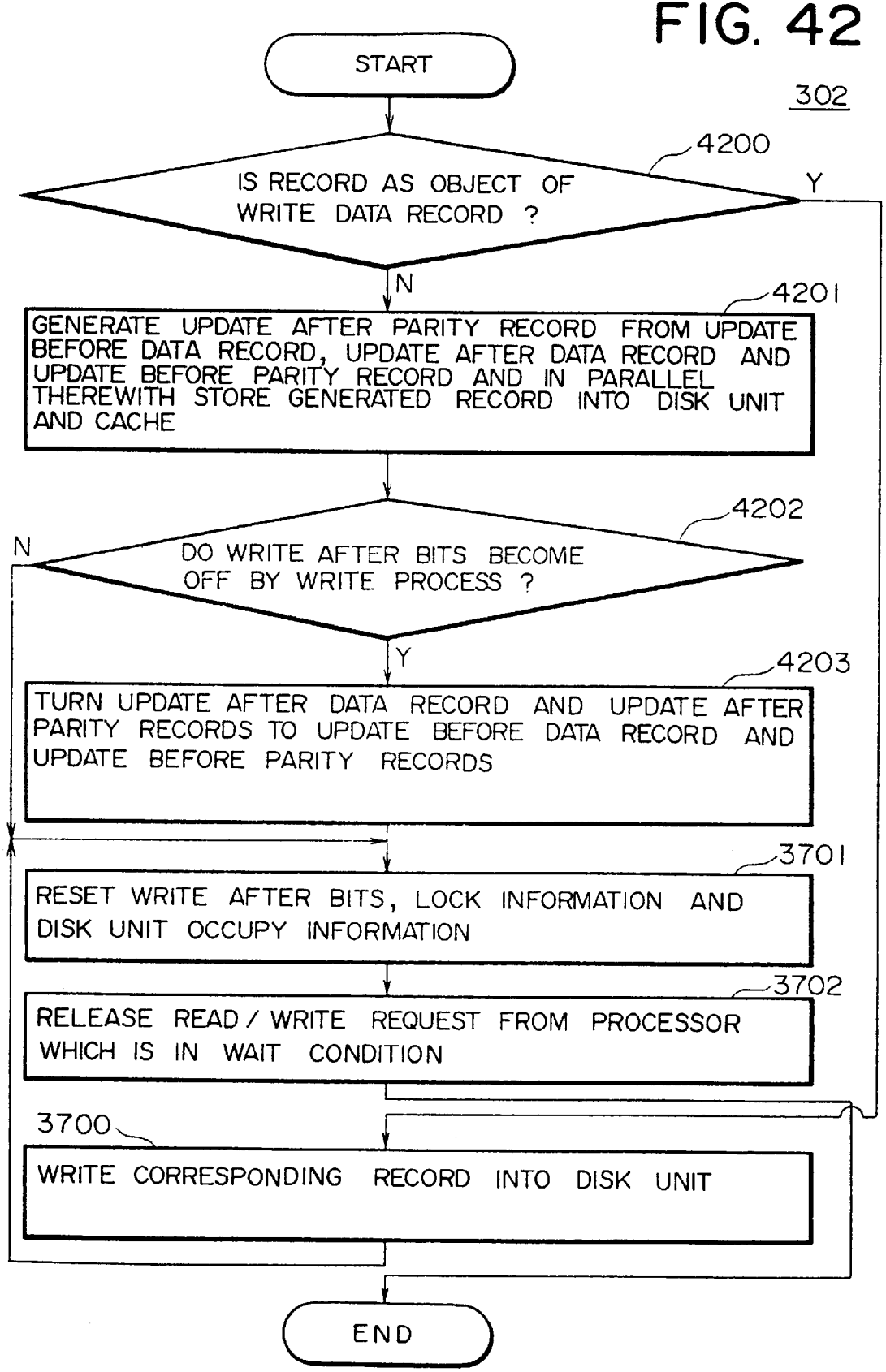
FIG. 42 shows a flow chart of a process performed by the asynchronous record write part b when a disk unit positioning process is completed.

FIGS. 41 and 42 show the flow charts of processes performed by the asynchronous record write part b 302.

The flow chart shown in FIG. 41 illustrates the flow of a process performed using a time when the control unit 1305 is idle. Since the process flow shown in FIG. 41 is approximately the same as that shown in FIG. 36, processings in FIG. 41 corresponding to those shown in FIG. 36 are designated by the same step numbers used in FIG. 36 and the difference from FIG. 36 will be explained here. Namely, in step 4100, the judgement is made as to whether a record 1502 made the object of write is a data record 1500 or a parity record 1501. In the case where the record 1502 made the object of write is a parity record 1501, the control unit 1305 ensures a segment 1800 for storing an update after parity record 108 and sets a pointer value into the corresponding segment pointer 2201 (step 4101).

The flow chart shown in FIG. 42 illustrates the flow of a process performed when a positioning process for a disk unit 1304 is completed. Since the process flow shown in FIG. 42 is similar to that shown in FIG. 37, processings in FIG. 42 corresponding to those shown in FIG. 37 are designated by the same step numbers as those used in FIG. 37 and the difference from FIG. 37 will be explained here. Namely, in step 4200, the control unit 1305 judges whether a record 1502 made the object of write is a data record 1500 or a parity record 1501. In the case where the record 1502 is a data record 1500, the flow goes to step 3700. In the case where the record 1502 is a parity record 1501, the control unit 1305 performs the following processing. First, in step 4201, the control unit 1305 generates an update after parity record 108 from an update before data record 105, an update after data record 106 and an update before parity record 108 by use of the parity generation unit a 104 and in parallel therewith stores the generated update after parity record 108 into a disk unit 1304 and a segment 1800 which is indicated by an update after segment pointer 2201 corresponding to this record 108. In step 4202, the control unit 1305 checks whether or not write after bits 2202 are all OFF. If there is any bit 2202 which is not OFF, the flow jumps to step 3701. If the bits 2202 are all OFF, the control unit 1305 turns all update after data records 106 in the parity group 1600 which belong to the parity record 1500 made the object of write and all the update after parity records 108 to update before data records 105 and update before parity records 107, respectively (step 4203). Since the specific content of this processing has already been mentioned in conjunction with step 3102, explanation thereof will be omitted here.

4) Other Method 2 For Realization Of First Embodiment 1

Figure 75:
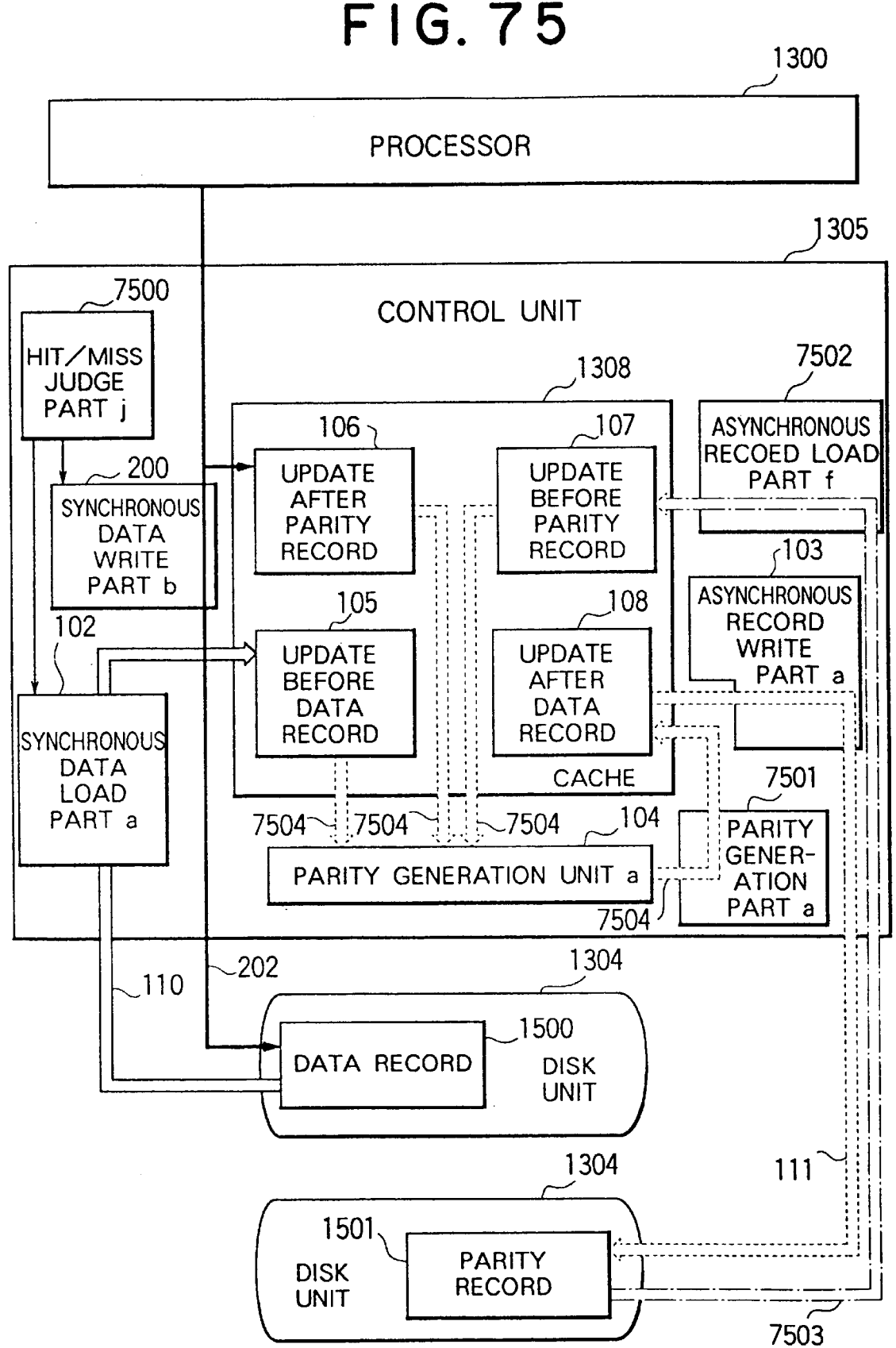
FIG. 75 is a block diagram showing the outline of the operation of the control unit in the first embodiment of the present invention in the case where the generation of the updated value of the parity record is made in asynchronism with a data transfer process of the control unit.

FIG. 75 is a block diagram for explaining still another method 2 which realizes the first embodiment. The method shown in FIG. 75 is characterized in that the generation of an update after parity record 108 is made in asynchronism with a data transfer process of the control unit 1305. Namely, FIG. 75 shows the operation of the control unit 1305 in the first embodiment in the case where the parity generation timing d shown in FIG. 86 is used as a parity generation timing.

The control unit 1305 shown in FIG. 75 generates the update after parity record 108 from an update before data record 105, an update after data record 106 and an update before parity record 107 by use of a parity generation part a 7501 (in conjunction with data lines 7504). Since process parts other than a hit/miss judge part j 7500, an asynchronous record load part f 7502 and the parity generation part a 7501 have already been described, explanation thereof will be omitted.

a) Hit/Miss Judge Part j 7500

Figure 79:
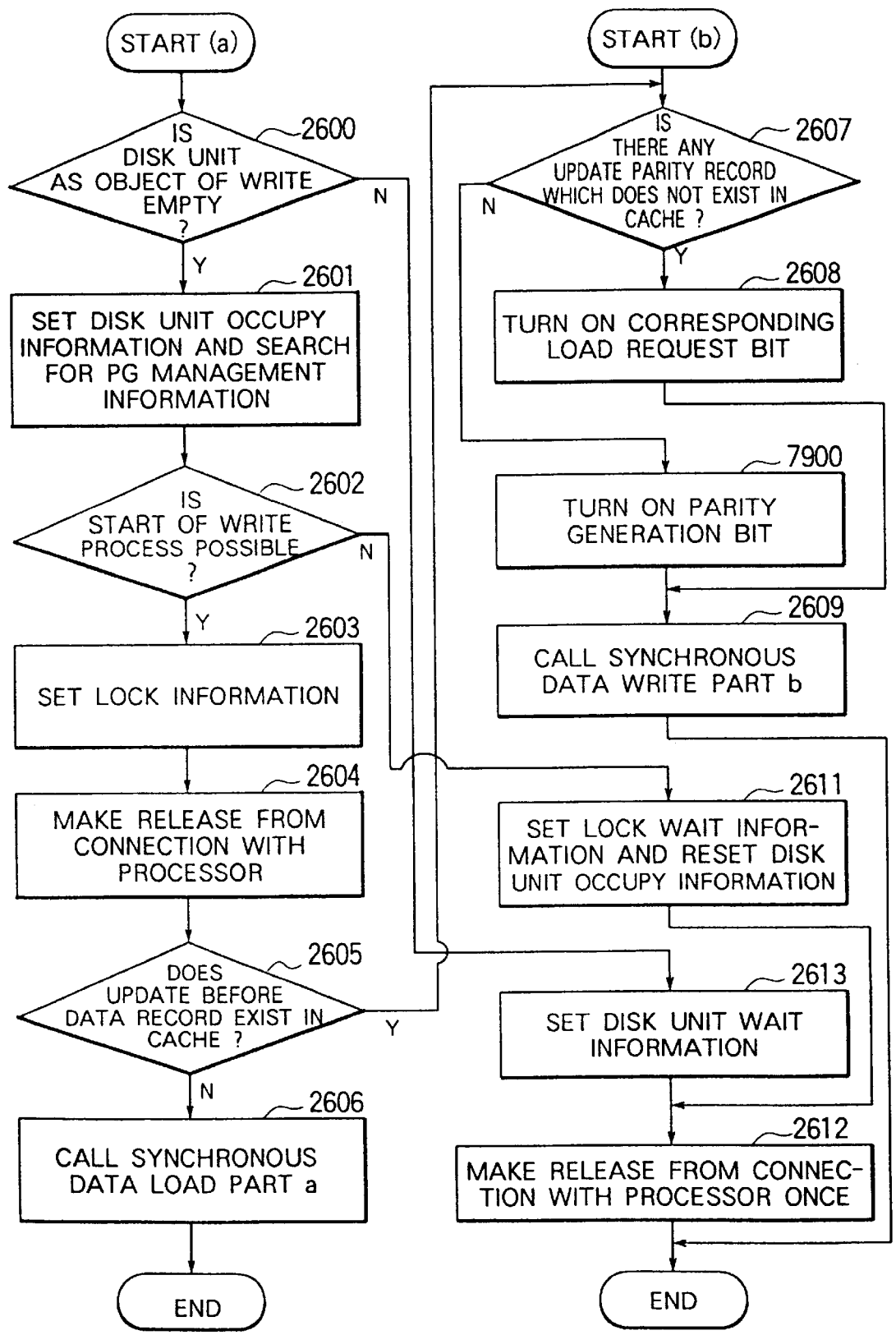
FIG. 79 shows a flow chart of a process performed by a hit/miss judge part j.

FIG. 79 shows the flow chart of a process performed by the hit/miss judge part j 7500 shown in FIG. 75. The hit/miss judge part j 7500 has three execution start points. A first start point is a start point a shown in FIG. 79 or a start point at which the execution is started when a write request from the processor 1300 is received. A second start point is a start point b shown in FIG. 79 or a start point at which the execution is started when a process by the synchronous data load part a 102 is completed. A third start point is a start point when the release from a wait condition is made. The flow of a process performed in conjunction with the third start point is similar to that of the hit/miss judge part a 100 shown in FIG. 27. Since the process flow of the hit/miss judge part j 7500 shown in FIG. 79 is approximately the same as that of the hit/miss judge part a 100 shown in FIG. 26, processings in FIG. 79 corresponding to those shown in FIG. 26 are designated by the same step numbers as those used in FIG. 26 and the difference from FIG. 26 will be explained here. Namely, in the case where the result of check in step 2607 as to whether or not there is any one among update before parity records 107 which does not exist in a cache 1308 indicates that all records 107 exist in the cache 1308, the control unit 1305 turns on a parity generation bit 2206 in step 7900 and thereafter transfers the process to step 2609.

b) Asynchronous Record Load Part f 7502

Figure 83:
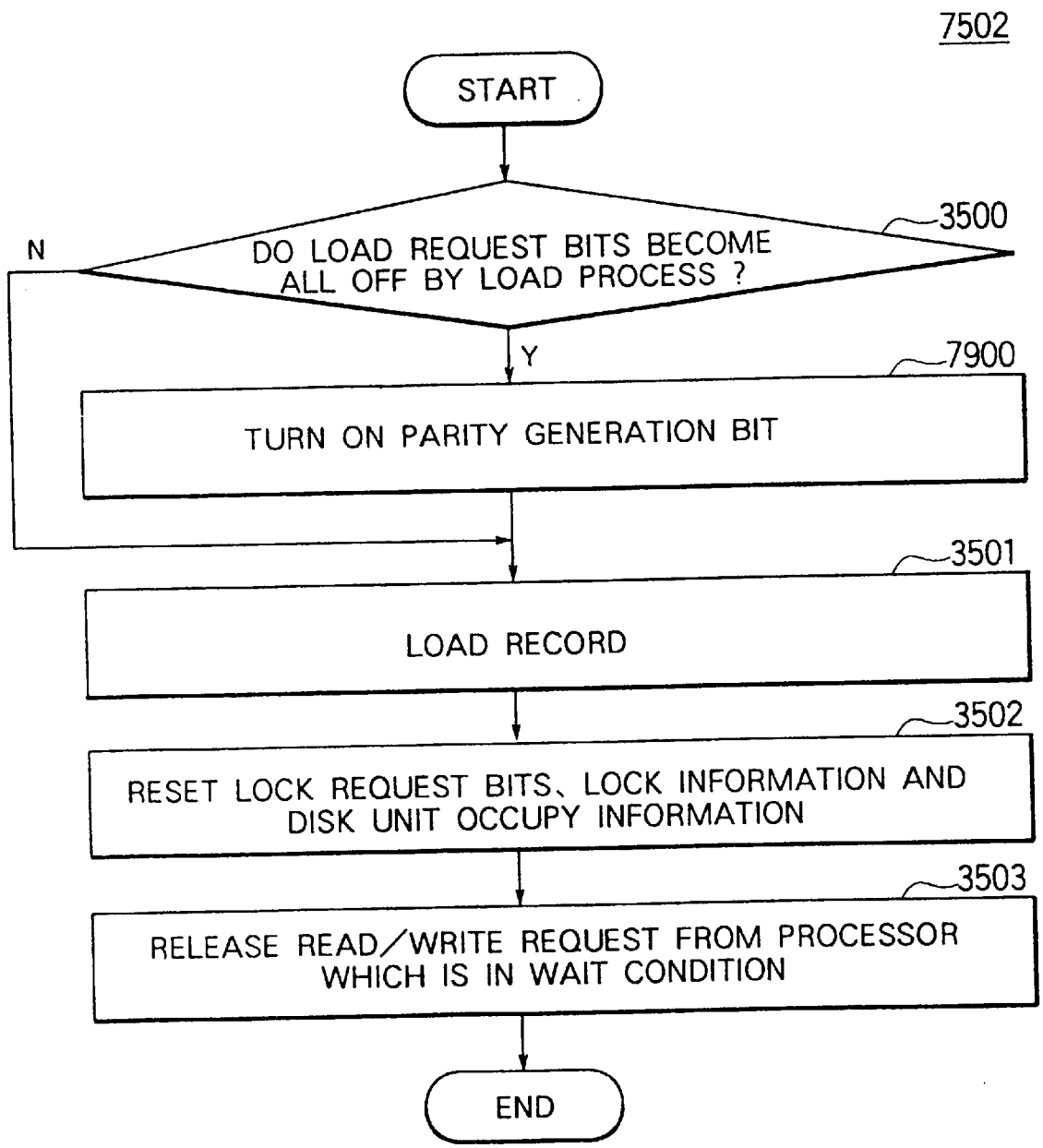
FIG. 83 shows a flow chart of a process performed by an asynchronous record load part f.

FIG. 83 shows the flow chart of a process performed by the asynchronous record load part f 7502 shown in FIG. 75. This process is performed when a positioning process for a disk unit 1304 is completed. The flow of a process performed using a time when the control unit 1305 is idle, is the same as that shown in FIG. 34. Since the process flow of the asynchronous record load part f 7502 shown in FIG. 83 is approximately the same as that of the asynchronous record load part a 103 shown in FIG. 35, processings in FIG. 83 similar to those shown in FIG. 35 are designated by the same step numbers as those used in FIG. 35 and the difference from FIG. 35 will be explained here. Namely, in the case where load request bits become all OFF (in step 3500), the control unit 105 turns on a parity generation bit 2206 in step 7900.

c) Parity Generation Part a 7501

Figure 84:
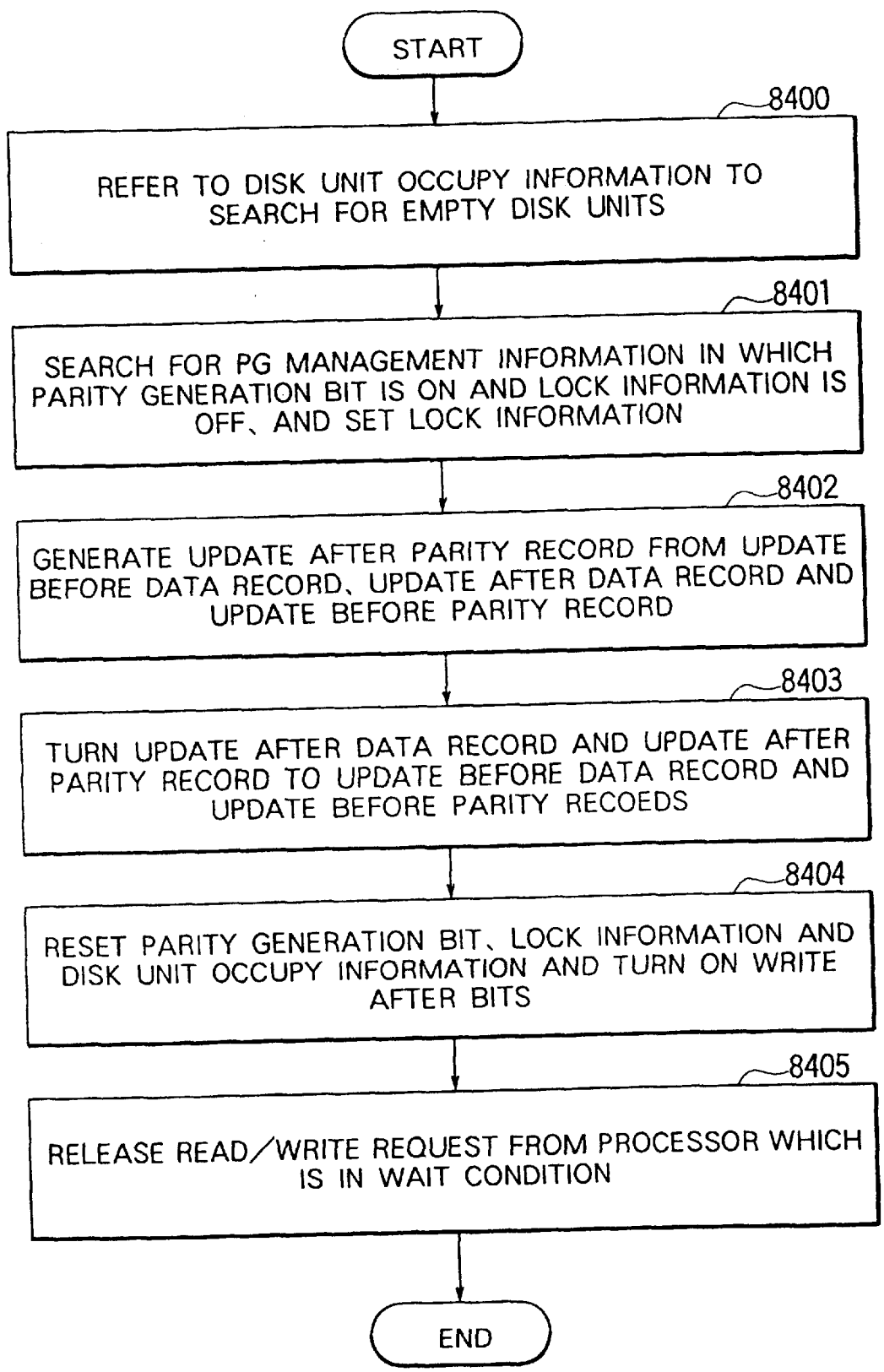

FIG. 84 shows the flow chart of a process performed by the parity generation part a 7501 shown in FIG. 75.

In step 8400, the control unit 1305 refers to disk unit occupy information 2004 to search for disk units 104 which are empty. In step 8401, the control unit 105 searches the searched-out empty disk units 104 for PG management information 2001 in which a parity generation bit 2206 is ON and lock information 2204 is OFF, and turns on the lock information 2204.

In step 8402, the control unit 1305 generates an update after parity record 108 from an update before data record 105, an update after data record 106 and an update before parity record 107. In step 8403, the control unit 1305 turns, the update after data record 106 corresponding to a data record 1500 made the object of write and all the update after parity records 108, to an update before data record 105 and update before parity records 107, respectively. A specific processing for that purpose is the same as that in step 3102 explained in conjunction with FIG. 31.

In step 8404, the control unit 1305 sets values into write after bits 2202 corresponding to all the parity records 1501 and resets a parity generation bit 2206, lock information 2204 and disk unit occupy information 2004. Finally, in step 8405, the control unit 1305 refers to lock wait information 2205 and disk unit wait information 2005 to release a read/write request from the processor 1300 which is in a wait condition.

3. Second Embodiment

1) Outline

As shown in FIG. 87, a second embodiment is an embodiment in which the parity group hit/miss judge process a 6500 and the asynchronous process b 6900 are combined. The parity generation timings a to d are relevant to the second embodiment.

Figure 4:
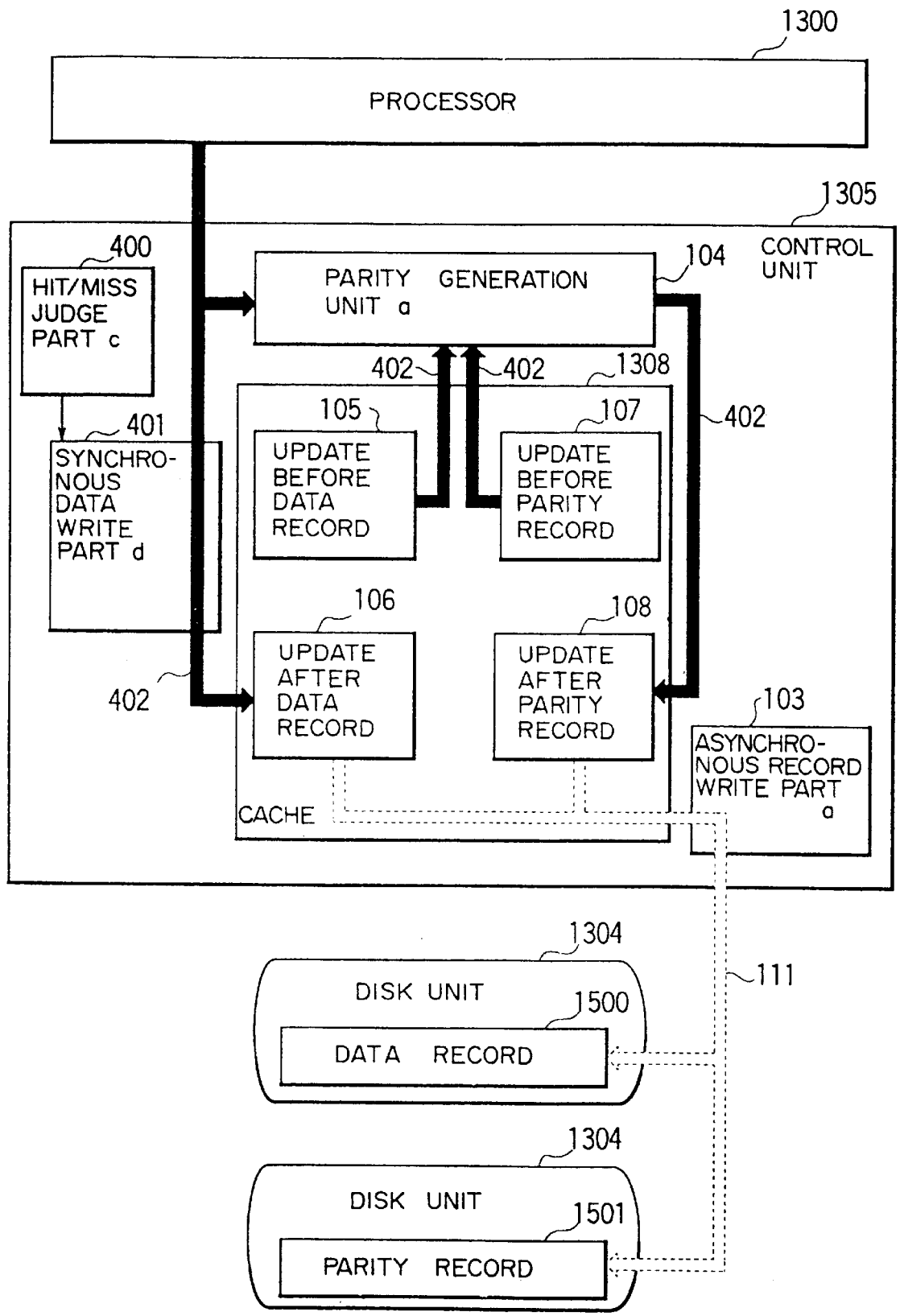
FIG. 4 is a block diagram showing the outline of the operation of a control unit in a second embodiment of the present invention in the case where when the control unit receives a write request from a processor, data necessary for generation of an updated value of a parity record is stored in a cache.

FIG. 4 shows the operation of a control unit 1305 in the second embodiment in the case where an update before data record 105 corresponding to a data record 1500 made the object of write and all update before parity records 107 in the corresponding parity group 1600 exist in a cache 1308. Namely, FIG. 4 shows the operation of the control unit 1305 in the second embodiment in the case where the parity generation timing a shown in FIG. 72 is used as a parity generation timing.

In this case, when writing an update after data record 106 into the cache 1308 (and the nonvolatile memory 1400), the control unit 1305 generates an update after parity record 108 by use of a synchronous data write part d 401. In the case where a reliable fast write process 1402 is applied, the synchronous data write part d 401 has a function of writing data received from a processor 1300 into the nonvolatile memory 1400 (in conjunction with a data line 402) though this function is not shown in FIG. 4.

The update after data record 106 and the update after parity record 108 are written into disk units 1304 by use of an asynchronous record write part a 103 (in conjunction with a data line 111) in asynchronism with a read/write request from the processor 1300.

Figure 5:
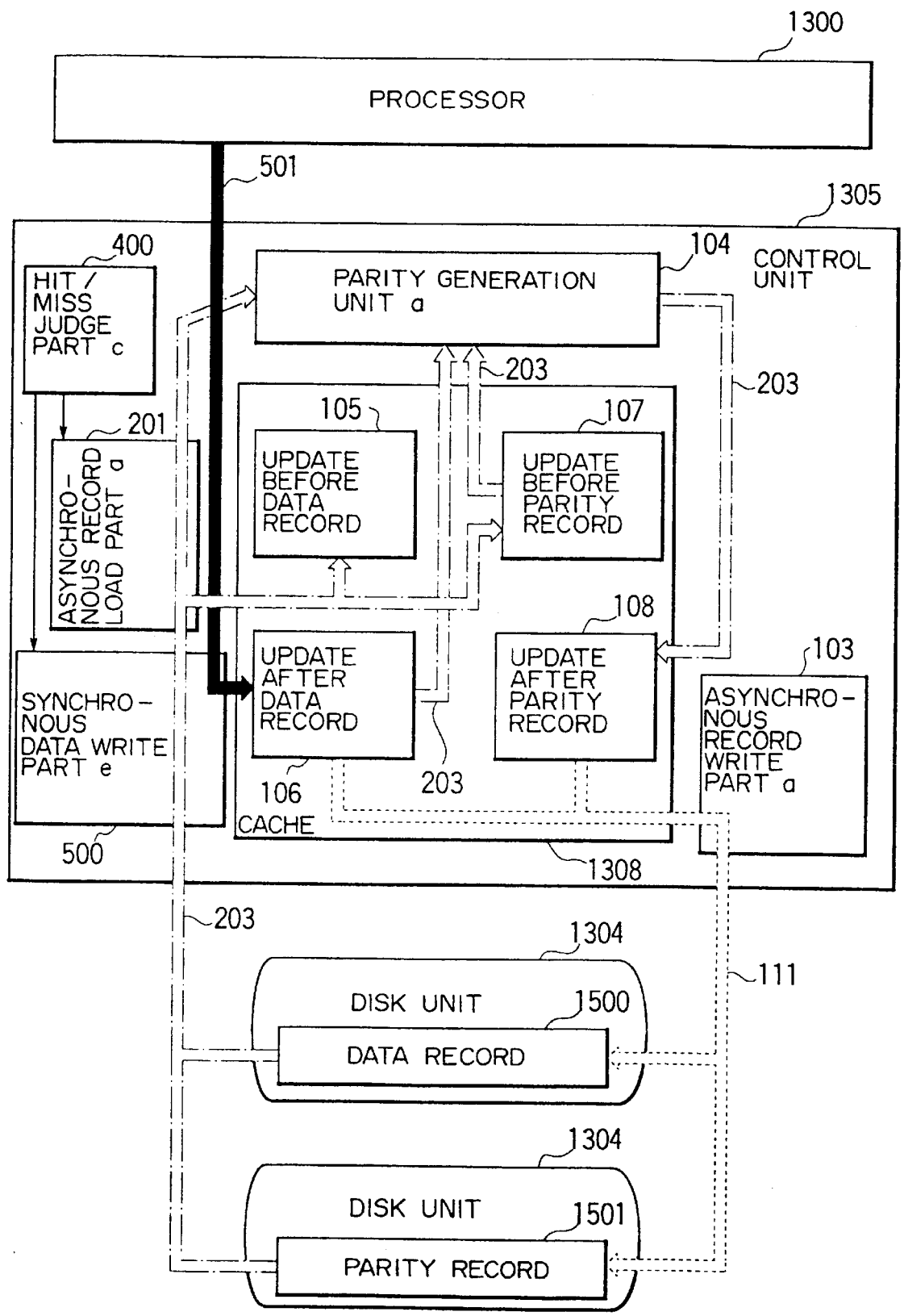
FIG. 5 is a block diagram showing the outline of the operation of the control unit in the second embodiment of the present invention in the case where the control unit receives the write request from the processor, data necessary for generation of the updated value of the parity record is not stored in the cache.

FIG. 5 shows the operation of the control unit 1305 in the second embodiment in the case where there is any one among an update before data record 105 of a data record 1500 made the object of write and all update before parity records 107 in the corresponding parity group 1600 which does not exist in a cache 1308. Namely, FIG. 5 shows the operation of the control unit in the second embodiment in the case where the parity generation timing b shown in FIG. 73 is used as a parity generation timing. In this case, the control unit 1305 load, an updated before data record 105 or an update before parity record 107 which does not exist in the cache 1308, into the cache 1308 by use of a synchronous record load part a 201 in asynchronism with a read/write request from a processor 1300. At a timing when the last data in the assembly or set of an update before data record 105 and update before parity records 107 which do not exist in the cache 1308 is transferred into the cache 1308, update after parity records 108 for all parity records 1501 are generated (in conjunction with a data line 203).

As shown in FIG. 5, an update after data record 106 is written into the cache 1308 by a synchronous data write part e 500 (in conjunction with a data line 501). However, at this timing, the update after parity record 108 is not generated. The operation of an asynchronous record write part a 103 is similar to the operation of that shown in FIG. 4.

2) Details Of Processes a) Hit/Miss Judge Part c 400

Figure 43:
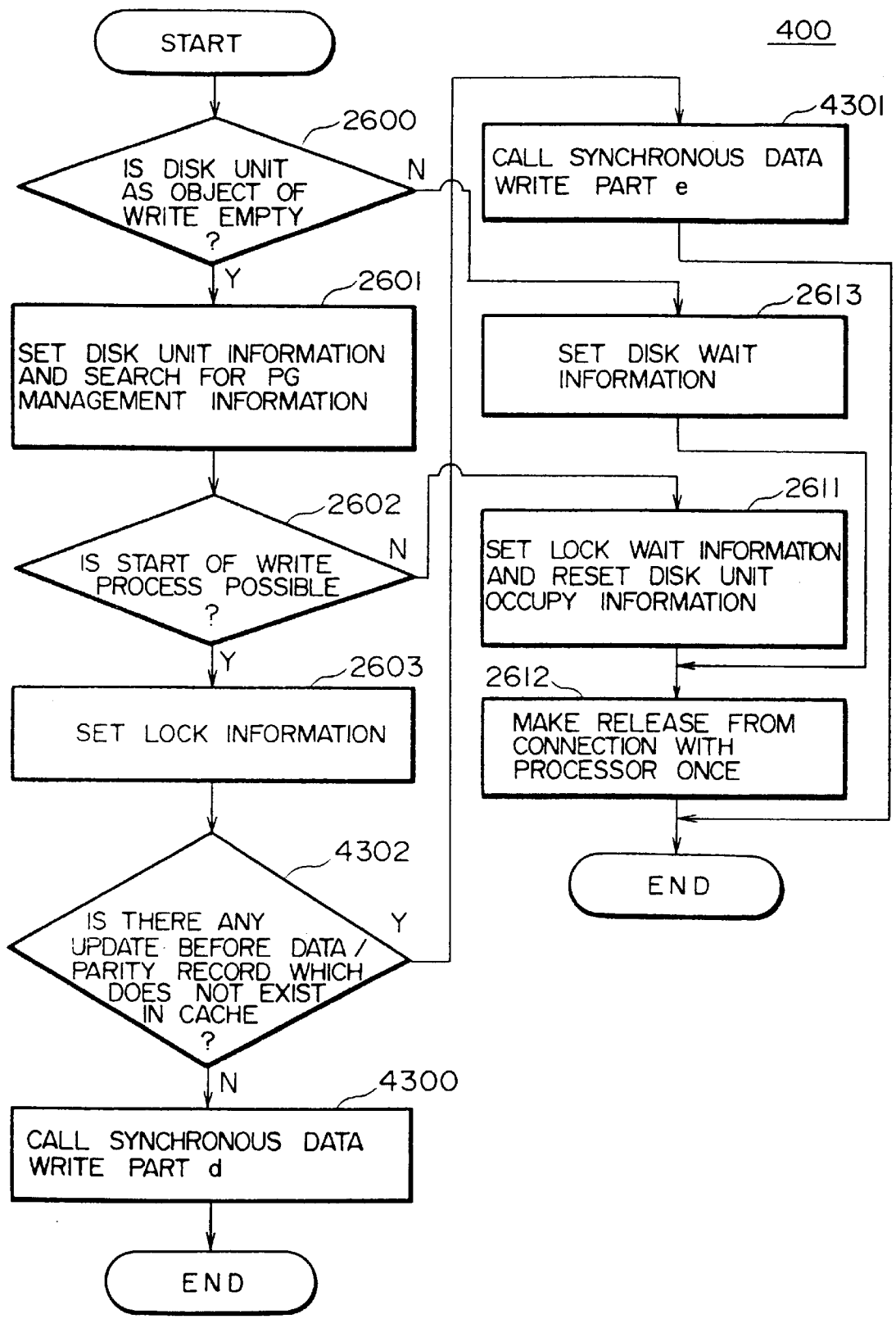
FIG. 43 shows a flow chart of a process performed by a hit/miss judge part c.

FIG. 43 shows the flow chart of a process performed by a hit/miss judge part c 400. The flow chart shown in FIG. 43 illustrates the flow of a process performed when a write request is received from the processor 1300. The flow of a process performed by the hit/miss judge part c 400 when the release from a wait condition is made, is the same as the process flow shown in FIG. 27. The process flow of the hit/miss judge part c 400 shown in FIG. 43 is approximately the same as that of the hit/miss judge part a 100 shown in FIG. 26. Therefore, processings in FIG. 43 corresponding to those shown in FIG. 26 are designated by the same step numbers used in FIG. 26 and the difference from FIG. 26 will now be explained here.

In step 4302, the control unit 1305 checks whether or not there is any record among an update before data record 105 and all updates before parity records 107 in the corresponding parity group 1600 which does not exist in the cache 1308. In the case where all the above records exist in the cache, the control unit 1305 calls the synchronous data write part d 401 in step 4300, thereby completing the process. In the case where there is any record which does not exist in the cache, the control unit 1305 calls the synchronous data write part e 500 in step 4301, thereby completing the process.

b) Synchronous Data Write Part d 401

Figure 44:
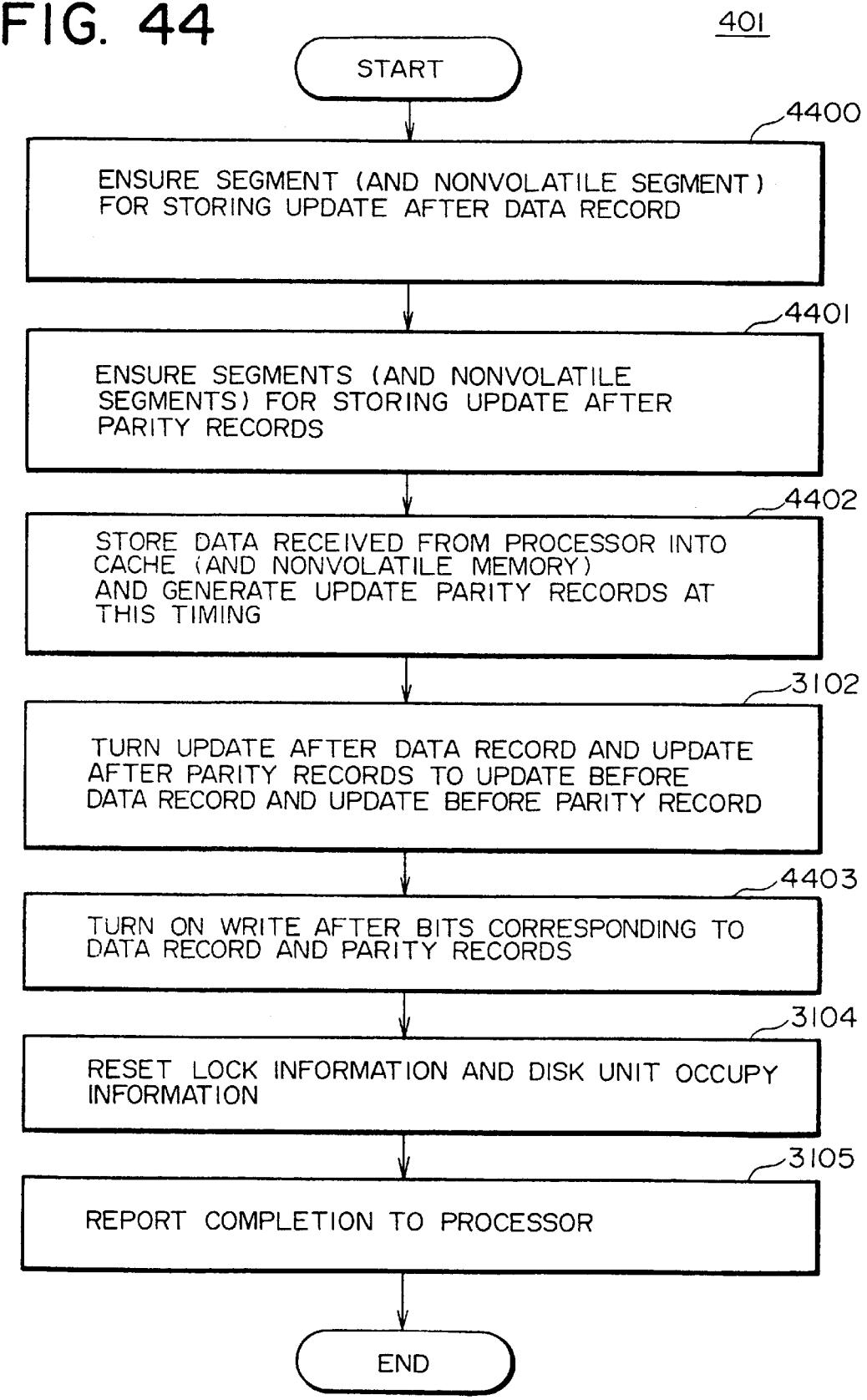
FIG. 44 shows a flow chart of a process performed by a synchronous data write part d.

FIG. 44 shows the flow chart of a process performed by the synchronous data write part d 401. The flow chart shown in FIG. 44 illustrates the flow of a process performed by the synchronous data write part d 401 when it is called by the hit/miss judge part c 400. The process flow of the synchronous data write part d 401 shown in FIG. 44 corresponds to that of the synchronous data write part a 101 shown in FIGS. 30 and 31. Therefore, processings in FIG. 44 corresponding to those shown in FIGS. 30 and 31 are designated by the same step numbers as those used in FIGS. 30 and 31 and the difference from FIGS. 30 and 31 will now be explained.

In step 4400, the control unit 1305 ensures a segment 1800 for storing an update after data record 106. In step 4401, the control unit 1305 ensures segments 1800 for storing all update after parity records 108. (In the case where the records are to be also stored into the nonvolatile memory 1400, nonvolatile segments 2500 are ensured in steps 4400 and 4401.)

In step 4402, the control unit 1305 performs the following processings.
1 Data received form the processor 1300 is stored as an update after data record 106 into a segment 1800 indicated by an update after segment pointer 2201.
2 All update after parity records 108 are generated from an update before data record 105, the data received from the processor 1300 and all update before parity records 107, and the generated records 108 are stored into segments indicated by the corresponding update after segment pointers 2201.
(In the case where the data are to be also stored into the nonvolatile memory 1400, the data are stored into nonvolatile segments 2500 in the above processings 1 and 2.)

Further, in step 4403, the control unit 1305 sets values into write after bits 2202 corresponding to a data record 1500 for which a write request was accepted and all parity records 1501.

c) Synchronous Data Write Part e 500

Figure 45:
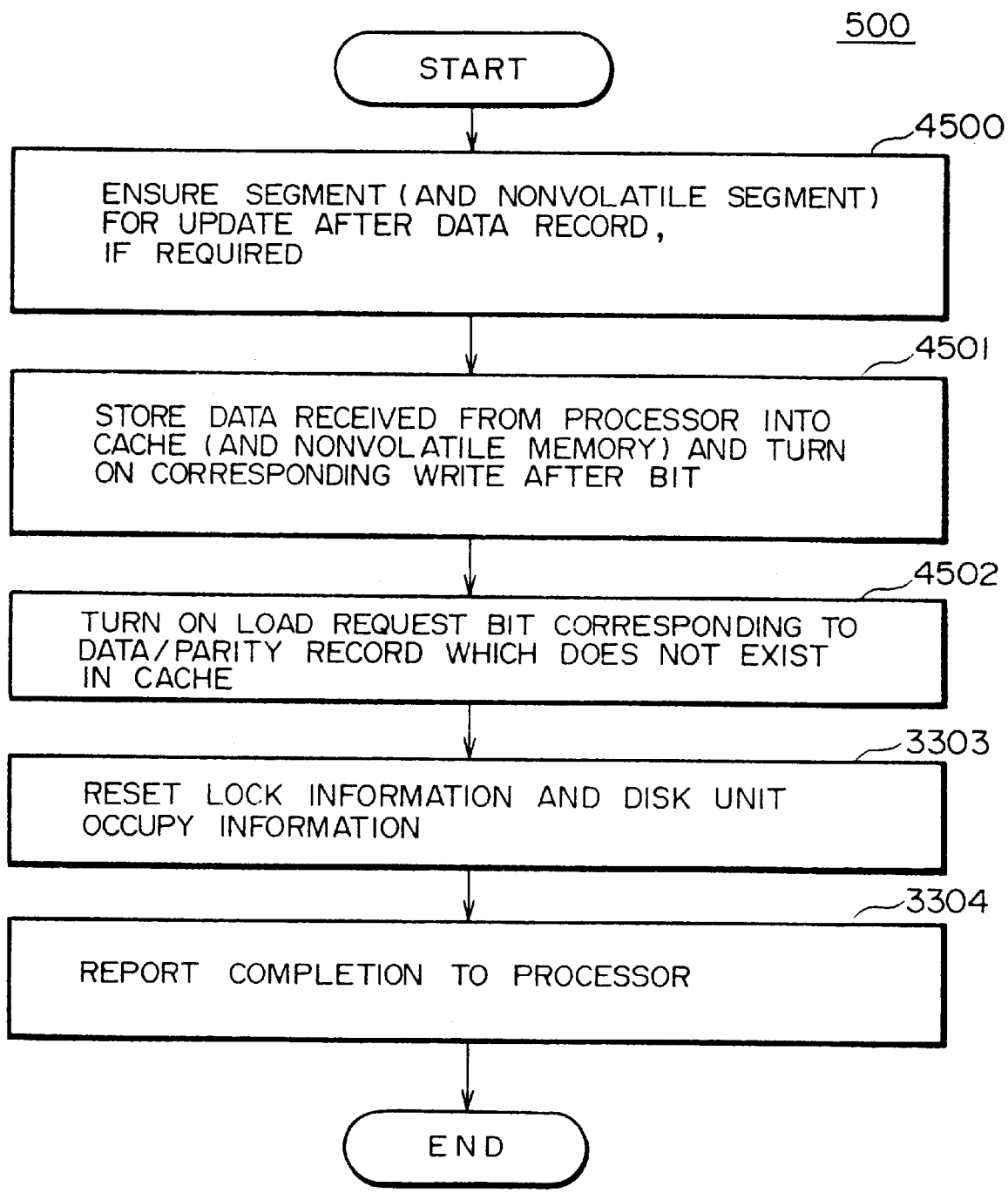
FIG. 45 shows a flow chart of a process performed by a synchronous data write part e.

FIG. 45 shows the flow chart of a process performed by the synchronous data write part e 500. The flow chart shown in FIG. 45 illustrates the flow of a process performed by the synchronous data write part e 500 is called by the hit/miss judge part c 400. The process flow of the synchronous data write part e 500 shown in FIG. 45 corresponds to that of the synchronous data write part b 200 shown in FIGS. 32 and 33. Therefore, processings in FIG. 45 corresponding to those shown in FIGS. 32 and 33 are designated by the same step numbers as those used in FIGS. 32 and 33 and the difference from FIGS. 32 and 33 will now be explained.

In step 4500, the control unit 1305 ensures a segment 1800 for storing an update after data record 106. In step 4501, the control unit 1305 stores data received from the processor 1300 into the segment 1800 indicated by an update after segment pointer 2201 and turns on the corresponding write after bit 2202. At this time, data in a segment indicated by an update before segment pointer 2200 is held. The reason has already been mentioned in conjunction with the first embodiment. (In the case where the data is to be also stored into the nonvolatile memory 1400, a nonvolatile segment 2500 is ensured in step 4500 and the data is stored into the nonvolatile segment 2500 in step 4501.)

In step 4502, in the case where the cache does not include therein an update before data record 105 of the data record 1500 for which the write request was accepted, and all the update before parity records 107, the control unit 1305 sets the corresponding load request bit.

The processes performed by the other process parts or the asynchronous record load part a 201 and the asynchronous record write part a 103 are the same as those shown and explained in conjunction with the first embodiment.

3) Other Method 1 For Realization Of Second Embodiment

Figure 6:
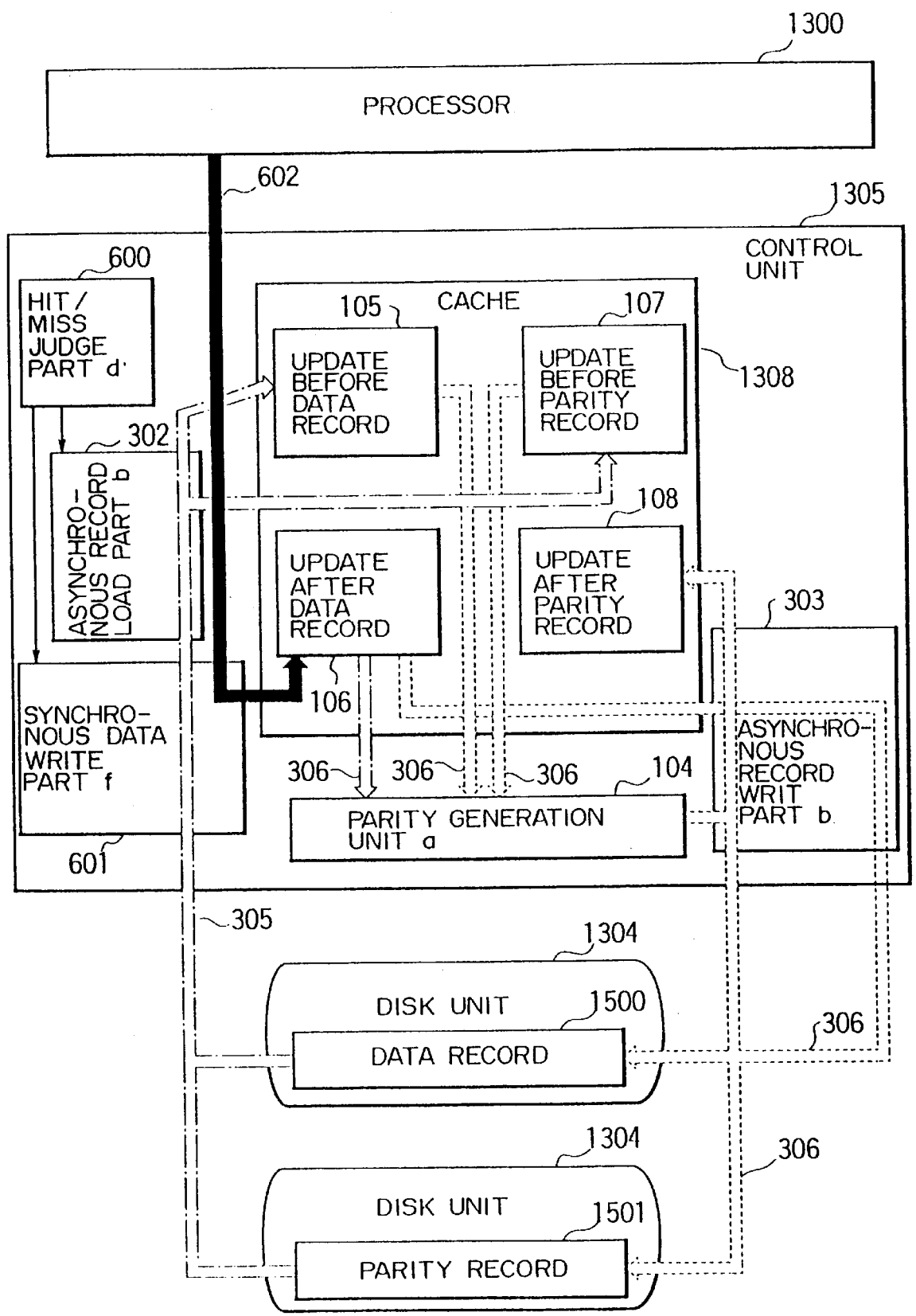
FIG. 6 is a block diagram showing the outline of the operation of the control unit in the second embodiment of the present invention in the case where while generating the updated value of the parity record, the control unit writes the updated value into a disk unit.

FIG. 6 is a block diagram for explaining another method 1 which realizes the first embodiment. This method is different from the method shown in FIGS. 4 and 5 in that the timing of generation of an update after parity record 108 is a timing when the update after parity record 108 itself is written into a disk unit 1304. Namely, FIG. 6 shows the operation of the control unit 1305 in the second embodiment in the case where the parity generation timing c shown in FIG. 74 is used as a parity generation timing.

In FIG. 6 too, the control unit 1305 generates the update after parity record 108 by use of an asynchronous record write part b 302 (in conjunction with a data line 306) in a manner similar to that in the first embodiment shown in FIG. 3.

a) Hit/Miss Judge Part d 600

Figure 46:
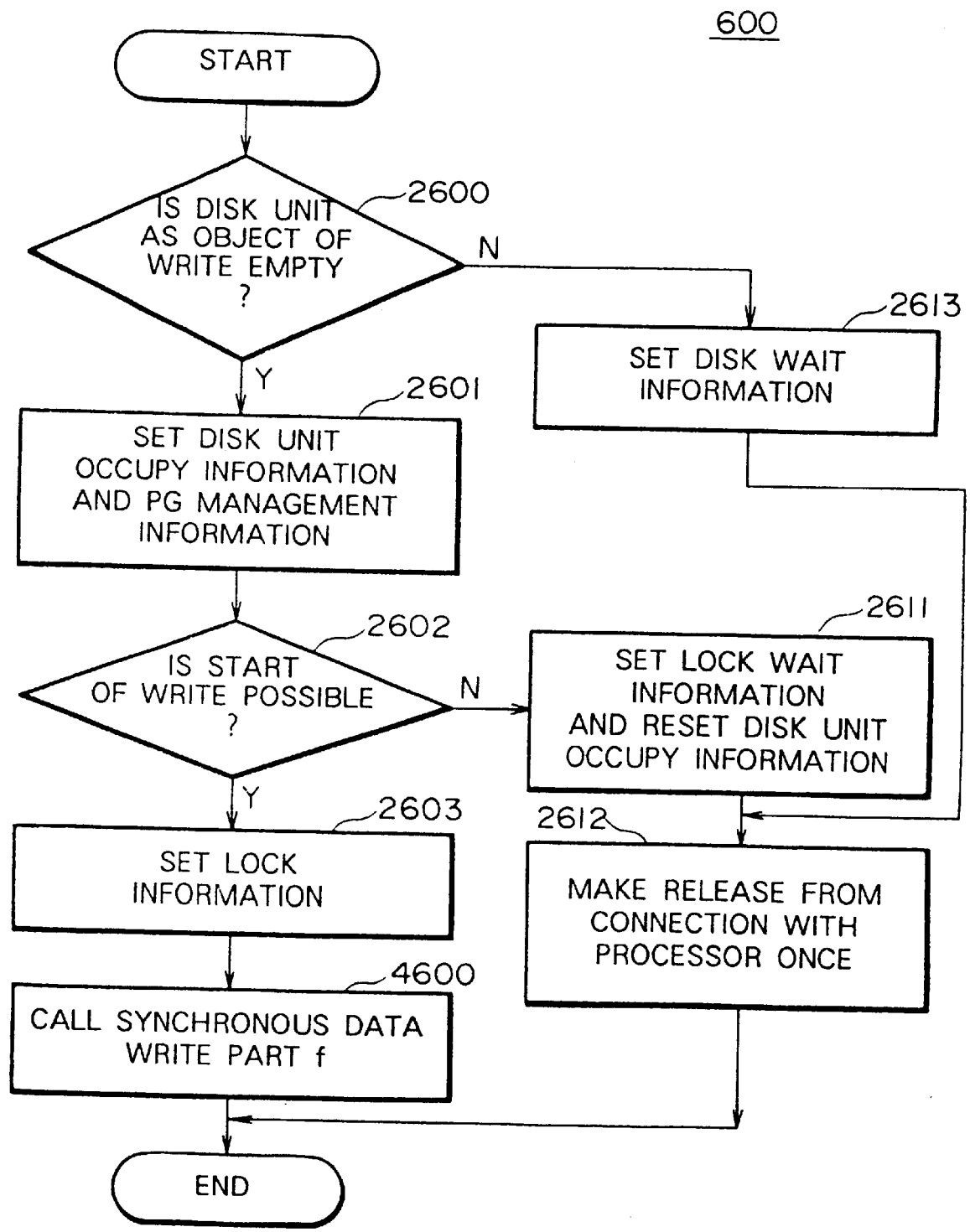
FIG. 46 shows a flow chart of a process performed by a hit/miss judge part d.

FIG. 46 shows the flow chart of a process performed by a hit/miss judge part d 600. The flow chart shown in FIG. 46 illustrates the flow of a process performed when a write request from a processor 1300 is received. The flow of a process performed by the hit/miss judge part d 600 when the release from a wait condition is made, is the same as that shown in FIG. 27. Since the process flow of the hit/miss judge part d 600 shown in FIG. 46 corresponds to that of the hit/miss judge part c 400 shown in FIG. 43, processings in FIG. 46 corresponding to those shown in FIG. 43 are designated by the same step numbers as those used in FIG. 43 and the difference from FIG. 43 will now be explained.

In step 4600, the control unit 4600 calls a synchronous data write part f 601 unconditionally in order to receive data for a data record 1500 made the object of write from the processor 1300. The other processings are the same as those shown in FIG. 43.

b) Synchronous data write part f 601

Figure 47:
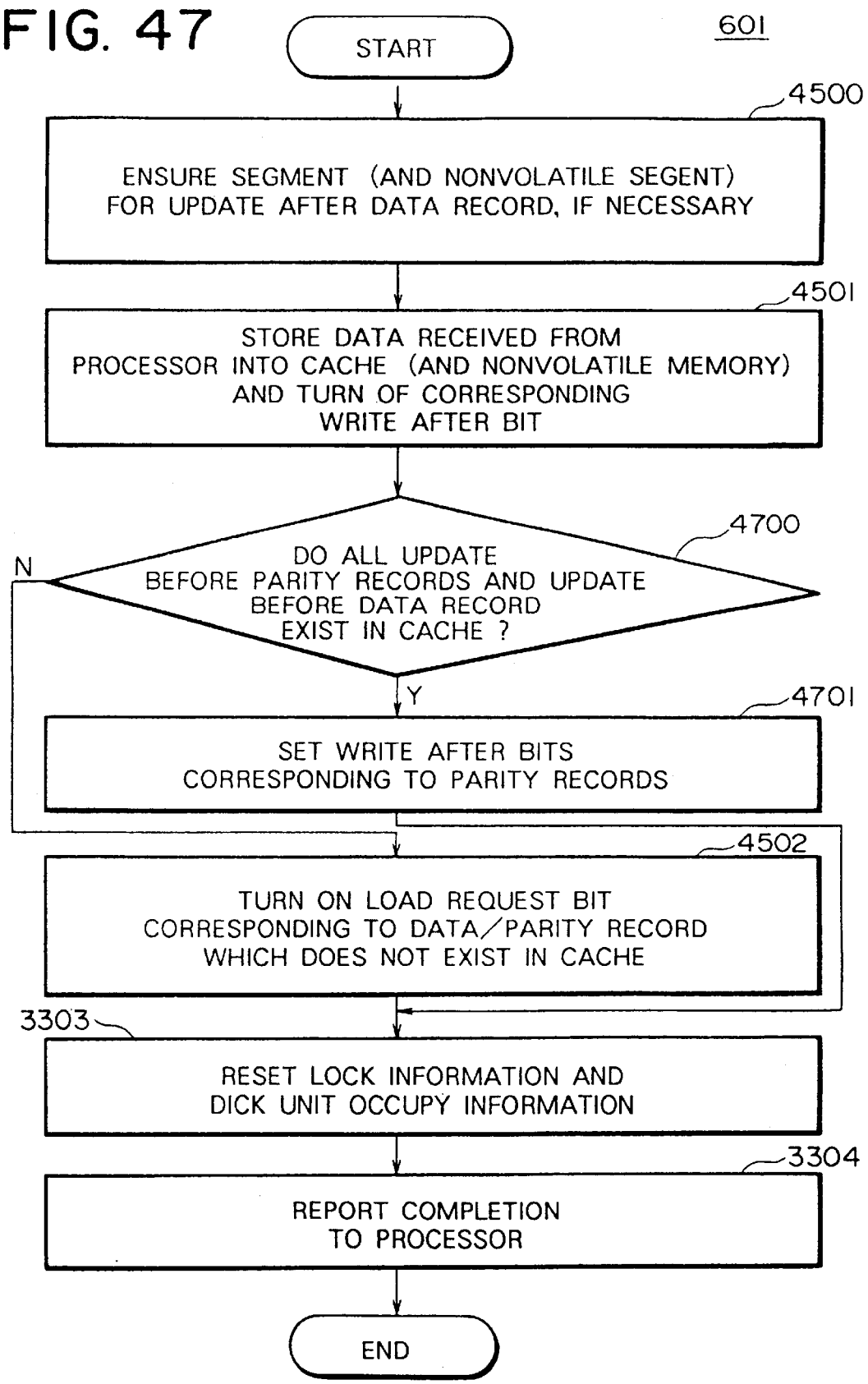
FIG. 47 shows a flow chart of a process performed by a synchronous data write part f.

FIG. 47 shows the flow chart of a process performed by the synchronous data write part f 601. The flow chart shown in FIG. 47 illustrates the flow of a process performed by the synchronous data write part f 601 when it is called by the hit/miss judge part d 600. Since the process flow of the synchronous data write part f 601 shown in FIG. 47 is approximately the same as that of the synchronous data write part e 500 shown in FIG. 45, processings in FIG. 47 corresponding to those shown in FIG. 45 are designated by the same step numbers as those used in FIG. 45 and the difference from FIG. 45 will now be explained.

In step 4700, the control unit 1305 checks whether nor not all update before parity records 107 and an update before data record 105 are stored in the cache 1308. If there is any record 107 which is not stored, the flow jumps to step 4502. If all the records 107 are stored, the control unit 1305 turns on write after bits corresponding to all the update after parity records 107 in step 4701 and thereafter the flow goes to the step 3303.

4) Other Method 2 for Realization of Second Embodiment

Figure 76:
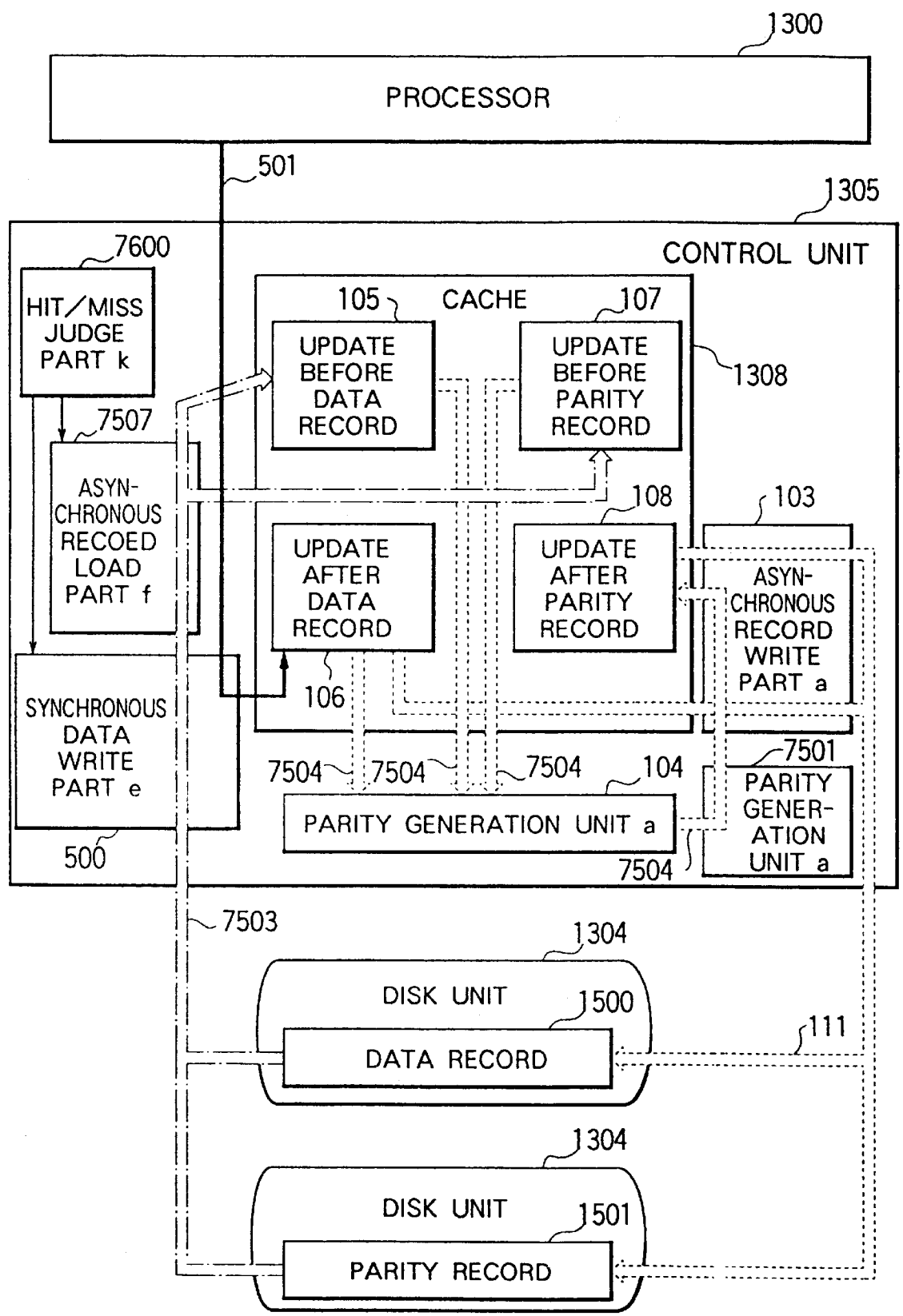
FIG. 76 is a block diagram showing the outline of the operation of the control unit in the second embodiment of the present invention in the case where the generation of the updated value of the parity record is made in asynchronism with a data transfer process of the control unit.

FIG. 76 is a block diagram for explaining still another method 2 which realizes the second embodiment. The method shown in FIG. 76 is characterized in that the generation of an update after parity record 108 is made in asynchronism with a data transfer process of the control unit 1305. Namely, FIG. 76 shows the operation of the control unit 1305 in the second embodiment in the case where the parity generation timing d shown in FIG. 86 i used as a parity generation timing. As shown in FIG. 76, the control unit 1305 generates an update after parity record 108 from an update before data record 105, an update after data record 106 and an update before parity record 107 by use of a parity generation part a 7501 (in conjunction with data lines 7504). Since process parts other than a hit/miss judge part k 7600 as mentioned hereinbelow have already been described, explanation thereof will be omitted.

a) Hit/Miss Judge Part k 7600

Figure 80:
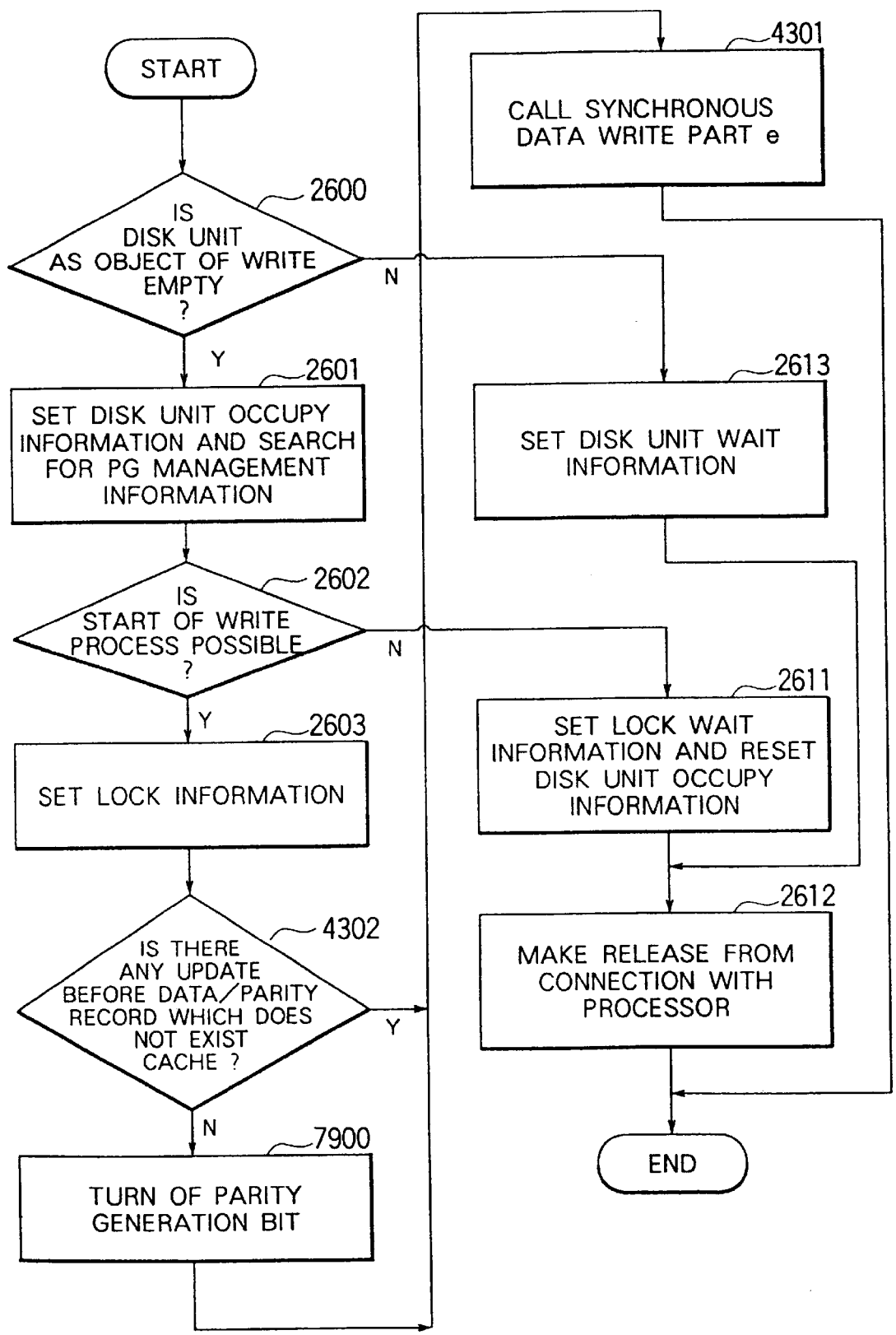
FIG. 80 shows a flow chart of a process performed by a hit/miss judge part k.

FIG. 80 shows the flow chart of a process performed by a hit/miss judge part k 7600. The hit/miss judge part k 7600 has two execution start points. A first start point is a start point shown in FIG. 80 or a start point at which the execution is started when a write request from the processor 1300 is received. A second start point is a start point when the release from a wait condition is made. The flow of a process performed in conjunction with the second start is similar to that of the hit/miss judge part a 100 shown in FIG. 27.

The process flow of the hit/miss judge part k 7600 shown in FIG. 80 corresponds to that of the hit/miss judge part a 100 shown in FIG. 26. Therefore, processings in FIG. 80 corresponding to those shown in FIG. 26 are designated by the same step numbers as those used in FIG. 26 and the difference from FIG. 26 will now be explained.

In step 4302, the control unit 1305 checks whether or not there is any one among an update before data record 105 and an update before parity record 107 which does not exist in the cache 1308. In the case where all the records exist, the control unit 1305 turns on a parity generation bit 2206 in step 7900 and thereafter the flow jumps to step 4301.

4. Third Embodiment

1) Outline

As shown in FIG. 87, a third embodiment is an embodiment in which the parity group hit/miss judge process b 6600 and the asynchronous process c 7000 are combined. The parity generation timings a to d are relevant to the third embodiment.

Figure 7:
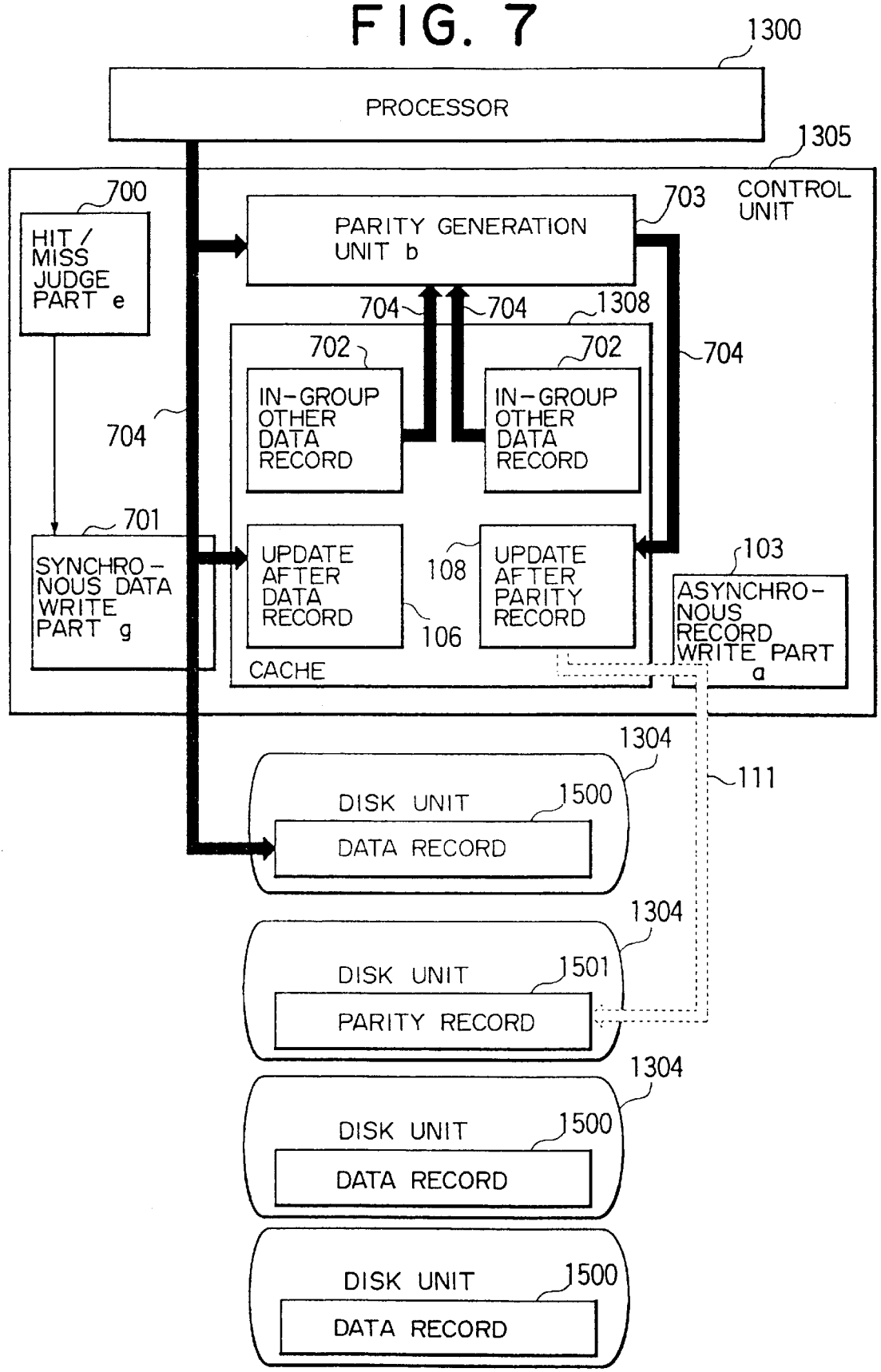
FIG. 7 is a block diagram showing the outline of the operation of a control unit in a third embodiment of the present invention in the case where when the control unit receives a write request from a processor, data necessary for generation of an updated value of a parity record is stored in a cache.

FIG. 7 shows the operation of a control unit 1305 in the third embodiment in the case where all in-group other data records 702 in a parity group 1600, to which a data record 1500 made the object of write belongs, exist in a cache 1308. Namely, FIG. 7 shows the operation of the control unit 1305 in the third embodiment in the case where the parity generation timing a shown in FIG. 72 is used as a parity generation timing. In this case, when an update after data record 106 is written into a disk unit 1304, the control unit 1305 generates an update after parity record 108 by use of a synchronous data write part g 701 (in conjunction with data lines 704). An updated value of a parity record 1501 is generated by a parity record generation unit b 703. The control unit 1305 writes the update after parity record 108 into a disk unit 1304 by use of an asynchronous record write part a 103 (in conjunction with a data line 111) in asynchronism with a read/write request from a processor 1300.

Figure 8:
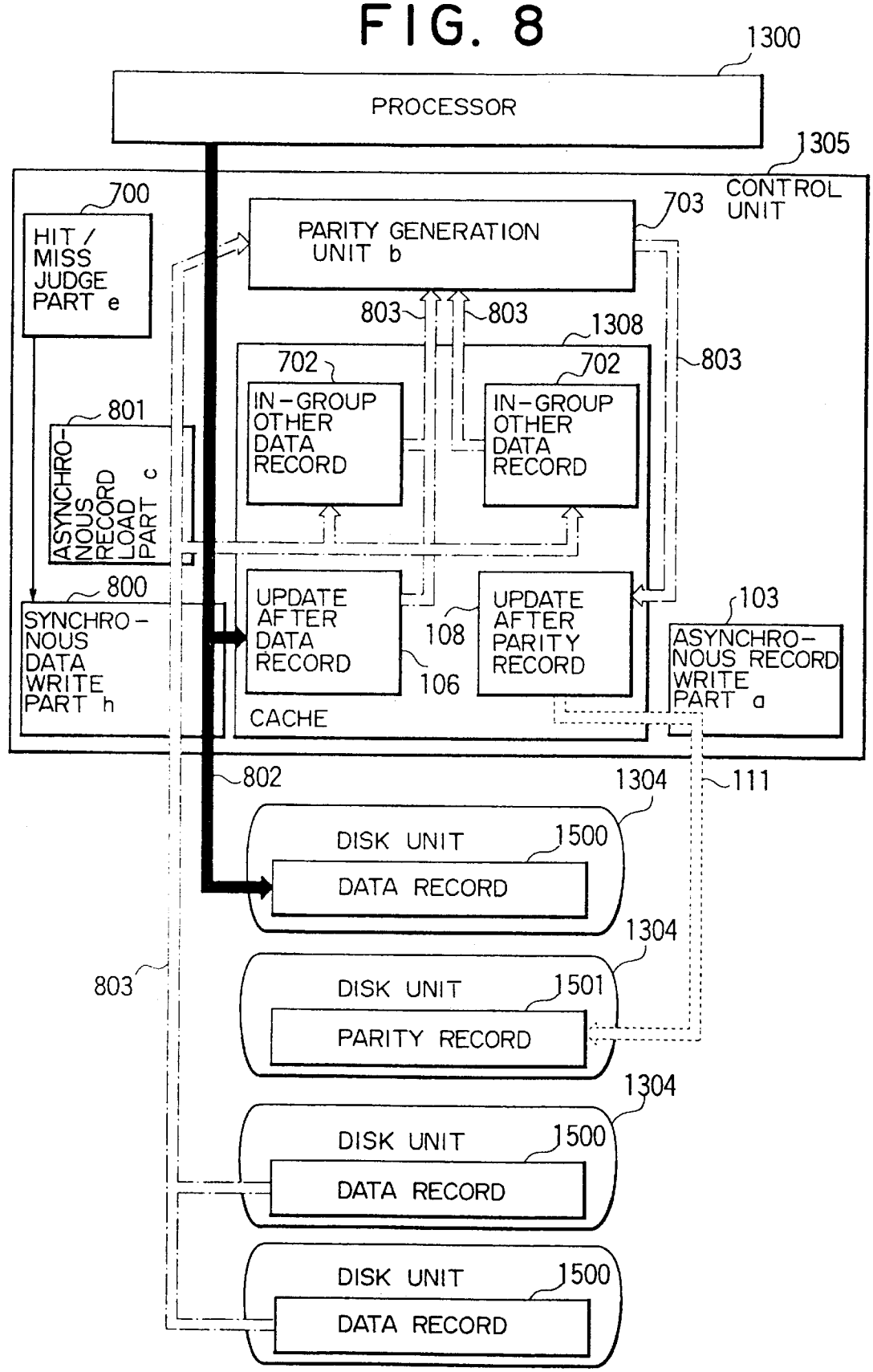
FIG. 8 is a block diagram showing the outline of the operation of the control unit in the third embodiment of the present invention in the case where the control unit receives the write request from the processor, the data necessary for generation of the updated value of the parity record is not stored in the cache.

FIG. 8 shows the operation of the control unit 1305 in the third embodiment in the case where there is any one, among all in-group other data records 702 in a parity group 1600 to which a data record 1500 made the object of write belongs, which does not exist in the cache 1308. Namely, FIG. 8 shows the operation of the control unit 1305 in the third embodiment in the case where the parity generation timing b shown in FIG. 73 is used as a parity generation timing. In this case, the control unit 1305 loads the in-group other data record 702, which does not exist in the cache 1308, into the cache 1308 by use of an asynchronous record load part c 801 (in conjunction with a data line 803) in asynchronism with a read/write request from the processor 1300. When the last one of in-group other data records 702 which do not exist in the cache 1308 is loaded into the cache 1308, update after parity records 108 for all parity records 1501 are generated. As shown in FIG. 8, an update after data record 106 is written into a disk unit 1304 by use of a synchronous data write part h 800 (in conjunction with a data line 802). However, at this timing, the update after parity record 108 is not generated. Since the operation of an asynchronous record write part a 103 is similar to the operation of that shown in FIG. 7, explanation thereof will be omitted.

2) Details of Processes a) Hit/Miss Judge Part e 700

Figure 48:
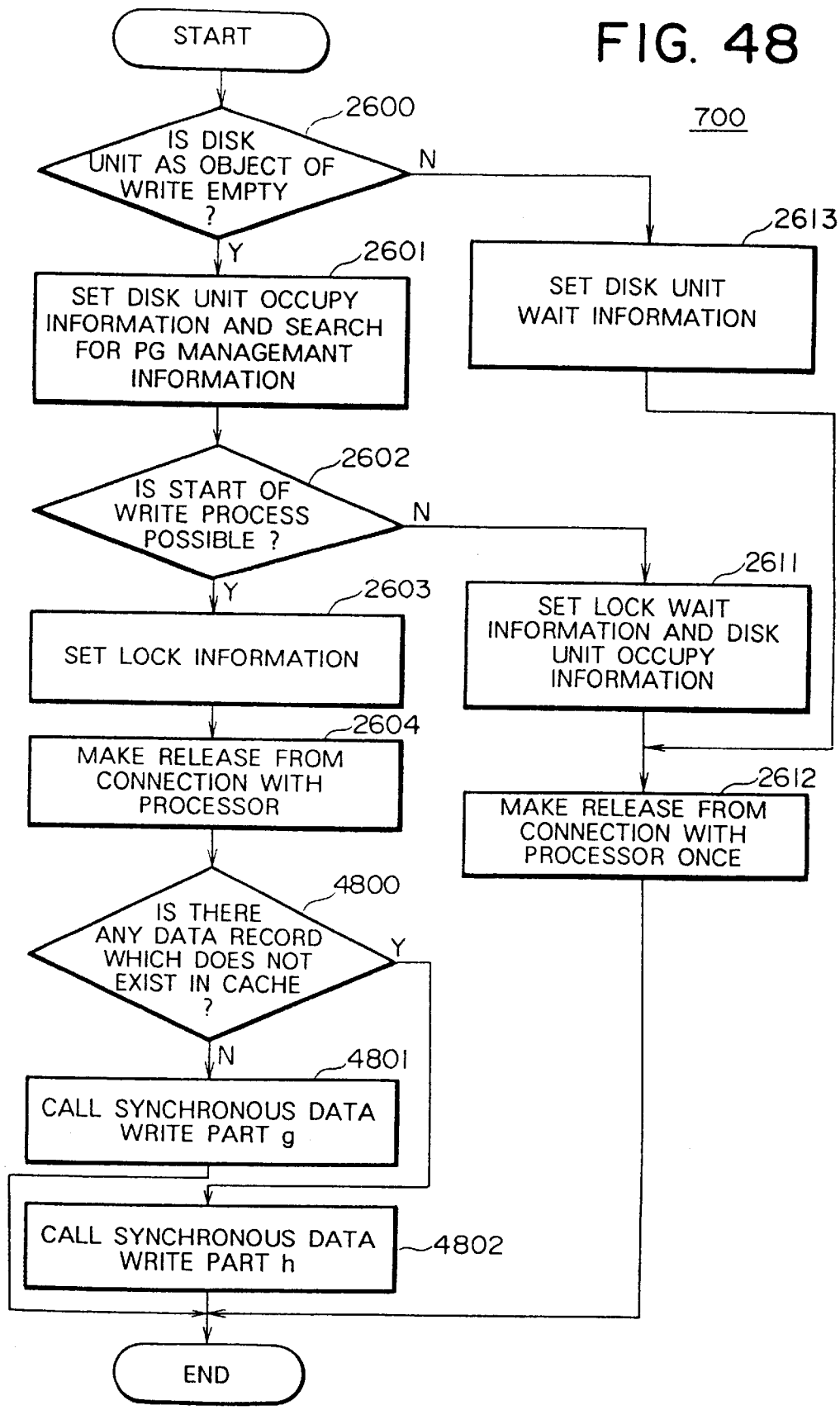
FIG. 48 shows a flow chart of a process performed by a hit/miss judge part e.

FIG. 48 shows the flow chart of a process performed by a hit/miss judge part e 700. The flow chart shown in FIG. 48 illustrates the flow of a process performed when a write request from the processor 1300 is received. The flow of a process performed by the hit/miss judge part e 700 when the release from a wait condition is made, is the same as the process flow shown in FIG. 27. The process flow of the hit/miss judge part e 700 shown in FIG. 48 is approximately the same as that of the hit/miss judge part a 100 shown in FIG. 26. Therefore, processings in FIG. 48 corresponding to those shown in FIG. 26 are designated by the same step numbers as those used in FIG. 26 and the difference from FIG. 26 will now be explained.

In step 4800, the control unit 1305 checks whether or not there is any one, among all in-group other data records 702 in a parity group 1600 to which a data record 1500 made the object of write belongs, which does not exist in the cache 1308. In the case where all the records 702 exist in the cache, the control unit 1305 calls the synchronous data write part g 701 in step 4801, thereby completing the process. In the case where there is any record 702 which does not exist in the cache, the control unit 1305 calls the synchronous data write part h 800 in step 4802, thereby completing the process.

b) Synchronous Data Write Part g 701

Figure 49:
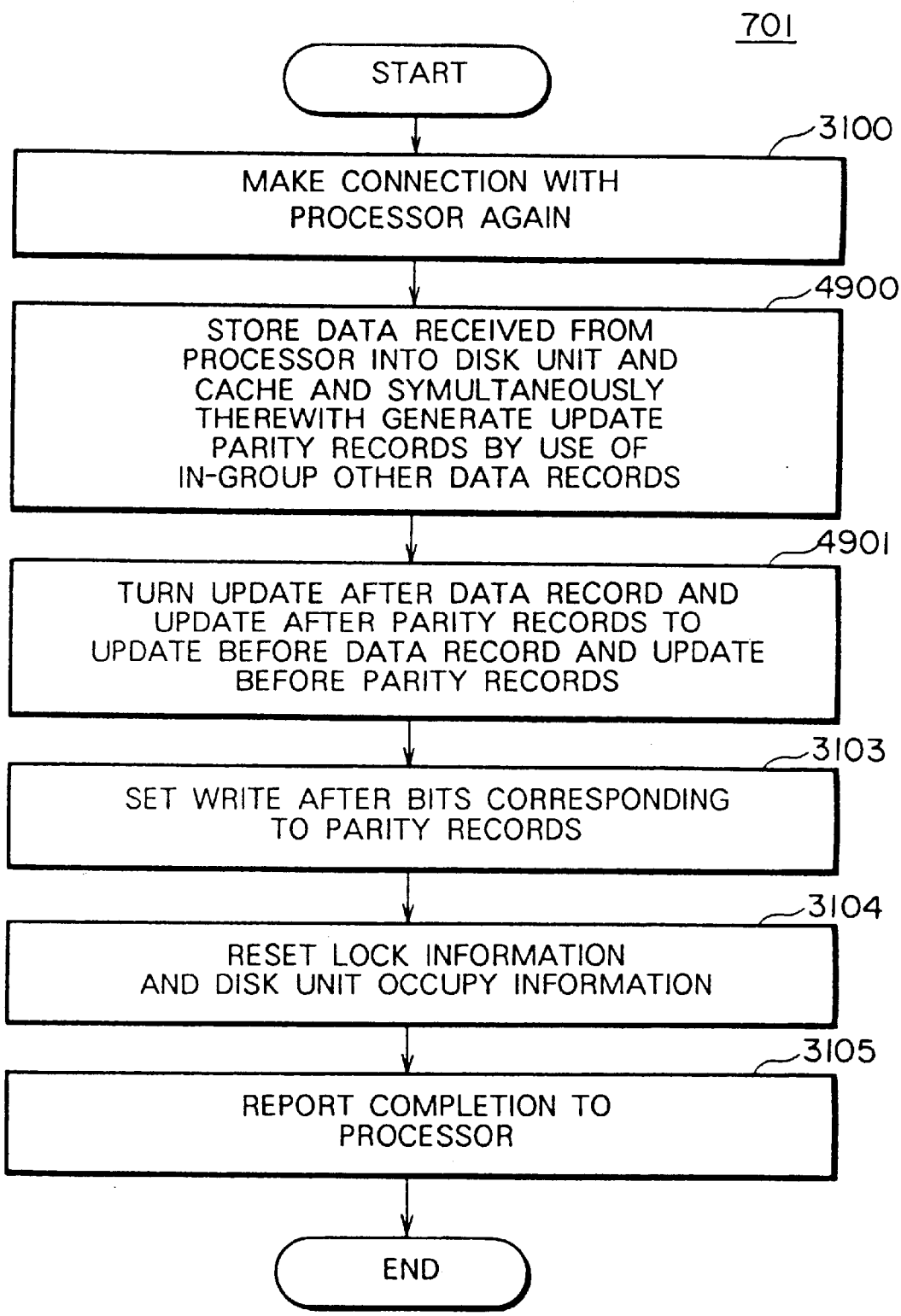
FIG. 49 shows a flow chart of a process performed by a synchronous data write part g.

FIG. 49 shows the flow chart of a process performed by the synchronous data write part g 701 when a positioning process for a disk unit 1304 is completed. The flow of a process performed by the synchronous data write part g 701 when it is called by the hit/miss judge part e 700, is the same as the process flow shown in FIG. 30. The process flow of the synchronous data write part g 701 shown in FIG. 49 is approximately the same as that of the synchronous data write part a 101 shown in FIG. 31. Therefore, processings in FIG. 49 corresponding to those shown in FIG. 31 are designated by the same step numbers as those shown in FIG. 31 and the difference from FIG. 31 will now be explained.

In step 4900, the control unit 1305 writes data received from the processor 1300 into a disk unit 1304 and simultaneously therewith performs the following actions:

1 storing the data received from the processor 1300 as an update after data record 106 into a segment 1800 indicated by an update after segment pointer 2201; and 2 generating all update after parity records 108 from the update after data record 106 received from the processor 1300 and the other in-group data groups 702 in the group and storing the generated records 108 into segments 1800 indicated by the corresponding update after segment pointers 2201.

In step 4901, the control unit 1305 changes the values of update before segment pointers 2200 so as to indicate the segments 1800 having been indicated by the update after segment pointers 2201 corresponding to the data record 1500 made the object of write and all the parity records 1501, and sets null values into the corresponding update after segment pointers 2201. As a result, the update after data record 106 and the update after parity records 108 are turned to an update before data record 105 and update before parity records 107, respectively.

c) Synchronous Data Write Part h 800

Figure 50:
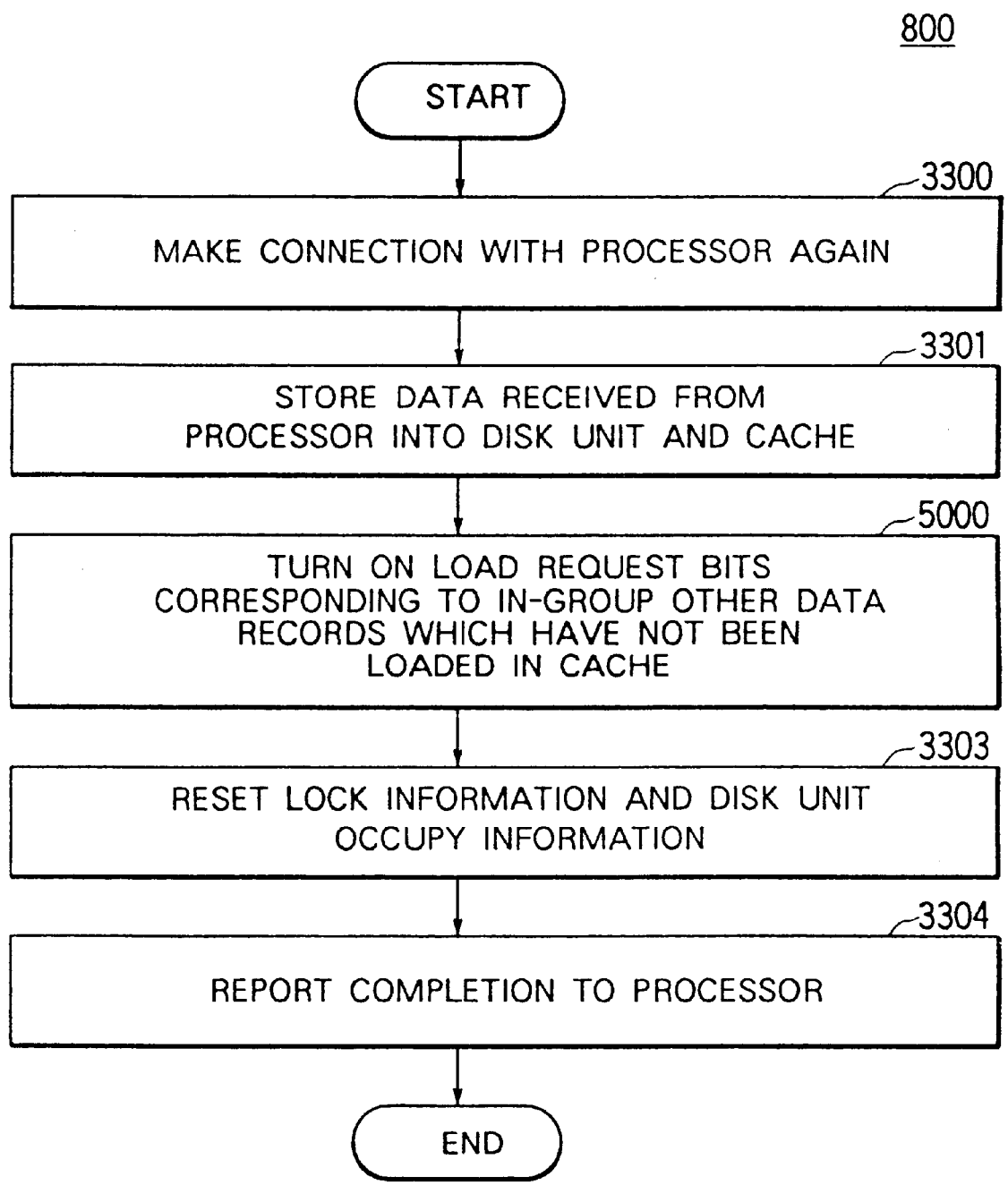
FIG. 50 shows a flow chart of a process performed by a synchronous data write part h.

FIG. 50 shows the flow chart of a process performed by the synchronous data write part h 800. The flow chart shown in FIG. 50 illustrates the flow of a process performed when a positioning process for a disk unit, 1304 is completed. The flow of a process performed by the synchronous data write part h 800 when it is called by the hit/miss judge part e 700, is the same as the process flow shown in FIG. 32. The process flow of the synchronous data write part h 800 shown in FIG. 50 is approximately the same as that of the synchronous data write part b 200 shown in FIG. 33. Therefore, processings in FIG. 50 corresponding to those shown in FIG. 33 are designated by the same step numbers as those used in FIG. 33 and the difference from FIG. 33 will now be explained.

In step 5000, the control unit 1305 turns on lock request bits corresponding to in-group other data records 702 which are not in the same cache 1308. (In the case where a load request bit corresponding to a data record 1500 made the object of write is ON, the bit is turned off.)

d) Asynchronous Record Load Part c 801

Figure 51:
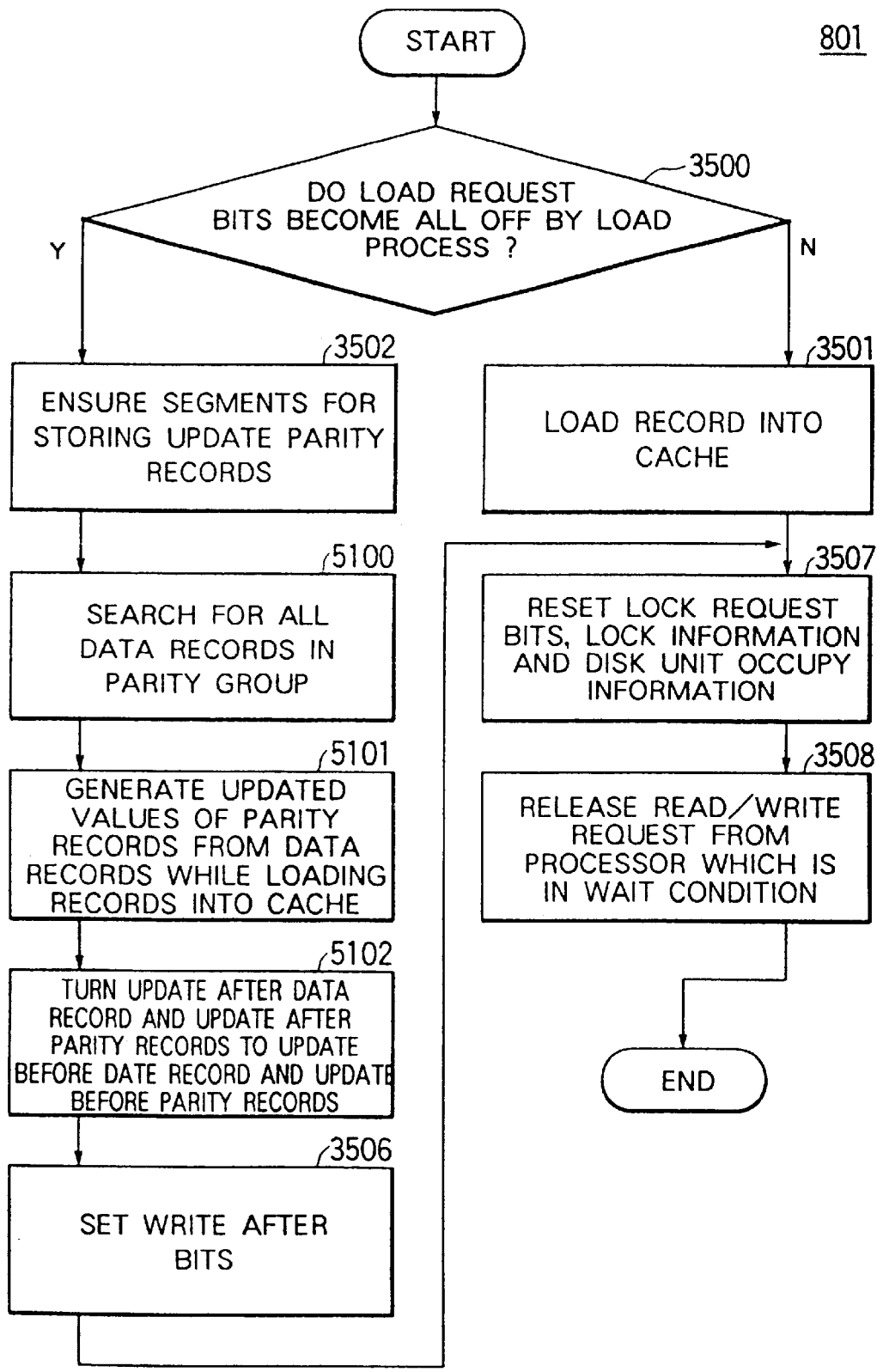
FIG. 51 shows a flow chart of a process performed by an asynchronous record load part c.

FIG. 51 shows the flow chart of a process performed by the asynchronous record load part c 801 when a positioning process for a disk unit 1304 is completed. The flow of a process performed using a time when the control unit 1305 is idle, is the same as the process flow shown in FIG. 34. The process flow of the asynchronous record load part c 801 shown in FIG. 51 is approximately the same as that of the asynchronous record load part a 201 shown in FIG. 35. Therefore, processings in FIG. 51 corresponding to those shown in FIG. 35 are designated by the same step numbers as those used in FIG. 35 and the difference from FIG. 35 will now be explained.

In the case where load request bits 2203 in PG management information 2001 become all OFF by the corresponding load process (in step 3500), the following processings are performed at this timing in order to generate update after parity records 108 for all parity records 1501.

In step 5100, the control unit 1305 searches for segments 1800 corresponding to all data records 1500 to which the corresponding parity group 1600 belongs and which are ones other than a data record 1500 made the object of a load process.

In step 5101, the control unit 1305 performs the following operation while loading the parity record 1501 into a segment 1800 indicated by an update before segment pointer 2200. Namely, the control unit 1305 generates update after parity records 108 for all parity records 1501 by use of the parity generation unit b 703 from the data records 1500 searched out in step 5100 and data records 1500 being loaded. The generated parity records 108 are stored into segments indicated by the corresponding update after segment pointers 2201.

In step 5102, the control unit 1305 changes update before segment pointers 2200 so as to indicate the segments 1800 having been indicated by the update after segment pointers 2201 corresponding to the data record 1500 made the object of write and all the parity records 1501, and sets null values into the corresponding update after segment pointers 2201. As a result, the update after data record 106 and the update after parity records 108 are turned off to an update before data record 106 and update before parity records 107.

The asynchronous record write part a 103 has already been explained.

3) Other Method 1 for Realization of Third Embodiment

Figure 9:
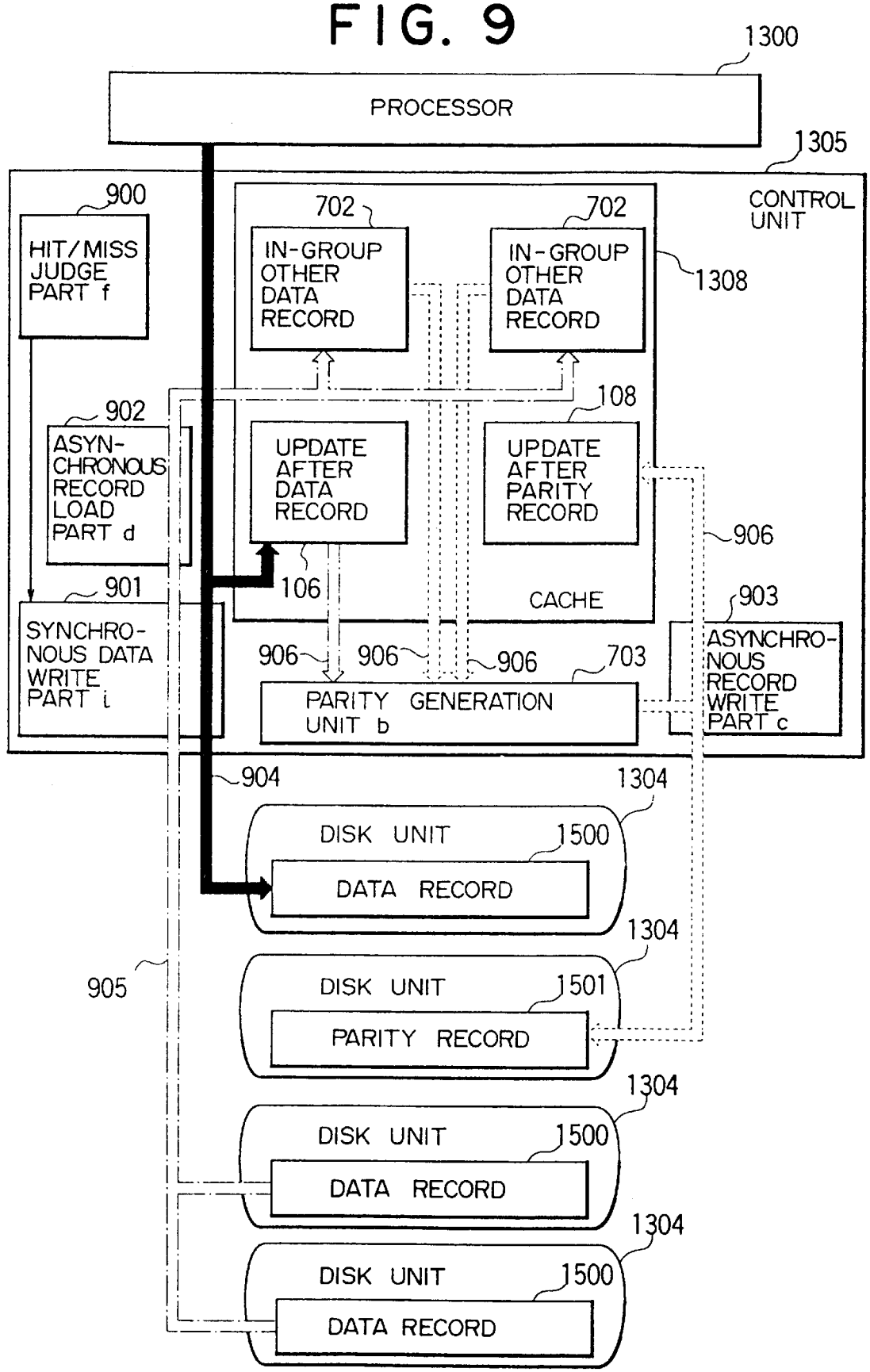
FIG. 9 is a block diagram showing the outline of the operation of the control unit in the third embodiment of the present invention in the case where while generating the updated value of the parity record, the control unit writes the updated value into a disk unit.

FIG. 9 is a block diagram for explaining another method 1 which realizes the third embodiment. The method shown in FIG. 9 is different from the method shown in FIGS. 7 and 8 in that the timing of generation of an update after parity record 108 is a timing when the update after parity record 108 itself is written into a disk unit 1304 (in conjunction with a data line 906). Namely, FIG. 9 shows the operation of the control unit 1305 in the third embodiment in the case where the parity generation timing c shown in FIG. 74 is used as a parity generation timing.

In FIG. 9 too, by use of an asynchronous record write part c 903, the control unit 1305 generates the update after parity record 108 and in parallel therewith writes the generated record 108 into the disk unit 1304 in a manner similar to that in the first embodiment shown in FIG. 3. Accordingly, a synchronous data write part i 901 and an asynchronous record load part d 902 have no function of generating the update after parity record 108.

a) Hit/Miss Judge Part f 900

Figure 52:
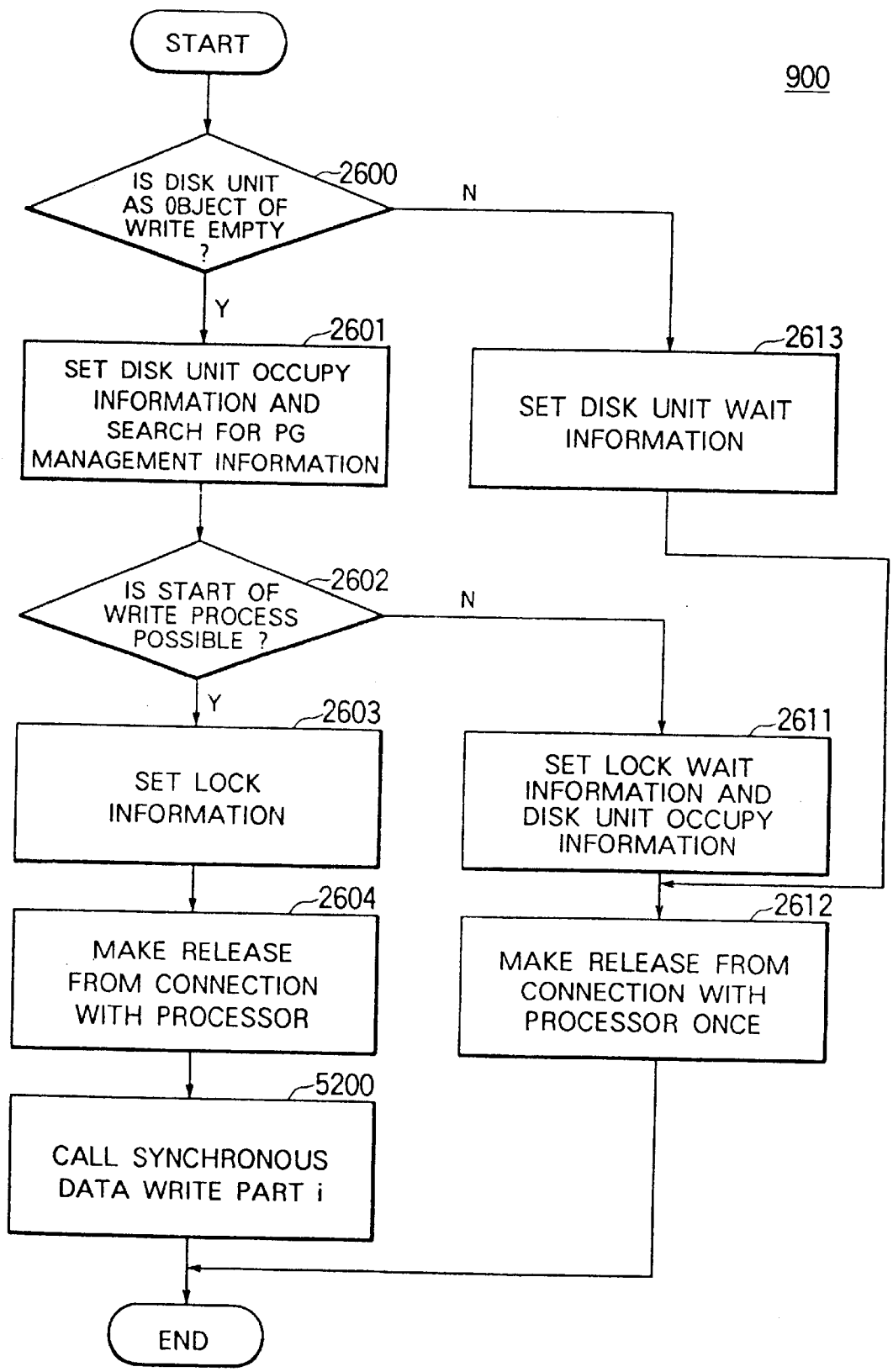
FIG. 52 shows a flow chart of a process performed by a hit/miss judge part f.

FIG. 52 shows the flow chart of a process performed by a hit/miss judge part f 900. The flow chart shown in FIG. 52 illustrates the flow of a process performed when a write request from the processor 1300 is received. The flow of a process performed by the hit/miss judge part f 900 when the release from a wait condition is made, is the same as the process flow shown in FIG. 27. The process flow of the hit/miss judge part f 900 shown in FIG. 52 is approximately the same as that of the hit/miss judge part b 300 shown in FIG. 38. Therefore, processings in FIG. 52 corresponding to those shown in FIG. 38 are designated by the same step numbers used in FIG. 38 and the difference from FIG. 38 will now be explained.

In step 5200, the control unit 1305 calls the synchronous data write part i 901 unconditionally in order to receive data for a data record 1500 made the object of write from the processor 1300.

b) Synchronous Data Write Part i 901

Figure 53:
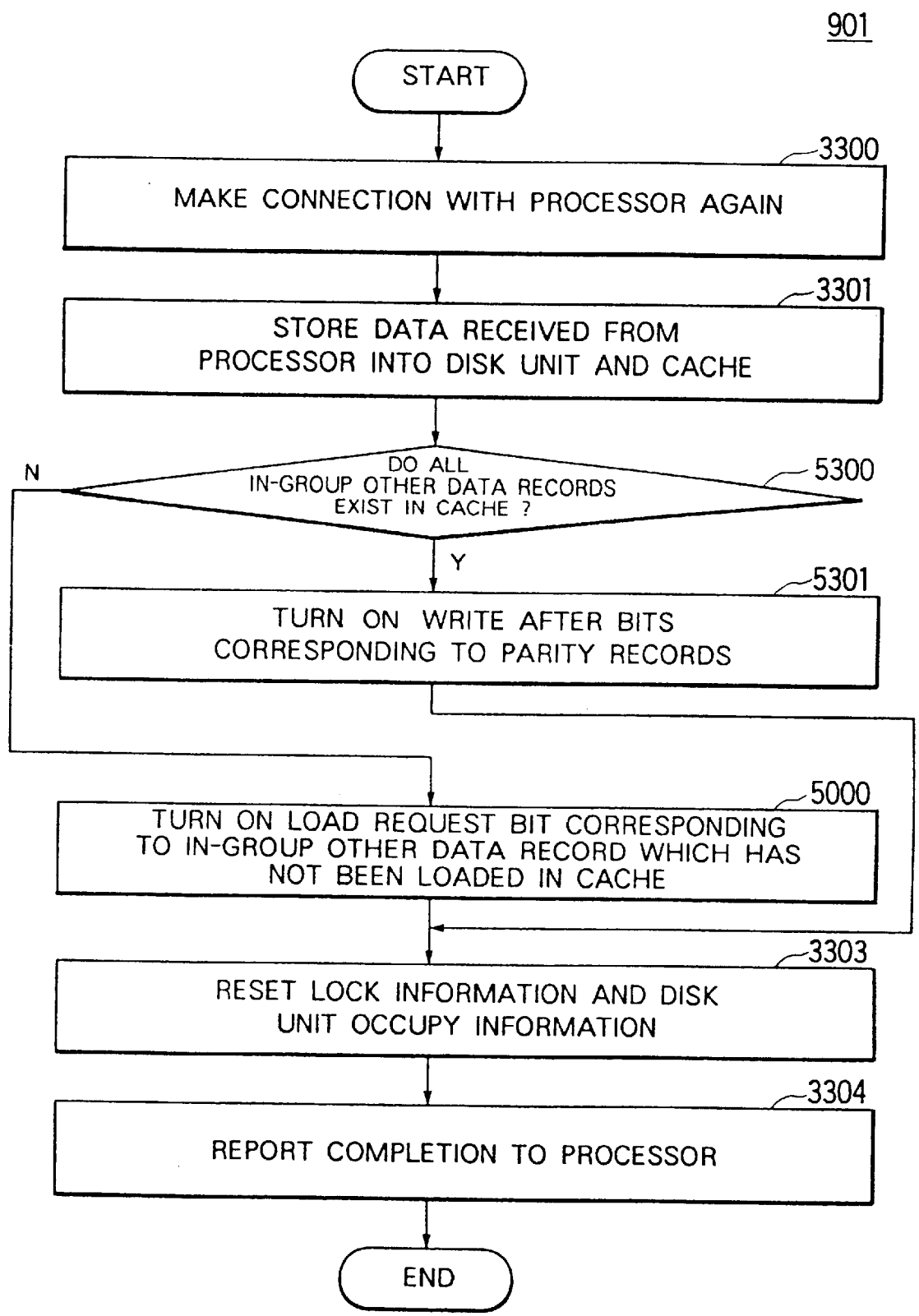
FIG. 53 shows a flow chart of a process performed by a synchronous data write part i.

FIG. 53 shows the flow chart of a process performed by the synchronous data write part i 901 when a positioning process for a disk unit 1304 is completed. The flow of a process performed by the synchronous data write part i 901 when it is called by the hit/miss judge part f 900, is the same as the process part shown in FIG. 32. The process flow of the synchronous data write part i 901 shown in FIG. 53 is approximately the same as that of the synchronous data write part h 800 shown in FIG. 50. Therefore, processings in FIG. 53 corresponding to those shown in FIG. 50 are designated by the same step numbers as those used in FIG. 50 and the difference from FIG. 50 will now be explained.

In step 5300, the control unit 1305 checks whether or not in-group other data records 702 (or other data records 1500) are stored in the cache 1308. In the case where there is any record which is not stored in in-group other records in the cache, the flow jumps to step 5000. In the case where all the records are stored in the cache, the control unit 1305 turns on write after bits 2202 corresponding to all update before parity records 107 (step 5301) and thereafter the flow jumps to step 3303.

c) Asynchronous Record Load Part d 902

Figure 54:
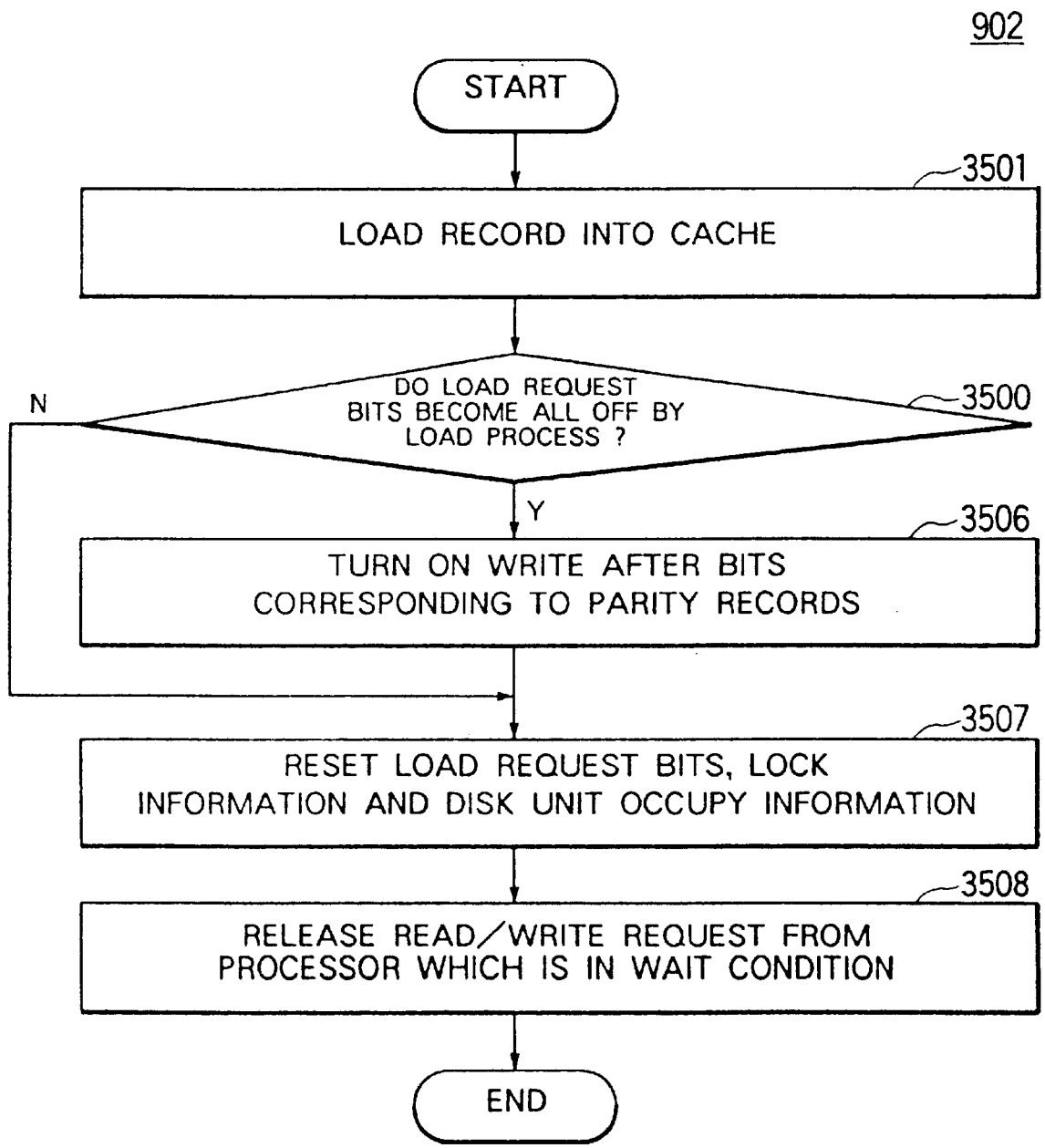
FIG. 54 shows a flow chart of a process performed by an asynchronous record load part d.

FIG. 54 shows the flow chart of a process performed by the synchronous data write part d 902 when a positioning process for a disk units 1304 is completed. The flow of a process performed using a time when the control unit 1305 is idle, is the same as the process flow shown in FIG. 34. The process flow of the asynchronous record load part d 902 shown in FIG. 54 corresponds to one in which the processing for generating the update after parity record 108 is removed from the process flow of the asynchronous record load part c 801 shown in FIG. 51.

d) Asynchronous Record Load Part c 903

Figure 55:
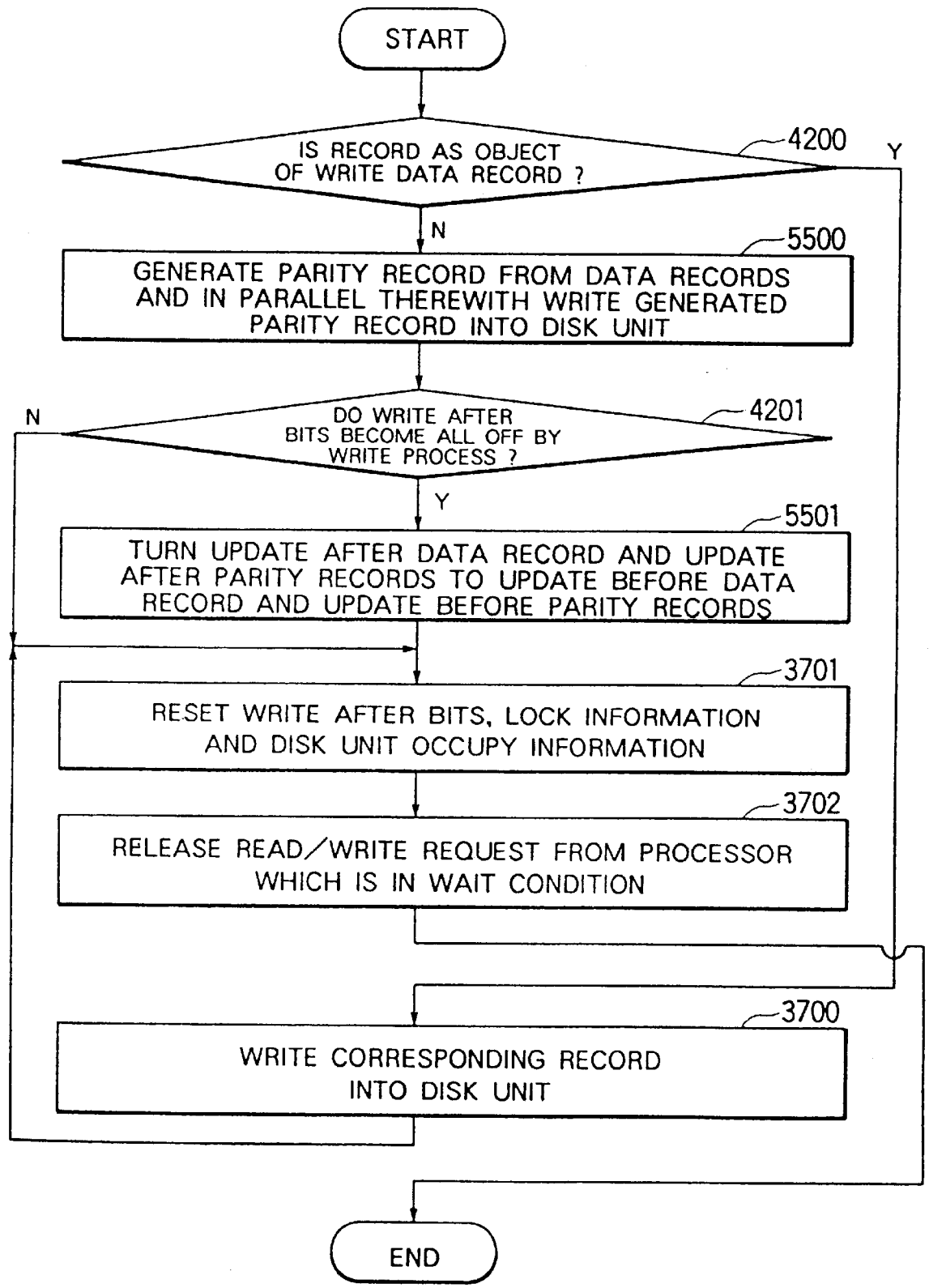
FIG. 55 shows a flow chart of a process performed by an asynchronous record write part c.

FIG. 55 shows the flow chart of a process performed by the asynchronous record load part c 903. The flow of a process performed using a time when the control unit 1305 is idle, is the same as the process flow shown in FIG. 41. The process flow of the asynchronous record load part c 903 shown in FIG. 55 is approximately the same as that of the asynchronous record write part b 302 shown in FIG. 42. Therefore, processings in FIG. 55 corresponding to those shown in FIG. 42 are designated by the same step numbers as those used in FIG. 42 and the difference from FIG. 42 will now be explained.

In step 5500, the control unit 1305 performs the following processing. Namely, the control unit 1305 generates by use of a parity generation unit b 703 an update after parity record 108 from all data records 1500 in the cache belonging to a parity group 1600 and in parallel therewith writes the record 108 into a disk unit 1304. (A concrete way for selection of data records 1500 in the cache 1308 is the same as that mentioned in conjunction with step 5100.) Further, the record 108 is stored into a segment 1800 indicated by an update after segment pointer 2201.

In the case where write after bits 2202 become all OFF, the control unit 1305 changes update before segment pointers 2200 so as to indicate the segments 1800 having been indicated by the update after segment pointers 2200 corresponding to a data record 1500 made the object of write and all parity records 1501, and sets null values into the corresponding update after segment pointers 2201 (step 5501).

4) Other Method 2 for Realization of Third Embodiment

Figure 77:
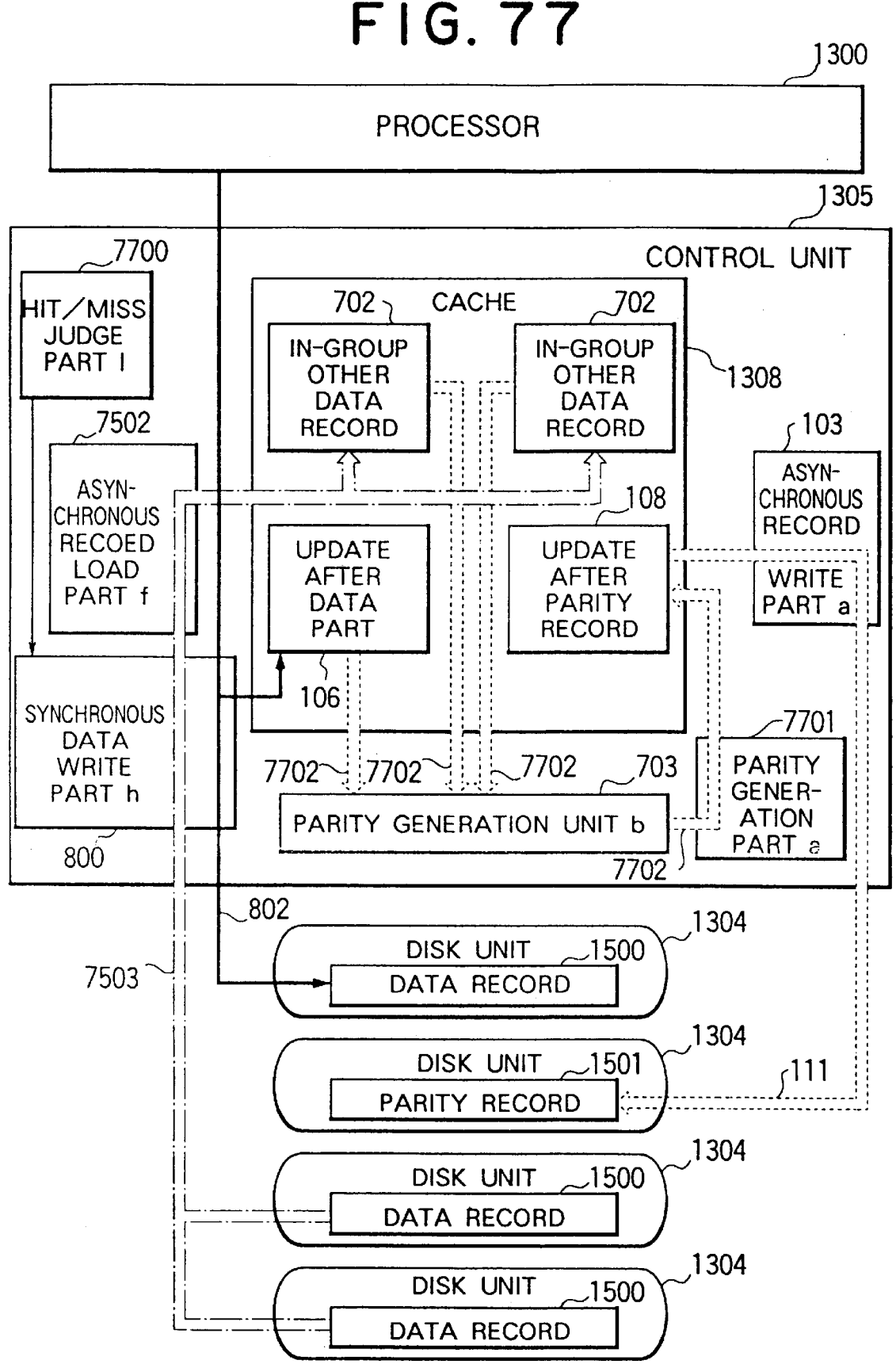
FIG. 77 is a block diagram showing the outline of the operation of the control unit in the third embodiment of the present invention in the case where the generation of the updated value of the parity record is made in asynchronism with a data transfer process of the control unit.

FIG. 77 is a block diagram for explaining still another method 2 which realizes the third embodiment. The method shown in FIG. 77 is characterized in that the generation of an update after parity record 108 is made in asynchronism with a data transfer process of the control unit 1305. Namely, FIG. 77 shows the operation of the control unit 1305 in the third embodiment in the case where the parity generation timing d shown in FIG. 86 is used as a parity generation timing.

As shown in FIG. 77, the control unit 1305 generates an update after parity record 108 from an update after data record 106 and in-group other data records 702 by use of a parity generation unit b 703 and a parity generation part b 7701 (in conjunction with data lines 7702).

a) Hit/Miss Judge Part l 7700

Figure 81:
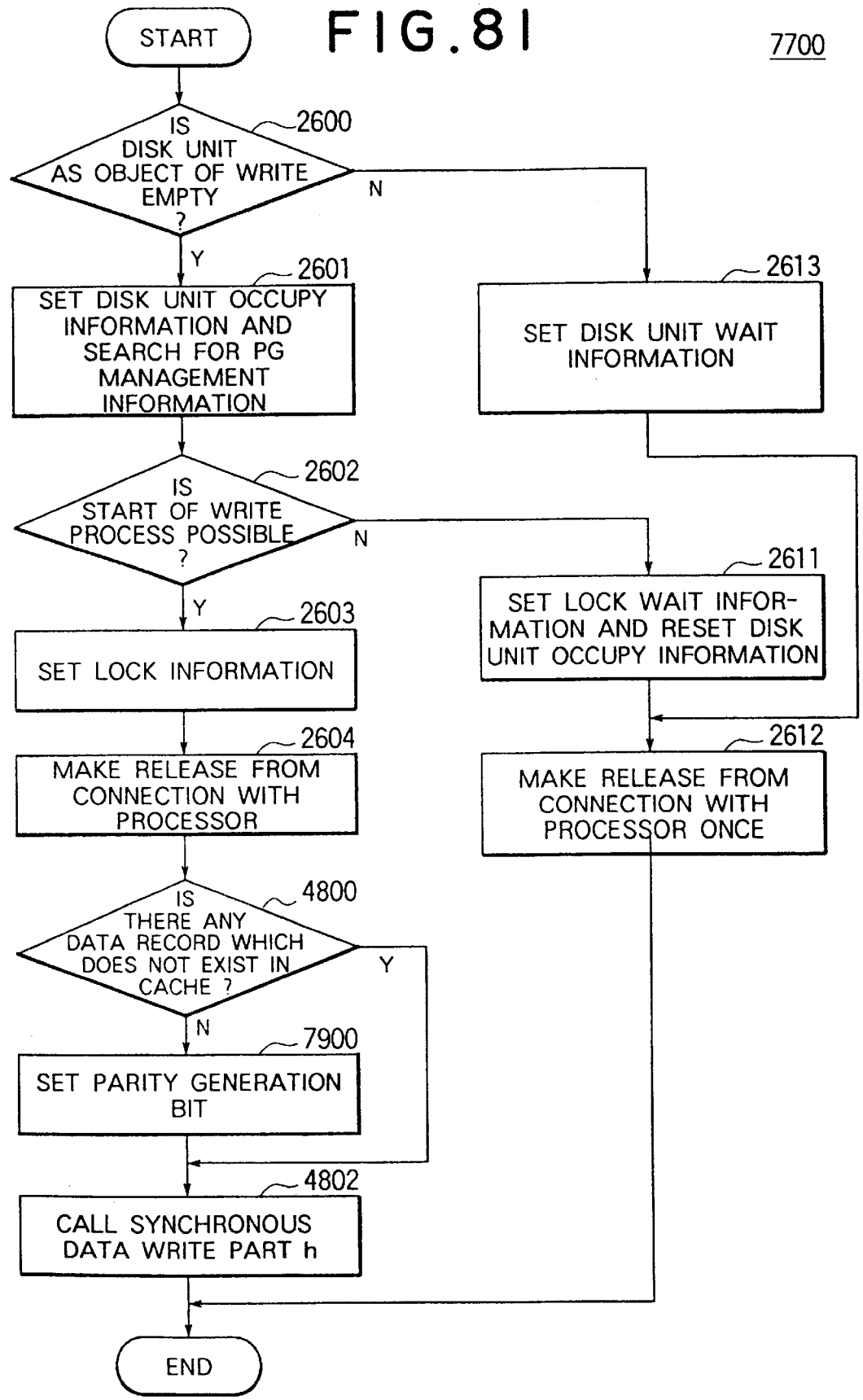
FIG. 81 shows a flow chart of a process performed by a hit/miss judge part l.

FIG. 81 shows the flow chart of a process performed by a hit/miss judge part l 7700. The hit/miss judge part l 7700 has two execution start points. A first start point is a start point shown in FIG. 81 or a start point at which the execution is started when a write request from the processor 1300 is received. A second start point is a start point when the release from a wait condition is made. The flow of a process performed in conjunction with the second start point is the same as the process flow of the hit/miss judge part a 100 shown in FIG. 27. The process flow of the hit/miss judge part l 7700 shown in FIG. 81 is approximately the same as that of the hit/miss judge part a 100 shown in FIG. 26. Therefore, processings in FIG. 81 corresponding to those shown in FIG. 26 are designated by the same step numbers as those used in FIG. 26 and the difference from FIG. 26 will now be explained.

In step 4800, the control unit 1305 checks whether or not there is any one among in-group other data records 1500 in a parity group 1600 which does not exist in the cache 1308. In the case where all the records exist, the control unit 1305 turns on a parity generation bit 2206 in step 7900 and thereafter the flow jumps to step 4802.

b) Parity Generation Part b 7701

Figure 85:
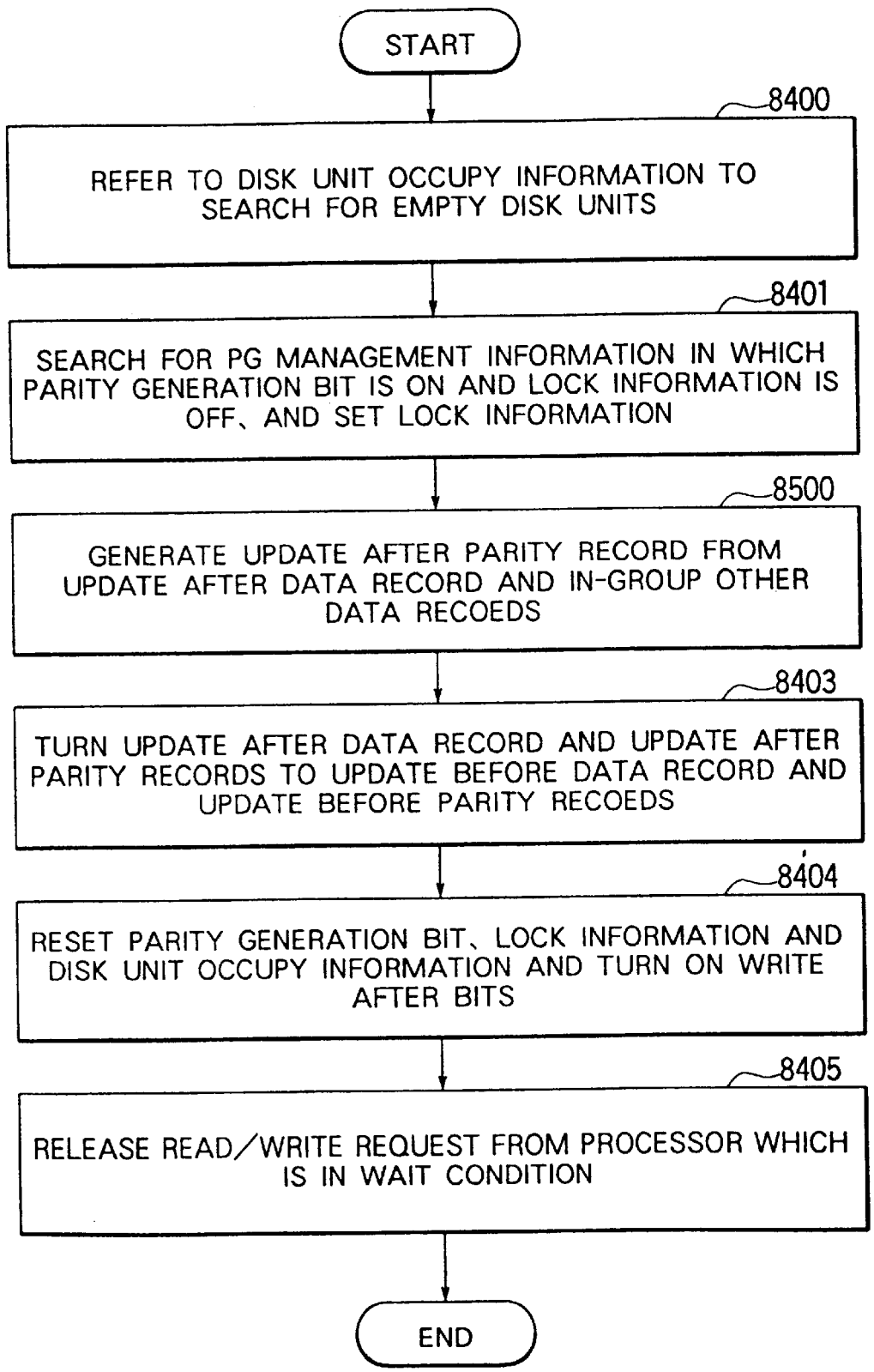
FIG. 85 shows a flow chart of a process performed by a parity generation part b.

FIG. 85 shows the flow chart of a process performed by the parity generation part b 7701. The process flow of the parity generation part b 7701 shown in FIG. 85 is approximately the same as that of the parity generation part a 7501 shown in FIG. 84. Therefore, processings in FIG. 85 corresponding to those shown in FIG. 84 are designated by the same step numbers as those used in FIG. 84 and the difference from FIG. 84 will be explained here. Namely, in step 8500, the control unit 1305 generates an update after parity record 108 from an update after data record 106 and in-group other data records 702.

5. Fourth Embodiment

1) Outline

As shown in FIG. 87, a fourth embodiment is an embodiment in which the parity group hit/miss judge process b 6600 and the asynchronous process d 7000 are combined. The parity generation timings a to d are relevant to the fourth embodiment.

Figure 10:
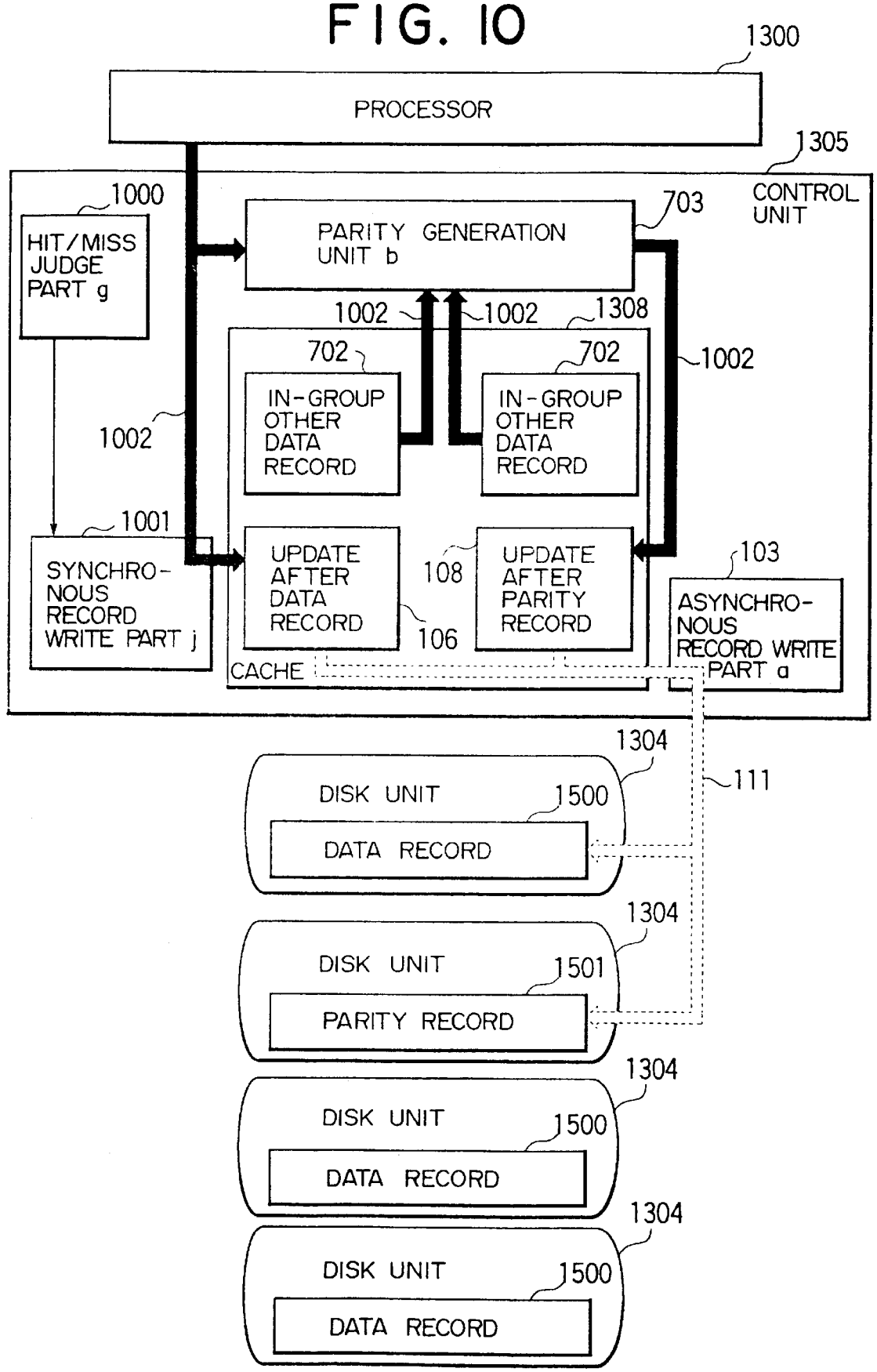
FIG. 10 is a block diagram showing the outline of the operation of a control unit in a fourth embodiment of the present invention in the case where when the control unit receives a write request from a processor, data necessary for generation of an updated value of a parity record is store din a cache.

FIG. 10 shows the operation of a control unit 1305 in the fourth embodiment in the case where all in-group other data records 702 in a parity group 1600, to which a data record 1500 made the object of write belongs, exist in a cache 1308. Namely, FIG. 10 shows the operation of the control unit 1305 in the fourth embodiment in the case where the parity generation timing a shown in FIG. 72 is used as a parity generation timing.

In this case, when an update after data record 106 is written into a disk unit 1308, the control unit 1305 generates an update after parity record 108 by use of a synchronous data write part j 1001 (in conjunction with data lines 1002). A this time, a parity generation unit b 703 is used.

The control unit 1305 writes the update after data record 106 and the update after parity record 108 into disk units 1304 by use of an asynchronous record write part a 103 (in conjunction with a data line 111) in asynchronism with a read/write request from a processor 1300.

Figure 11:
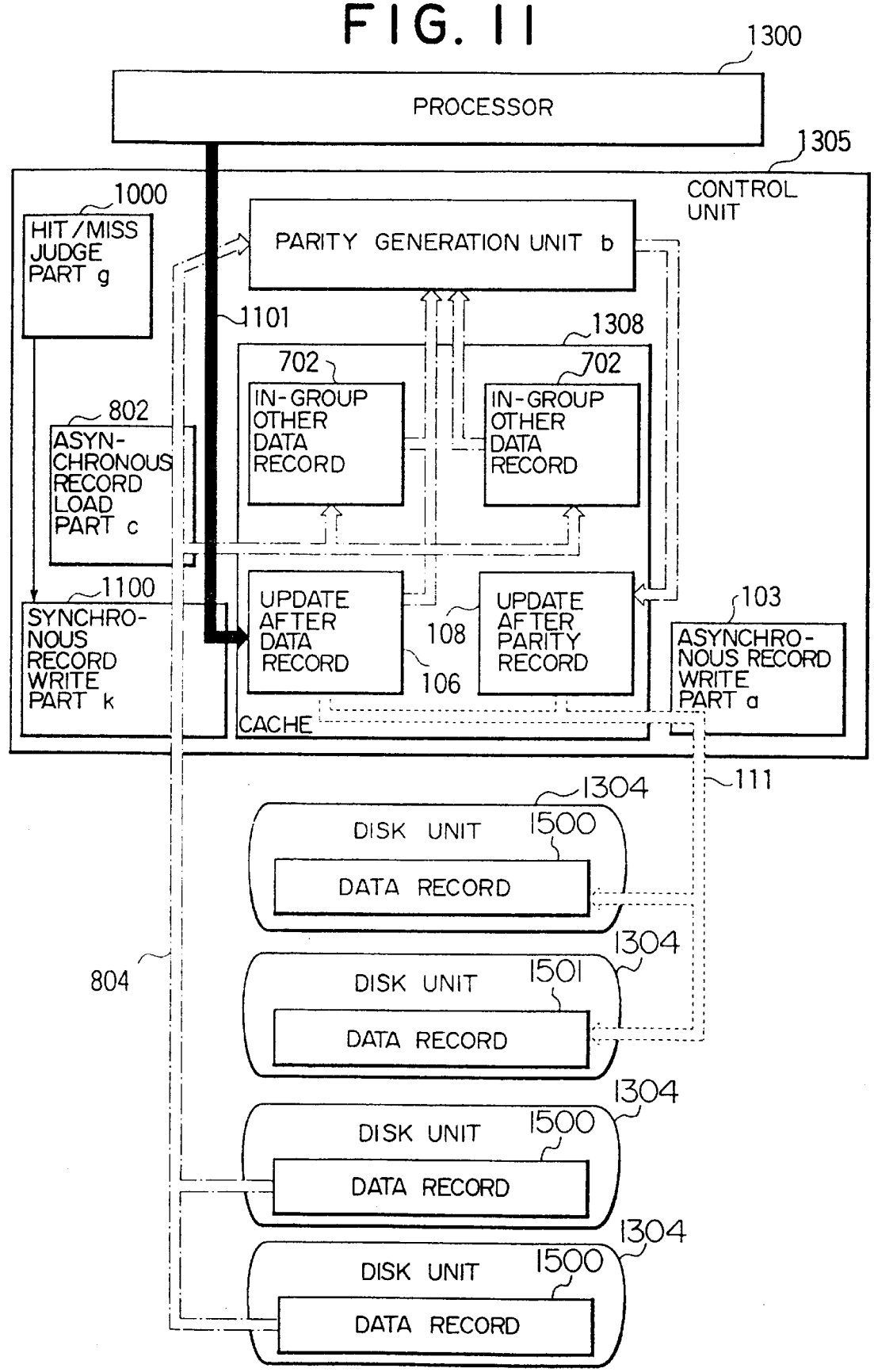
FIG. 11 is a block diagram showing the outline of the operation of the control unit in the fourth embodiment of the present invention in the case where the control unit receives the write request from the processor, the data necessary for generation of the updated value of the parity record is not stored in the cache.

FIG. 11 shows the operation of the control unit 1305 in the fourth embodiment in the case where any one, among all in-group other data groups 702 in a parity group 1600 to which a data record 1500 made the object of write belongs, does not exist in the cache 1308. Namely, FIG. 11 shows the operation of the control unit 1305 in the fourth embodiment the case where the parity generation timing b shows in FIG. 73 is used as a parity generation timing.

In this case, the control unit 1305 loads the in-group other data records 702 which do not exist in the cache 1308, into the cache 1308 by use of an asynchronous record load part c 802 in asynchronism with a read/write command from the processor 1300. When the last one of in-group other data records 702 which do not exist in the cache 1308 is loaded into the cache 1308, the control unit 1305 generates update after parity records 108 for all parity records 1501 (in conjunction with a data line 804).

As shown in FIG. 11, an update after data record 106 is written into the cache 108 by a synchronous data write k 1100 (in conjunction with a data line 1101). (There may be the case where the record 106 is also written into a nonvolatile memory 1400.) However, at this timing, the update after parity record 108 is not generated. The operation of an asynchronous record write part a 103 is the same as the operation of that shown in FIG. 10.

2) Details of Processes a) Hit/Miss Judge Part g 1000

Figure 56:
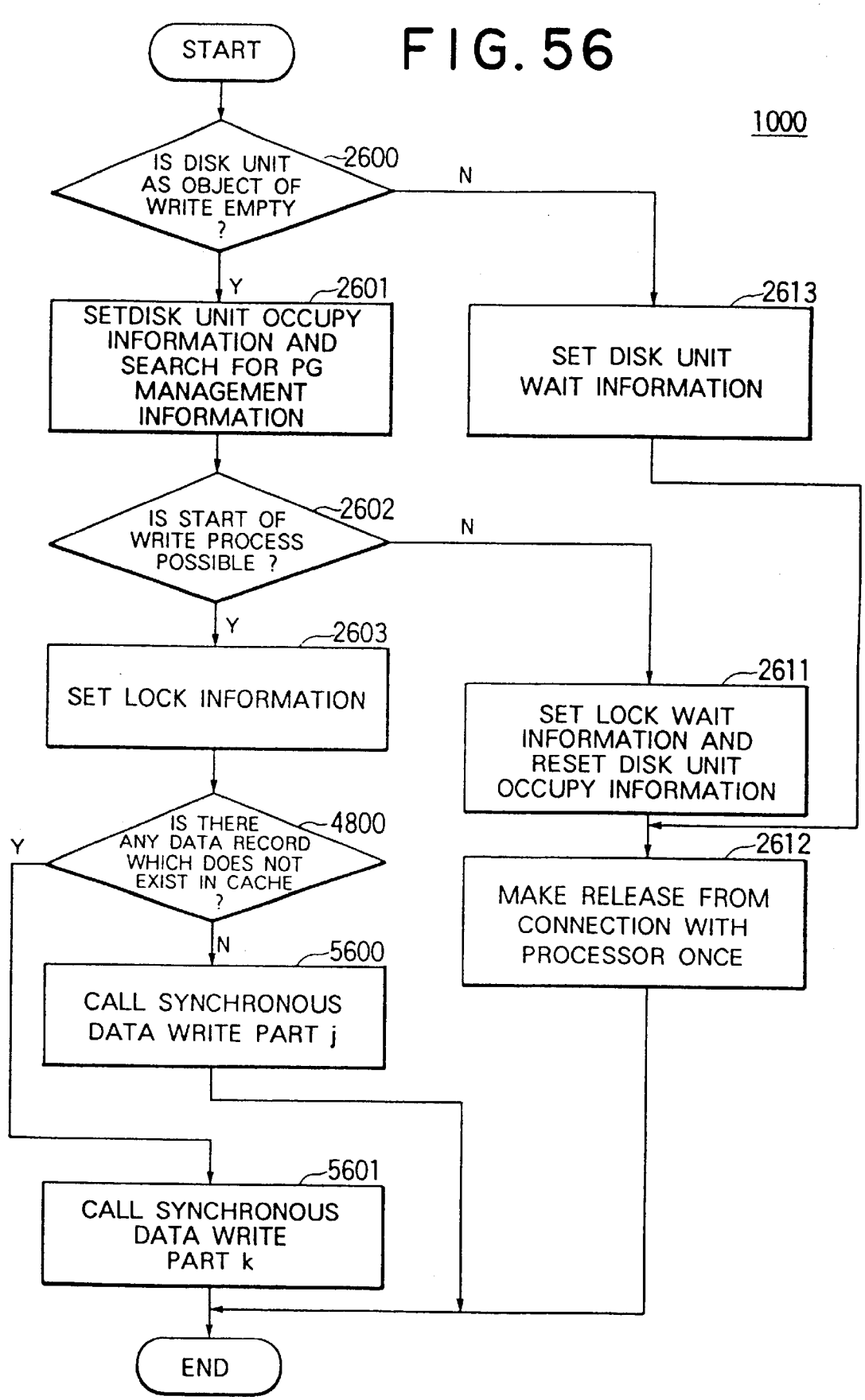
FIG. 56 shows a flow chart of a process performed by a hit/miss judge part g.

FIG. 56 shows the flow chart of a process performed by a hit/miss judge part g 1000. The flow chart shown in FIG. 56 illustrates the flow of a process performed when a write request from the processor 1300 is received. The flow of a process performed by the hit/miss judge part c 1000 when the release from a wait condition is made, is the same as the process flow shown in FIG. 27. The process flow of the hit/miss judge part c 1000 shown in FIG. 56 is approximately the same as that of the hit/miss judge part e 700 shown in FIG. 48. Therefore, processings in FIG. 56 corresponding to those shown in FIG. 48 are designated by the same step numbers as those used in FIG. 48 and the difference from FIG. 48 will now be explained.

In the case where all in-group other data records 702 in a parity group 1600, to which a data record 1500 made the object of write belongs, exist in the cache 1308 (step 4800), the control unit 1305 calls the synchronous data write part j 1001 in step 5600, thereby completing the process. In the case where there is any record 702 which does not exist in the cache 1308, the control unit 1305 calls the synchronous data write part k 1100 in step 5601, thereby completing the process.

b) Synchronous Data Write Part j 1001

Figure 57:
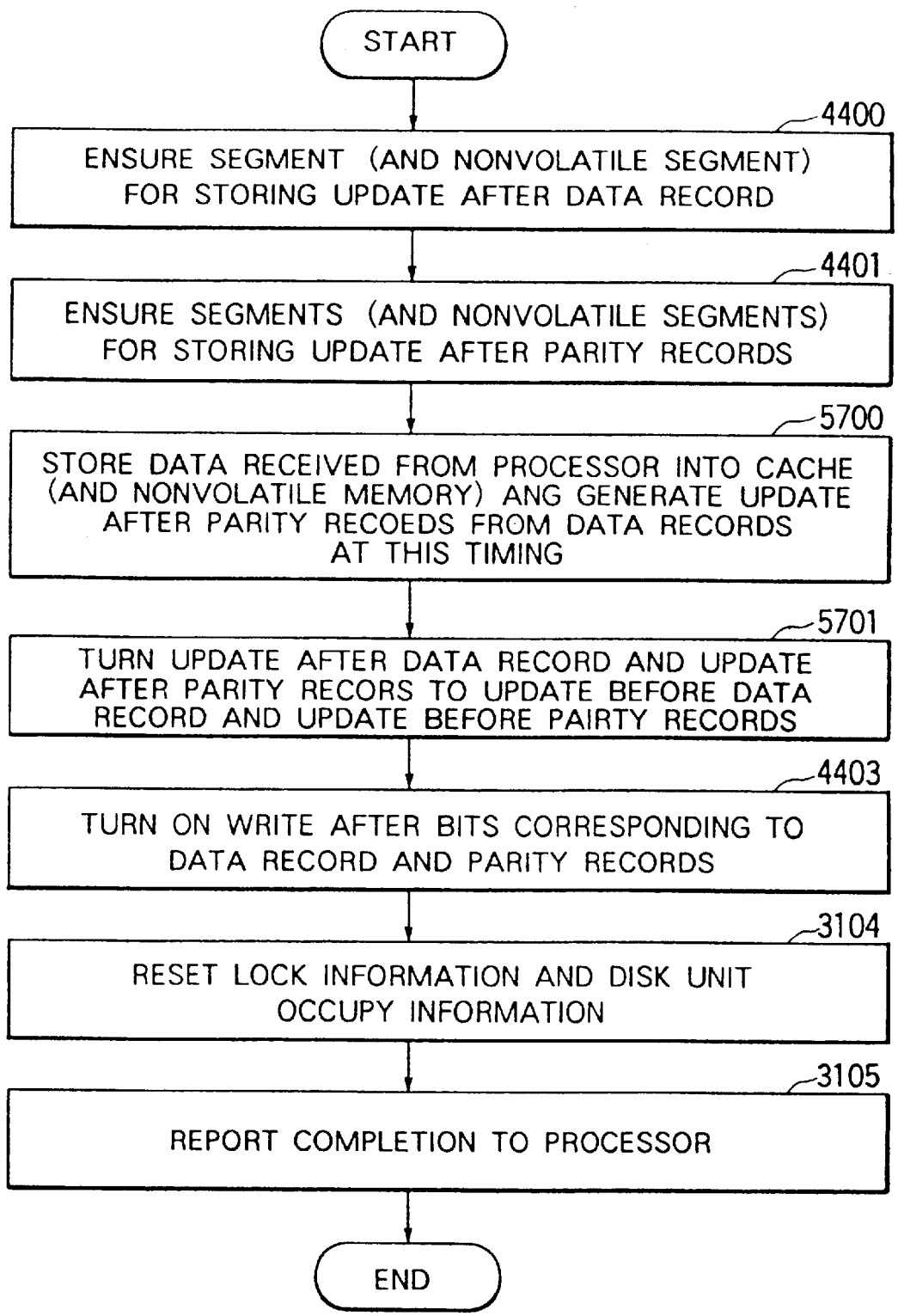
FIG. 57 shows a flow chart of a process performed by a synchronous data write part j.

FIG. 57 shows the flow chart of a process performed by the synchronous data write part j 1001. The flow chart shown in FIG. 57 illustrates the flow of a process performed by the synchronous data write part j 1001 when it is called by the hit/miss judge part g 1000. The process flow of the synchronous data write part j 1001 shown in FIG. 57 is approximately the same as that of the synchronous data write part d 401 shown in FIG. 44. Therefore, processings in FIG. 57 corresponding to those shown in FIG. 44 are designated by the same step numbers as those used in FIG. 44 and the difference from FIG. 44 will now be explained.

In step 5700, the control unit 1305 stores data received from the processor 1300 as an update after data record 106 into a segment 1800 indicated by an update after segment pointer 2201. In the case where the data is to be stored in a nonvolatile memory 1400, the data is also transferred to a nonvolatile segment 2500. Further, the control unit 1305 generates all update after parity records 108 from the update after data record 106 received from the processor 1300 and in-group other data records 702 and stores the generated records 108 into segments 1800 indicated by the corresponding update after segment pointers 2201.

In step 5701, the control unit 1305 changes update before segment pointers 2200 so as to indicate the segments 1800 having been indicated by the update after segment pointers corresponding to the data record 1500 made the object of write and all the parity records 1501, and sets null values into the corresponding update after segment pointers 2201.

c) Synchronous Data Write Part k 1100

Figure 58:
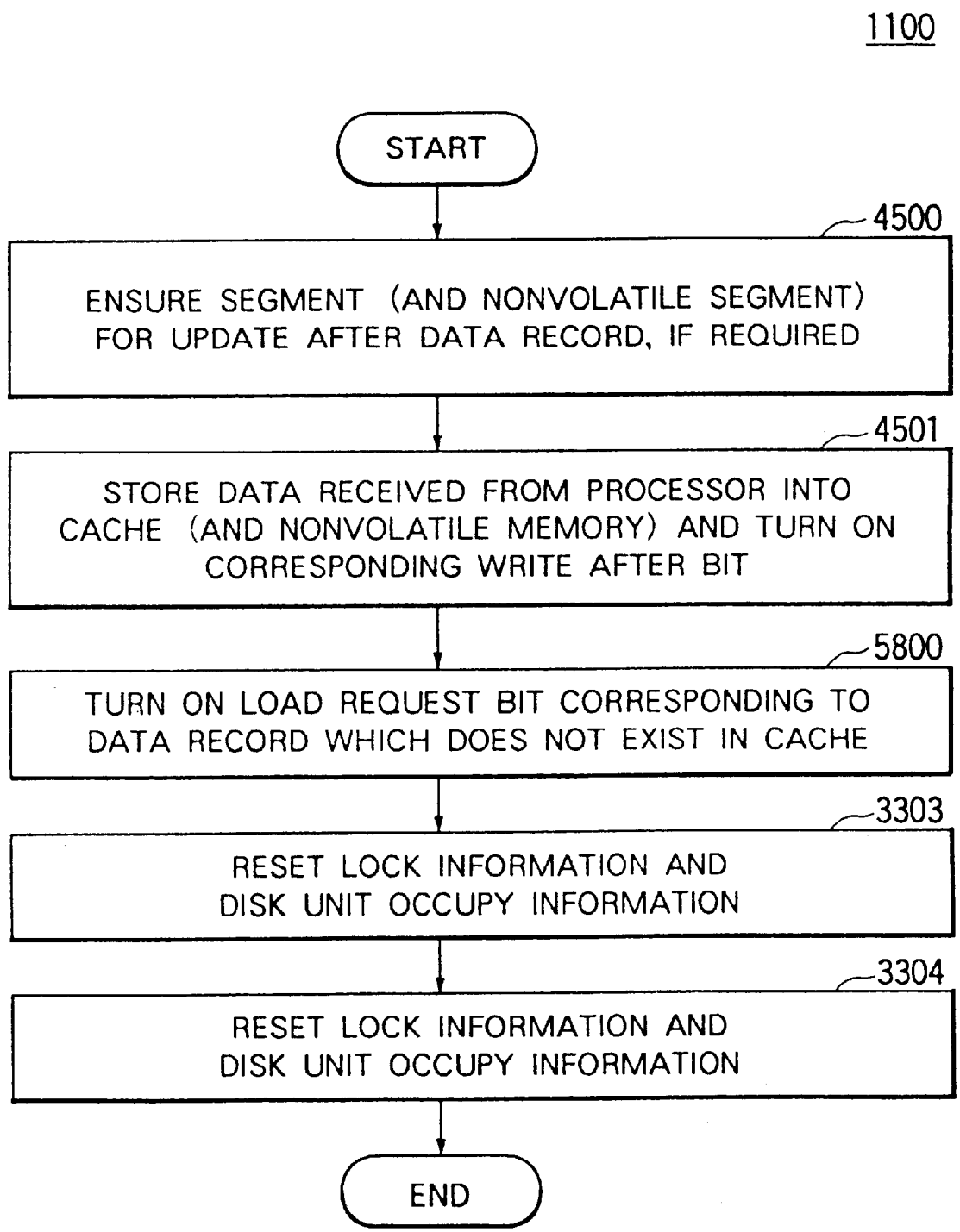
FIG. 58 shows a flow chart of a process performed by a synchronous data write part k.

FIG. 58 shows the flow chart of a process performed by the synchronous data write part k 1100. The flow chart shown in FIG. 58 illustrates the flow of a process performed by the synchronous data write part k 1100 when it is called by the hit/miss judge part g 1000. The process flow of the synchronous data write part k 1100 shown in FIG. 58 is approximately the same as that of the synchronous data write part e 500 shown in FIG. 45. Therefore, processings in FIG. 58 corresponding to those shown in FIG. 45 are designated by the same step numbers as those used in FIG. 45 and the difference from FIG. 45 will now be explained.

In step 5800, the control unit 1305 turns on a load request bit 2203 corresponding to in-group other data records 702 which are not stored in the cache 1308.

The flow of processes performed by the other process parts of the asynchronous record load part c 802 and the asynchronous record write part a 103 have already been explained.

3) Other Method 1 for Realization of Fourth Embodiment

Figure 12:
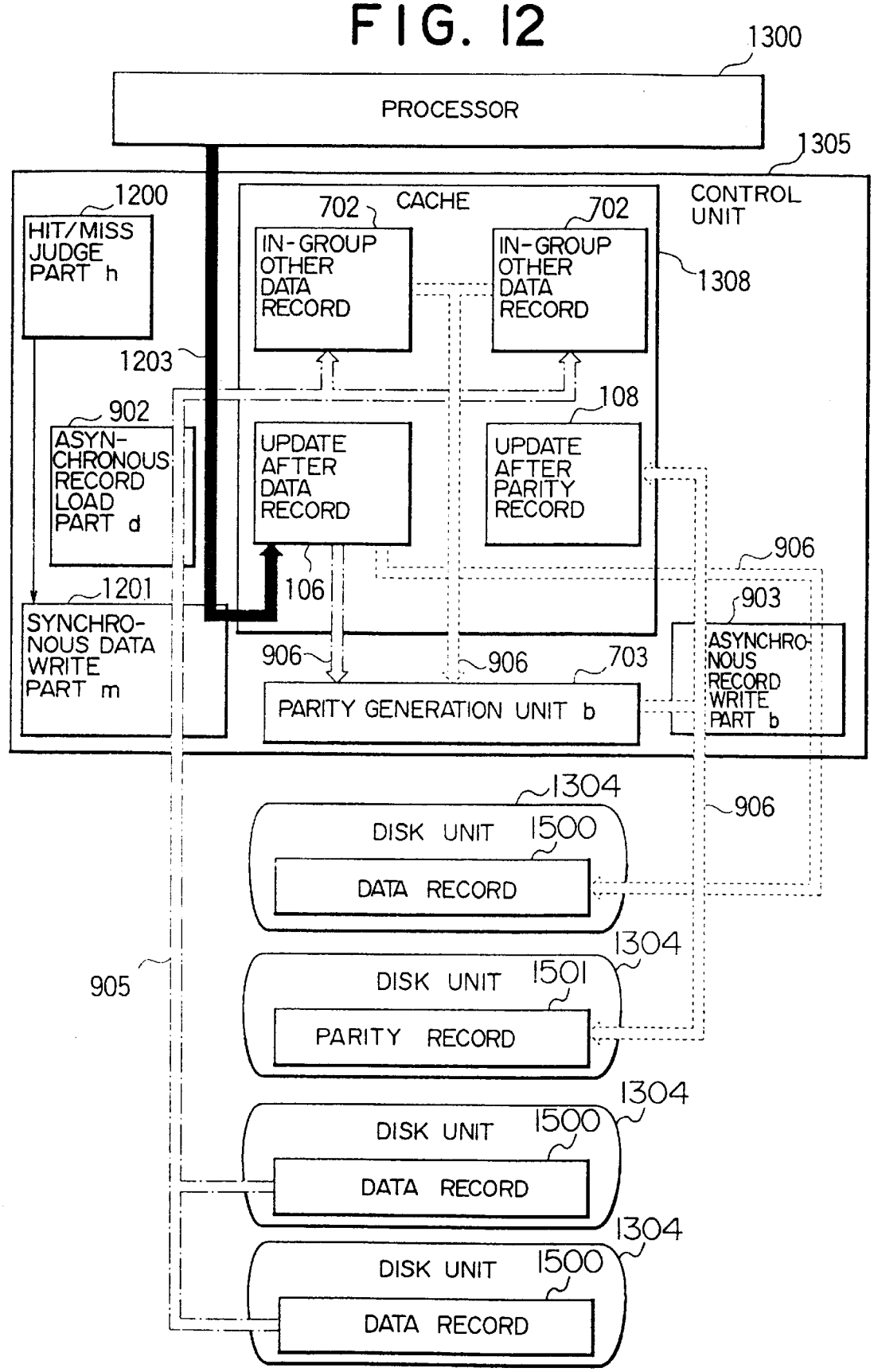
FIG. 12 is a block diagram showing the outline of the operation of the control unit in the fourth embodiment of the present invention in the case where while generating the updated value of the parity record, the control unit writes the updated value into a disk unit.

FIG. 12 is a block diagram for explaining another method 1 which realizes the fourth embodiment. This method is different from the method shown in FIGS. 10 and 11 in that the timing of generation of an update after parity record 108 is a timing when the update after parity record 108 itself is written into a disk unit 1304. Namely, FIG. 12 shows the operation of the control unit 1305 in the fourth embodiment in the case where the parity generation timing c shown in FIG. 74 is used as a parity generation timing.

In FIG. 12 too, by use of an asynchronous record write part b 903, the control unit 1305 generates the update after parity record 108 and in parallel therewith writes the generated record 108 into the disk 1304 (in conjunction with data lines 906) in a manner similar to that in the first embodiment shown in FIG. 3.

a) Hit/Miss Judge Part h 1200

Figure 59:
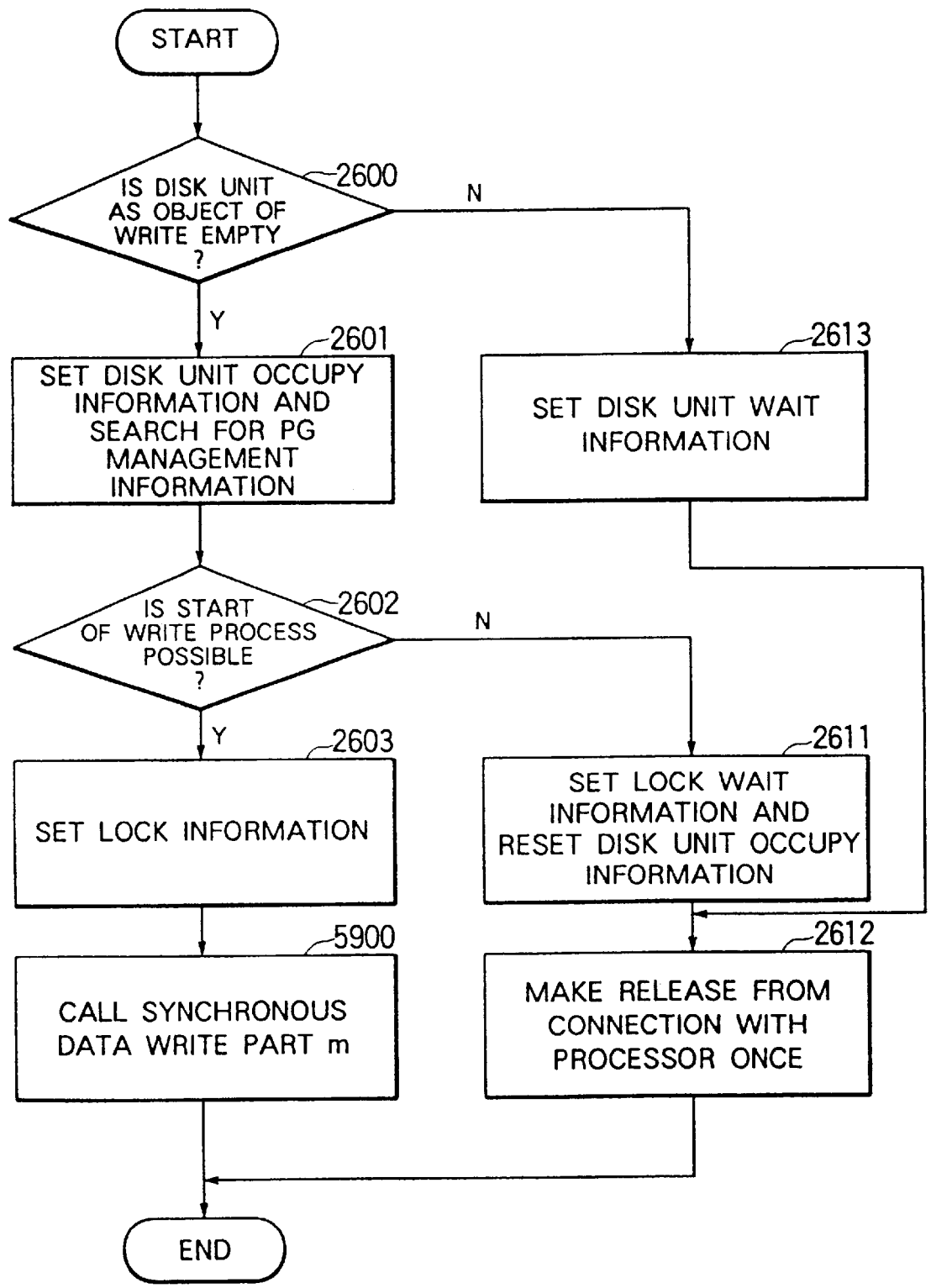
FIG. 59 shows a flow chart of a process performed by a hit/miss judge part h.

FIG. 56 shows the flow chart of a process performed by a hit/miss judge part h 1200. The flow chart shown in FIG. 59 illustrates the flow of a process performed when a write request from the processor 1300 is received. The flow of a process performed by the hit/miss judge part h 1200 when the release from a wait condition is made, is the same as the process flow shown in FIG. 27. The process flow of the hit/miss judge part h 1200 shown in FIG. 59 is approximately the same as that of the hit/miss judge part f 900 shown in FIG. 52. Therefore, processings in FIG. 59 corresponding to those shown in FIG. 52 are designated by the same step numbers as those used in FIG. 52 and the difference from FIG. 52 will now be explained.

In step 5900, the control unit 1305 calls the synchronous data write part m 1201 unconditionally in order to receive data for a data record 1500 made the object of write from the processor 1300.

b) Synchronous Data Write Part m 1201

Figure 60:
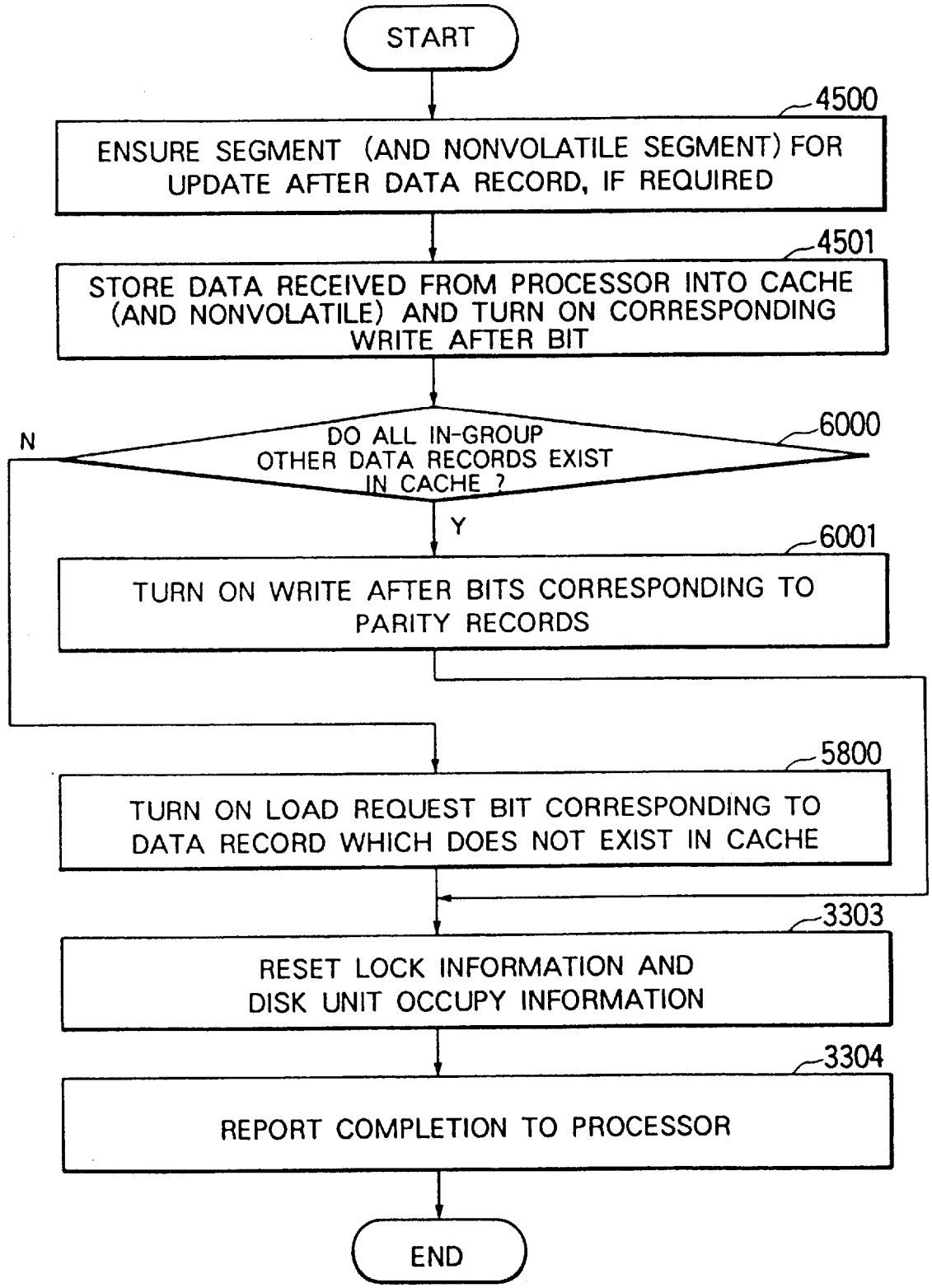
FIG. 60 shows a flow chart of a process performed by a synchronous data write part m.

FIG. 60 shows the flow chart of a process performed by the synchronous data write part m 1201. The flow chart shown in FIG. 60 illustrates the flow of a process performed by the synchronous data write part m 1201 when it is called by the hit/miss judge part h 1200. The process flow of the synchronous data write part m 1201 shown in FIG. 60 is approximately the same as that of the synchronous data write part k 1100 shown in FIG. 58. Therefore, processings in FIG. 60 corresponding to those shown in FIG. 58 are designated by the same step numbers as those used in FIG. 58 and the difference from FIG. 58 will now be explained.

In step 6000, the control unit 1305 checks whether all in-group other data records 702 are stored in the cache 1308. In there is any record 702 which is not stored in the cache, the flow jumps to step 5800. If the records 702 are in the cache 1308, the control unit 1305 turns on write after bits 2202 corresponding to all update before parity records 107 (step 6001) and thereafter the flow jumps to step 3303.

The flows of processes performed by the other process parts or an asynchronous record load part d 902 and the asynchronous record write part b 906 have already been explained.

4) Other Method 2 for Realization of Fourth Embodiment

Figure 78:
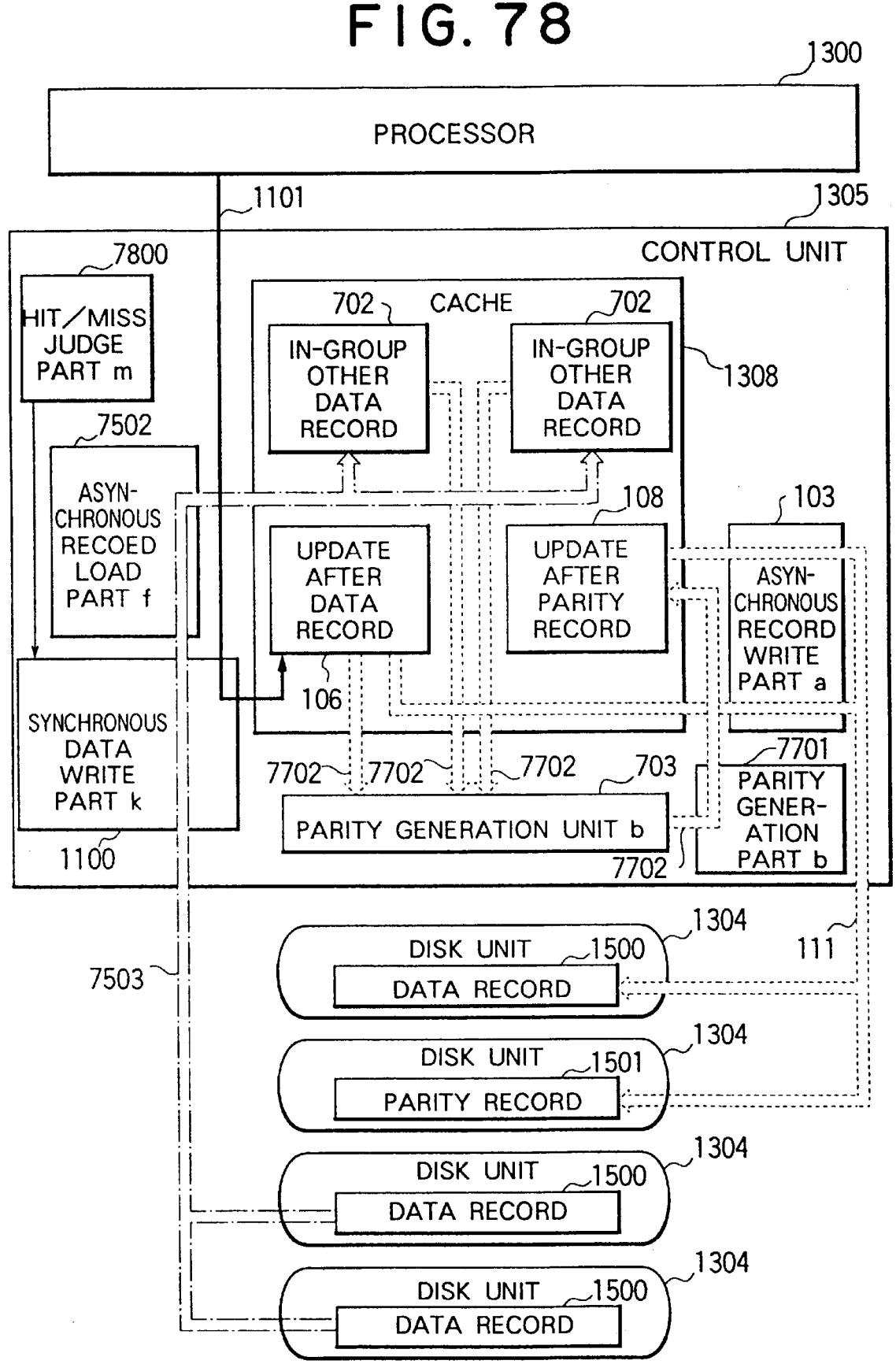
FIG. 78 is a block diagram showing the outline of the operation of the control unit in the fourth embodiment of the present invention in the case where the generation of the updated value of the parity record is made in asynchronism with a data transfer process of the control unit.

FIG. 78 is a block diagram for explaining still another method 2 which realizes the fourth embodiment. The method shown in FIG. 78 is characterized in that the generation of an update after parity record 108 is made in asynchronism with a data transfer process of the control unit 1305. Namely, FIG. 78 shows the operation of the control unit 1305 in the fourth embodiment in the case where the parity generation timing d shown in FIG. 86 is used as a parity generation timing.

As shown in FIG. 78, the control unit 1305 generates an update after parity record 108 from an update after data record 106 and in-group other data records 702 by use of a parity generation unit b 703 and a parity generation part b 7701 (in conjunction with data lines 7702).

a) Hit/Miss Judge Part m 7800

Figure 82:
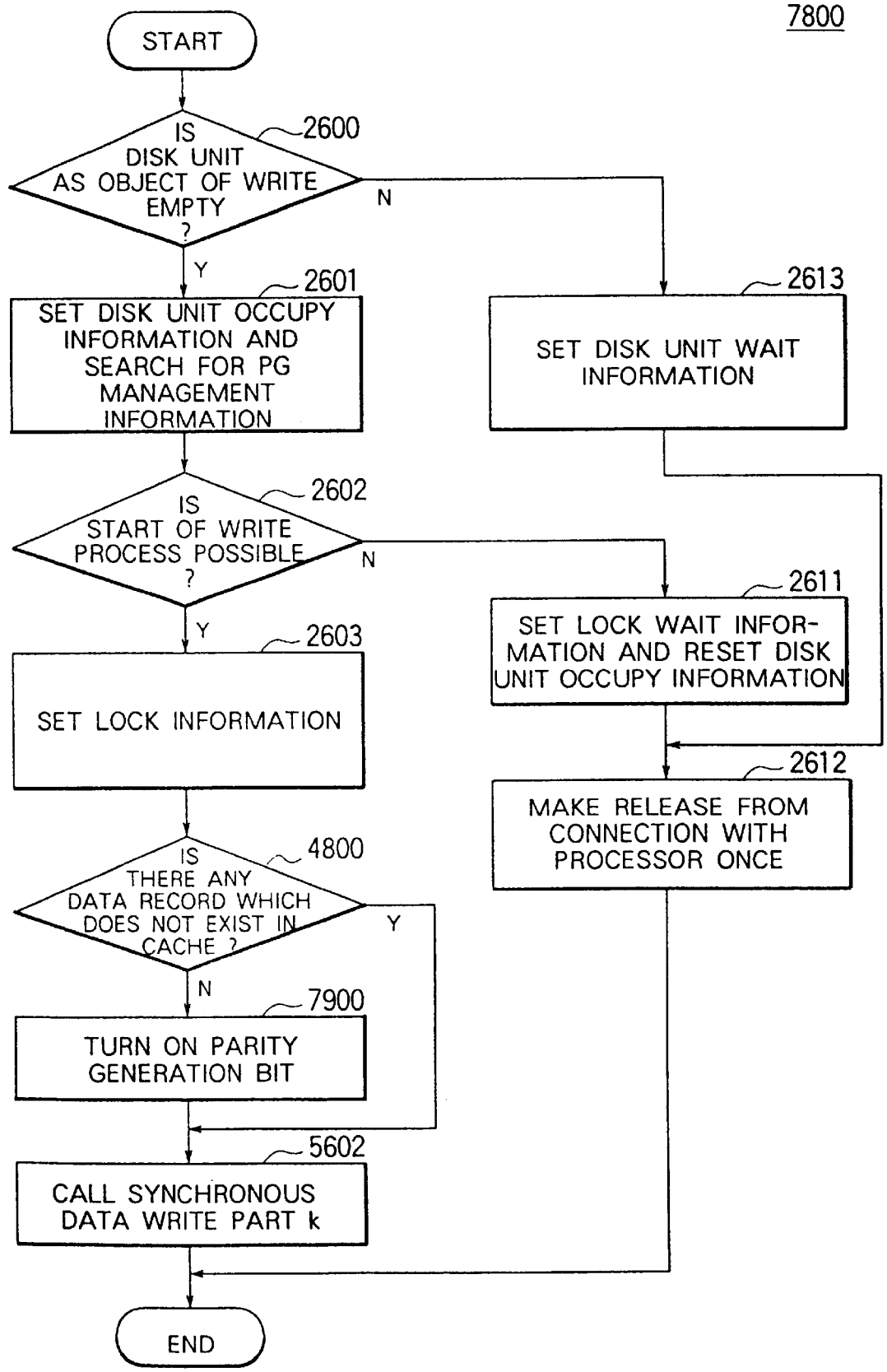
FIG. 82 shows a flow chart of a process performed by a hit/miss judge part m.

FIG. 82 shows the flow chart of a process performed by a hit/miss judge part m 7800. The hit/miss judge part m 7800 has two execution start points. A first start point is a start point shown in FIG. 82 or a start point at which the execution is started when a write request from the processor is received. A second start point is a start point when the release from a wait condition is made. The flow of a process performed in conjunction with the second start point is the same as the process flow of the hit/miss judge part a 100 shown in FIG. 27. The process flow of the hit/miss judge part m 7800 shown in FIG. 82 is approximately the same as that of the hit/miss judge part g 1000 shown in FIG. 56. Therefore, processings in FIG. 82 corresponding to those shown in FIG. 56 are designated by the same step numbers as those used in FIG. 56 and the difference from FIG. 56 will now be explained.

In step 4800, the control unit 1305 checks whether or not there is any one in other data records 1500 in a parity group 1600 which does not exist in the cache 1308. In the case where all the data records exist in the cache, the control unit 1305 turns on a parity generation bit 2206 in step 7900 and thereafter the flow goes to step 5602.

6. Fifth Embodiment

1) Outline

A fifth embodiment is an embodiment in which the parity group hit/miss judge process c 6700 is used. However, as shown in FIG. 87, the parity group hit/miss judge process a 6500, the parity group hit/miss judge process b 6600, the asynchronous process a 6800, the asynchronous process b 6900, the asynchronous process c 7000, the asynchronous process d 7100 and the parity generation timings a to d are relevant to the fifth embodiment.

As has already been mentioned, information necessary for generating an updated value of a parity record 1501 includes one of the following sets 1 and 2 of values:

1. the update before and update after values of a data record 1500 and an update before value of the parity record 1501; and
2. the update after value of the data record 1500 and the values of all other data records 1500 in the same parity group.

Figure 61:
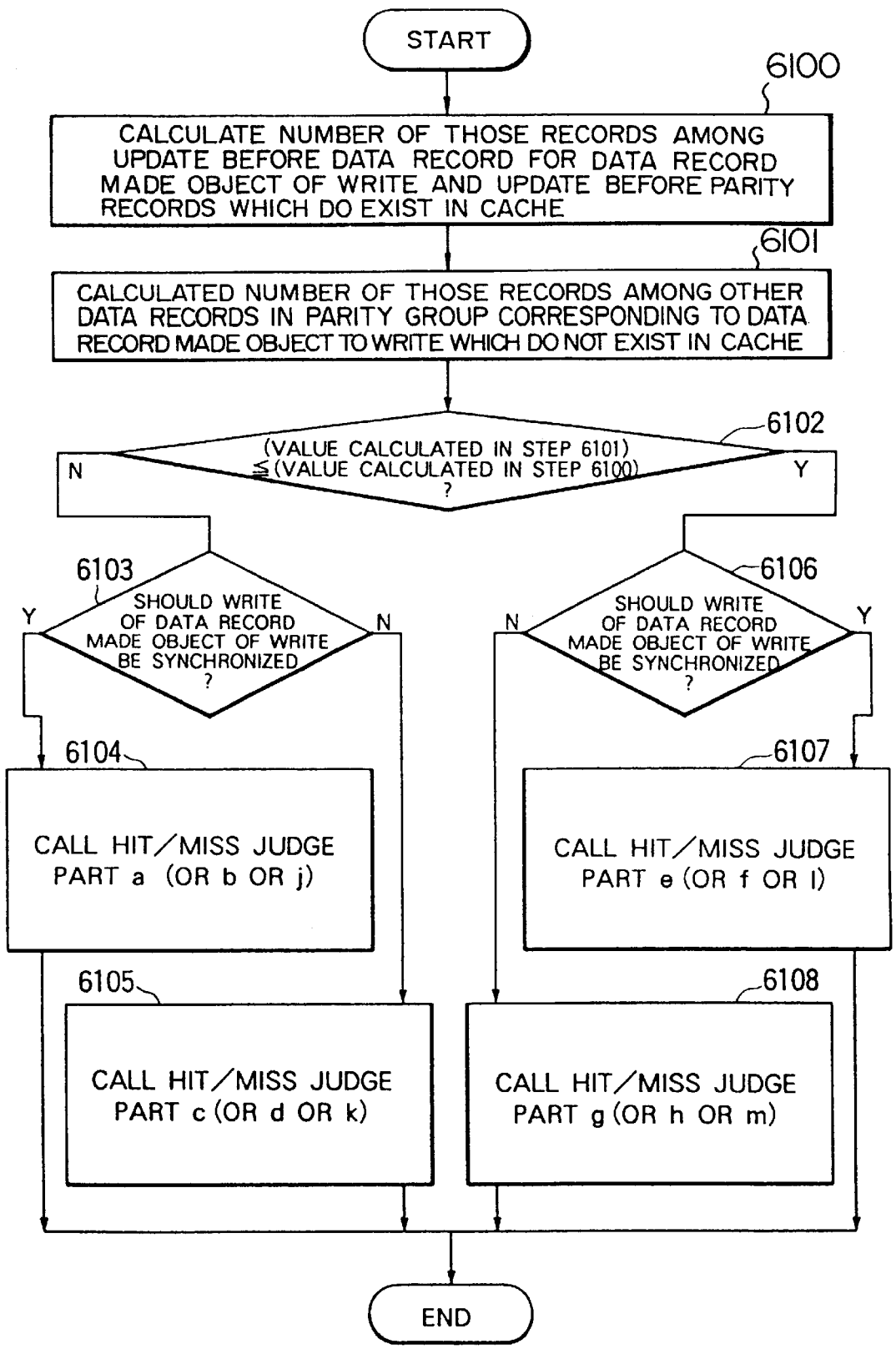
FIG. 61 shows a flow chart of a process concerning the operation of a control unit in a fifth embodiment of the present invention.

In the fifth embodiment, in generating the updated value of the parity record 1501, a control unit 1305 selects one of the above sets of values or records 1502 on the basis of the condition of storage of the records 1502 in a cache 1308. FIG. 61 is a flow chart showing the operation of the control unit 1305 in the fifth embodiment.

2) Details of Process

When receiving a write request from a processor 1300, the control unit 1305 checks the number of those records among update before parity records 107 and an update before data records 105 for a data record 1500 made the object of write which do not exist in the cache 1308 (step 6100).

In step 6101, the control unit 1305 checks the number of those records among in-group other data records 702 (or other data records 1500) in a parity group including the data records 1500 made the object of write which do not exist in the cache 1308 (that is, the number of data records 1500 the update before and after segment pointers 2200 and 2201, each of which takes the null value.

In step 6102, the control unit 1305 checks which of the numbers of records obtained in steps 6100 and 6101 is small. If there are selected records the number of which is smaller, the overhead is less since the number of records 1502 to be loaded is small.

Accordingly, in the case where the number obtained in step 6100 is smaller, the flow goes to step 6103 in order to generate an updated value of a parity record 1501 from an update before value of the data record 1500 made the object of write and update before values of the parity records 1501. The execution of the parity group hit/miss judge process a 6500 is started from step 6103.

On the other hand, in the case where the number obtained in step 1600 is not smaller, the flow goes to step 6106 in order to generate the updated value of the parity record 1501 from the values of all the other data records 1500. The reaction of the parity group hit/miss judge process b 6600 is started from step 6106.

In step 6103, the judgement is made as to whether or not the write of the data record 1500 into a disk unit should be synchronized. In the case where the synchronization is made, there results in the selection of the asynchronous process a 6800. In step 6104, the hit/miss judge part a 100 is called. Calling the hit/miss judge part a 100 means that the parity generation timing a or b is selected as a parity generation timing. In this case, if the parity generation timing c or d is to be selected, the hit/miss judge part b 300 or j 7900 may be called in lieu of the hit/miss judge part a 100.

In the case where the asynchronization is made, there results in the selection of the asynchronous data process b 6900. In step 6105, the hit/miss judge part c 400 is called. Calling the hit/miss judge part c 400 means that the parity generation timing a or b is selected as a parity generation timing. In this case, if the parity generation timing c or d is to be selected, the hit/miss judge part d 600 or k 8000 may be called in lieu of the hit/miss judge part c 400.

In step 6106, the judgement is made as to whether or not the write of the data record 1500 into a disk unit should be synchronized. In the case where the synchronization is made, there results in the selection of the asynchronous process c 7000. In step 6107, the hit/miss judge part e 700 is called. Calling the hit/miss judge part e 700 means that the parity generation timing a or b is selected as a parity generation timing. In this case, if the parity generation timing c or d is to be selected, the hit/miss judge part f 900 or l 7000 may be called in lieu of the hit/miss judge part e 700.

In the case where the asynchronization is made, there results in the selection of the asyncronous process d 7100. In step 6105, the hit/miss judge part g 1000 is called. Calling the hit/miss judge part g 1000 means that the parity generation timing a or b is selected as a parity generation timing. In this case, if the parity generation timing c or d is to be selected, the hit/miss judge part h 1200 or m 8100 may be called in lieu of the hit/miss judge part g 1000.

According to the present invention, a process for a write request issued from a processor in a disk array using the data distribution by record (or a disk array in levels 4 and 5 in the Patterson et al' article) can be performed at high speed. Namely, by using a disk cache in a control unit, the shortening of a response time seen from the processor can be realized by (1) shortening a process time for acquisition of information necessary for generating an updated value of a parity record and (2) asynchronizing processes generated attendant upon a write request as great as possible.

What is claimed is:

1. A storage system comprising:

a plurality of disk units storing data of a record group, said record group including a plurality of data records and a parity record that has redundant data for recovering data of said plurality of data records, wherein data of each of said parity record and said plurality of data records is stored in a different one of said plurality of disk units;

a cache memory; and a control unit, wherein said control unit receives a write request and write data to be written into one of said plurality of disk units from a processing unit coupled to said storage system, stores said write data into said cache memory, and reports the completion of said write request to said processing unit, and after reporting the completion of said write request, said control unit checks whether or not data of records necessary for generating updated value of said parity record is stored in said cache memory, loads data of one or plurality of records necessary for generating the updated value of said parity record when the data of said one or plurality of records is not stored in said cache memory, generates the updated value of said parity record, writes the updated value of said parity record to one of said plurality of disk units which stores data of said parity record, and writes said write data to one of said plurality disk units.

2. A storage system according to claim 1, wherein said data of records necessary for generating updated value of said parity record are data of one of said plurality of data records which is to be updated by said write data and data of said parity record.

3. A storage system according to claim 2, wherein said control unit stores said write data into a region other than a region in said cache memory where data of one of said plurality of data records which is to be updated by said write data is stored.

4. A storage system according to claim 1, wherein said data of records necessary for generating updated value of said parity record is data of all of said plurality of data records other than one of said plurality of data record where data updating by said write data is stored.

5. A storage system comprising:

a plurality of disk units storing data of a record group, said record group including a plurality of data records and a parity record that has redundant data for recovering data of said plurality of data records, wherein data of each of said parity record and said plurality of data records is stored in a different one of said plurality of disk units;

a cache memory; and a control unit, wherein said control unit receives a write request and write data for updating one of said plurality of data records from a central processing unit, stores said write data into said cache memory and one of said plurality of disk units, and reports the completion of said write request to said central processing unit, and after reporting the completion of said write request, said control unit confirms whether or not data of records necessary for generating updated value of said parity record is stored in said cache memory, loads data of one or plurality of records necessary for generating the updated value of said parity record which is not stored in said cache memory, generates the updated value of said parity record, and writes the updated value of said parity record to one of said plurality of disk units.

6. A storage system according to claim 5, wherein said data of records necessary for generating updated value of said parity record are data of one of said plurality of data records which is to be updated by said write data and data of said parity record.

7. A storage system according to claim 5, wherein said data of records necessary for generating updated value of said parity record is data of all of said plurality of data records other than one of said plurality of data record where data updating by said write data is stored.

* * * * *